United States Patent
Horiuchi et al.

(10) Patent No.: US 6,194,028 B1
(45) Date of Patent: *Feb. 27, 2001

(54) APPARATUS AND METHOD OF IMPROVING PARTICLE SURFACE

(75) Inventors: Takahiro Horiuchi; Norihiro Ochi, both of Yamatokoriyama; Hiroshi Kubota, Yamatotakada; Yoshiaki Akazawa, Nara; Yasuharu Morinishi, Tenri; Hideshi Izumi, Ikoma, all of (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,852

(22) Filed: Mar. 6, 1997

(30) Foreign Application Priority Data

Mar. 7, 1996 (JP) .................................................. 8-050349
Oct. 2, 1996 (JP) .................................................. 8-262167

(51) Int. Cl.$^7$ .................................................. C23C 16/00
(52) U.S. Cl. ........................ 427/212; 427/215; 427/248.1
(58) Field of Search .................................. 427/212, 214, 427/215, 216, 217, 248.1

(56) References Cited

U.S. PATENT DOCUMENTS

| 4,152,478 | * | 5/1979 | Takagi | 427/248.1 |
|---|---|---|---|---|
| 4,353,938 | * | 10/1982 | Sterling et al. | 427/217 |
| 4,440,971 | * | 4/1984 | Harrold | 174/17 GF |
| 4,508,682 | * | 4/1985 | Miura et al. | 420/590 |
| 4,656,056 | * | 4/1987 | Leuenberger | 427/212 |
| 4,792,199 | | 12/1988 | Borden . | |
| 4,851,262 | * | 7/1989 | McFeaters | 427/217 |
| 4,950,073 | * | 8/1990 | Sommer | 356/37 |
| 5,176,723 | | 1/1993 | Liu et al. . | |
| 5,239,356 | * | 8/1993 | Hollander et al. | 356/37 |

FOREIGN PATENT DOCUMENTS

| 2-122873 | 5/1990 | (JP) . |
|---|---|---|
| 3-284606 | 12/1991 | (JP) . |
| 5-003 238 | 1/1993 | (JP) . |

* cited by examiner

Primary Examiner—Shrive Beck
Assistant Examiner—Bret Chen
(74) Attorney, Agent, or Firm—Dike, Bronstein, Roberts & Cushman, LLP; David G. Conlin; Geroge W. Neuner

(57) ABSTRACT

A particle surface improving method for forming a film of a surface improving agent that improves the property of a particle surface by exposing particles to a supersaturation atmosphere of the surface improving agent to let the surface improving agent condense on the particle surface. This method can improve the particle surface by a simpler manipulation in a shorter time without charging the particles.

9 Claims, 44 Drawing Sheets

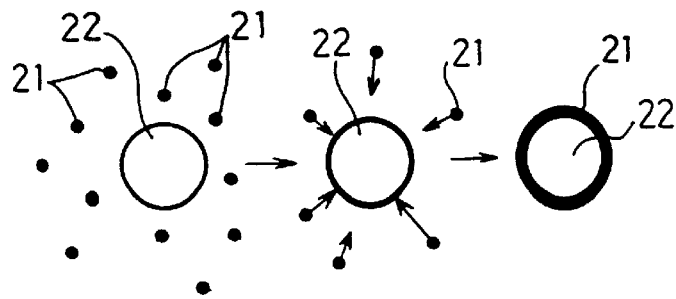
FIG.4(a) FIG.4(b) FIG.4(c)
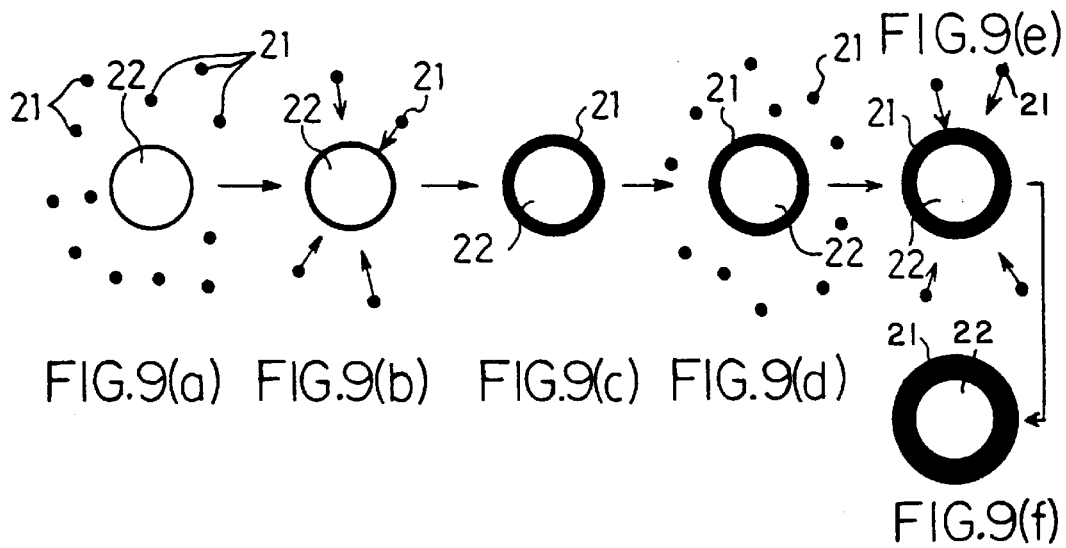
FIG.9(a) FIG.9(b) FIG.9(c) FIG.9(d) FIG.9(e)
FIG.9(f)
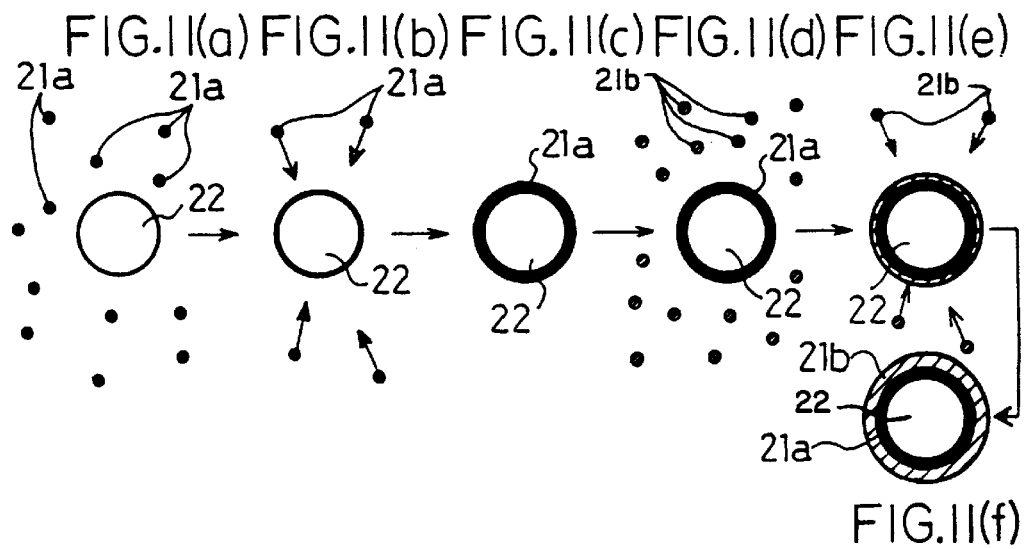
FIG.11(a) FIG.11(b) FIG.11(c) FIG.11(d) FIG.11(e)
FIG.11(f)

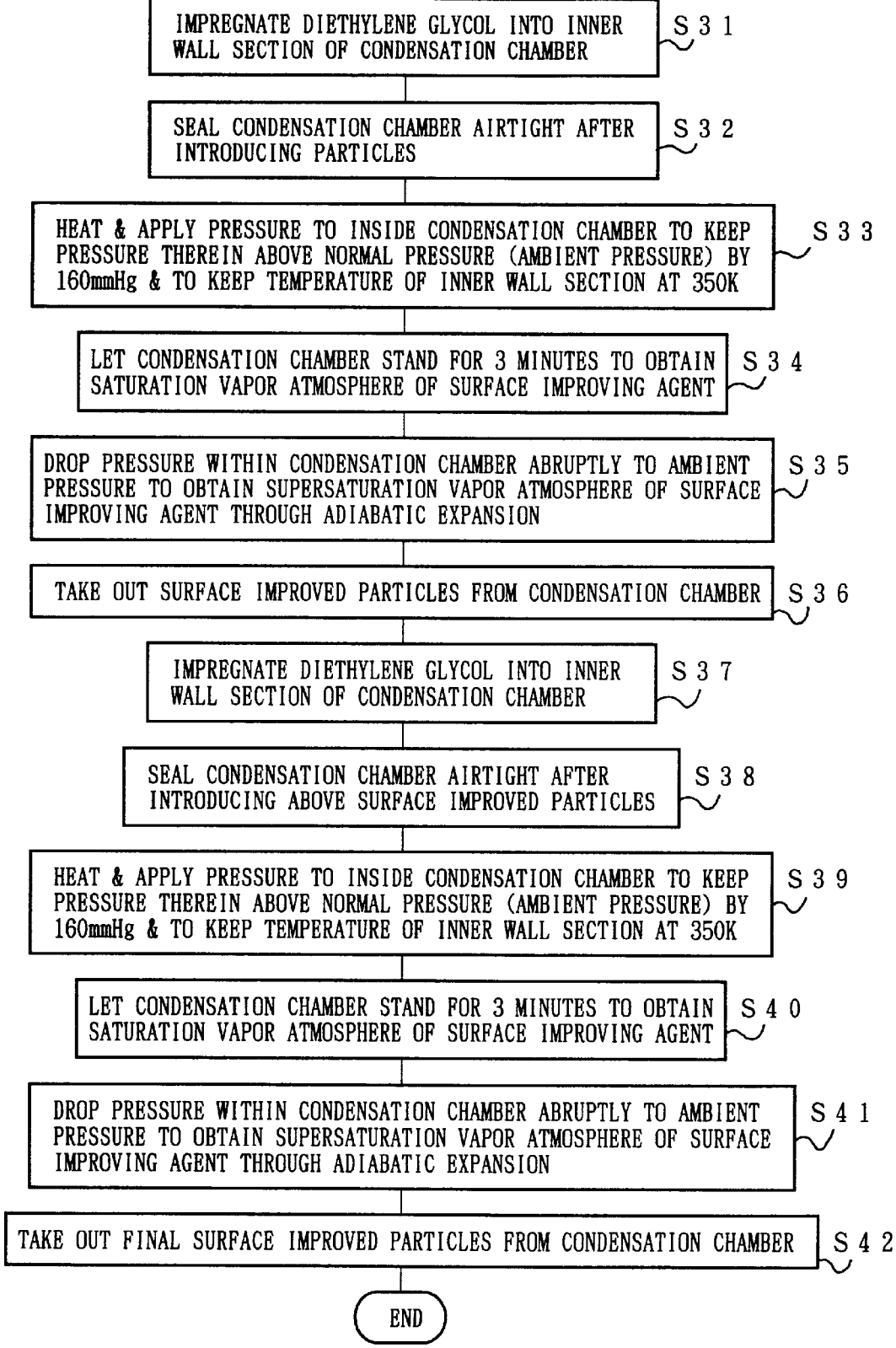

FIG. 15

```
START
  │
  ▼
┌─────────────────────────────────────────────────────┐
│ IMPREGNATE SURFACE IMPROVING AGENT INTO             │ S71
│ INNER WALL SECTION OF CONDENSATION CHAMBER          │
└─────────────────────────────────────────────────────┘
  │
  ▼
┌─────────────────────────────────────────────────────┐
│ HEAT INSIDE CONDENSATION CHAMBER TO KEEP TEMPERATURE│ S72
│ OF INNER WALL SECTION AT PREDETERMINED LEVEL        │
└─────────────────────────────────────────────────────┘
  │
  ▼
┌─────────────────────────────────────────────────────┐
│ OPEN INLET AND OUTLET VALVES TO INTRODUCE           │ S73
│ PARTICLES INTO CONDENSATION CHAMBER                 │
└─────────────────────────────────────────────────────┘
  │
  ▼
┌─────────────────────────────────────────────────────┐
│ SHUT INLET AND OUTLET VALVES TO SEAL CONDENSATION   │ S74
│ CHAMBER AIRTIGHT AFTER REPLACING AIR THEREIN WITH   │
│ AEROSOL                                             │
└─────────────────────────────────────────────────────┘
  │
  ▼
┌─────────────────────────────────────────────────────┐
│ SEND CLEAN COMPRESSED AIR THROUGH PRESSURE          │ S75
│ APPLYING/REDUCING OPENING TO KEEP PRESSURE WITHIN   │
│ CONDENSATION CHAMBER AT PREDETERMINED LEVEL ABOVE   │
│ NORMAL PRESSURE (AMBIENT PRESSURE)                  │
└─────────────────────────────────────────────────────┘
  │
  ▼
┌─────────────────────────────────────────────────────┐
│ SHUT PRESSURE APPLYING/REDUCING OPENING             │ S76
│ TO SEAL CONDENSATION CHAMBER AIRTIGHT               │
└─────────────────────────────────────────────────────┘
  │
  ▼
┌─────────────────────────────────────────────────────┐
│ LET CONDENSATION CHAMBER STAND TO OBTAIN SATURATION │ S77
│ VAPOR ATMOSPHERE OF SURFACE IMPROVING AGENT         │
└─────────────────────────────────────────────────────┘
  │
  ▼
┌─────────────────────────────────────────────────────┐
│ OPEN PRESSURE APPLYING/REDUCING OPENING TO DROP     │ S78
│ PRESSURE WITHIN CONDENSATION CHAMBER ABRUPTLY TO    │
│ AMBIENT PRESSURE TO OBTAIN SUPERSATURATION VAPOR    │
│ ATMOSPHERE OF SURFACE IMPROVING AGENT THROUGH       │
│ ADIABATIC EXPANSION                                 │
└─────────────────────────────────────────────────────┘
  │
  ▼
┌─────────────────────────────────────────────────────┐
│ LET CONDENSATION CHAMBER STAND UNTIL                │ S79
│ PARTICLE GROWTH REACHES EQUILIBRIUM                 │
└─────────────────────────────────────────────────────┘
  │
  ▼
┌─────────────────────────────────────────────────────┐
│ MEASURE NUMBER CONCENTRATION AND PARTICLE SIZE OF   │ S80
│ RESULTING PARTICLES USING OPTICAL DETECTING DEVICE  │
└─────────────────────────────────────────────────────┘
  │
  ▼
┌─────────────────────────────────────────────────────┐
│ STOP OPTICAL DETECTING DEVICE                       │ S81
└─────────────────────────────────────────────────────┘
  │
  ▼
┌─────────────────────────────────────────────────────┐
│ OPEN INLET AND OUTLET VALVES TO INTRODUCE CLEAN AIR │ S82
│ INTO CONDENSATION CHAMBER TO INTRODUCE SURFACE      │
│ IMPROVED PARTICLES TO OUTSIDE OF CONDENSATION       │
│ CHAMBER                                             │
└─────────────────────────────────────────────────────┘
  │
  ▼
 END
```

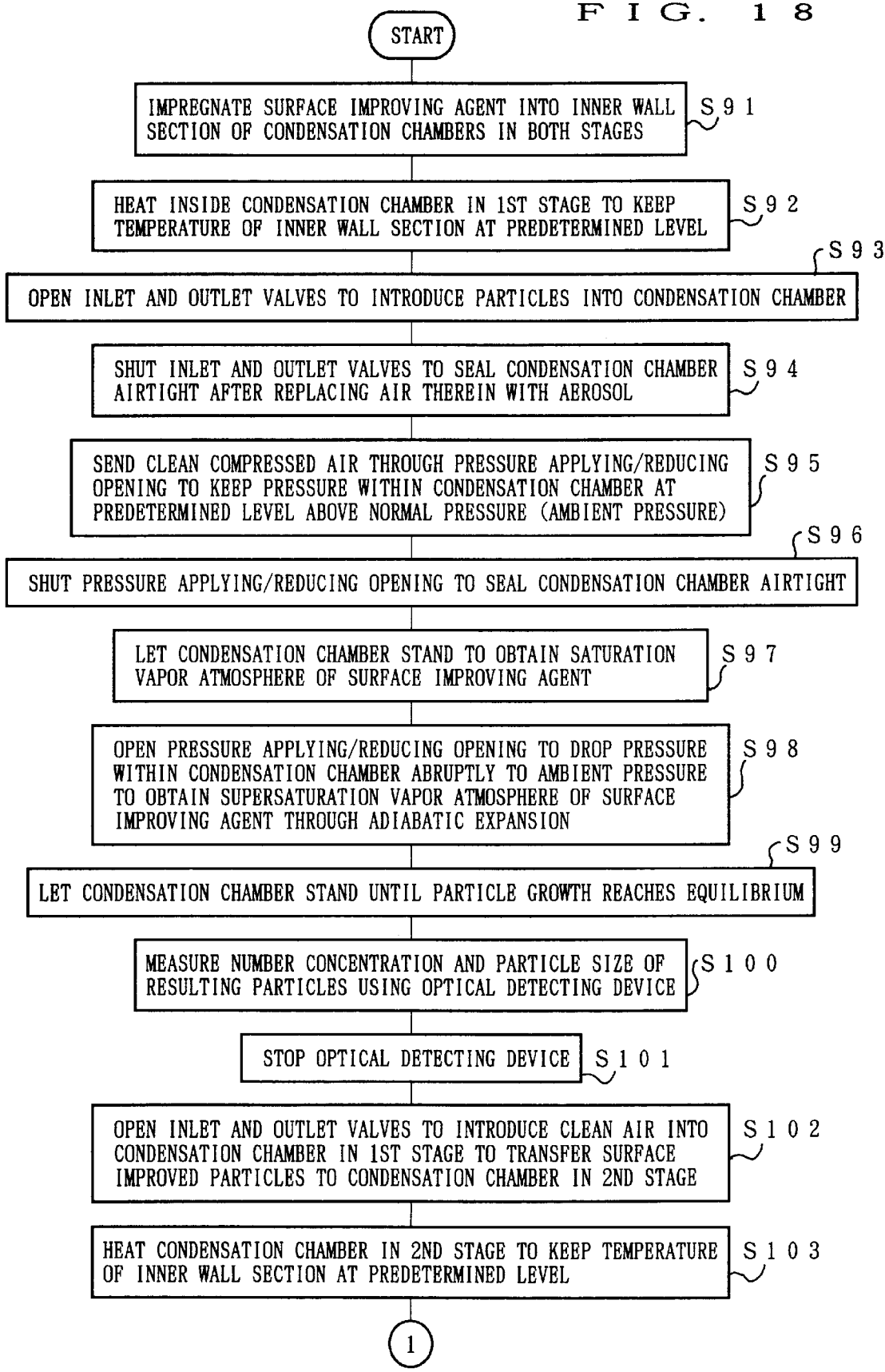

| S104 | SHUT INLET AND OUTLET VALVES TO SEAL CONDENSATION CHAMBER IN 2ND STAGE AIRTIGHT AFTER REPLACING AIR THEREIN WITH AEROSOL |

↓

| S105 | SEND CLEAN COMPRESSED AIR THROUGH PRESSURE APPLYING/REDUCING OPENING TO KEEP PRESSURE WITHIN CONDENSATION CHAMBER AT PREDETERMINED LEVEL ABOVE NORMAL PRESSURE (AMBIENT PRESSURE) |

↓

| S106 | SHUT PRESSURE APPLYING/REDUCING OPENING TO SEAL CONDENSATION CHAMBER AIRTIGHT |

↓

| S107 | LET CONDENSATION CHAMBER STAND TO OBTAIN SATURATION VAPOR ATMOSPHERE (ABOUT 1 MINUTE) |

↓

| S108 | OPEN PRESSURE APPLYING/REDUCING OPENING TO DROP PRESSURE WITHIN CONDENSATION CHAMBER ABRUPTLY TO AMBIENT PRESSURE TO OBTAIN SUPERSATURATION VAPOR ATMOSPHERE THROUGH ADIABATIC EXPANSION |

↓

| S109 | LET CONDENSATION CHAMBER STAND UNTIL PARTICLE GROWTH REACHES EQUILIBRIUM (ABOUT 1 SECOND) |

↓

| S110 | MEASURE NUMBER CONCENTRATION AND PARTICLE SIZE OF RESULTING PARTICLES USING OPTICAL DETECTING DEVICE |

↓

| S111 | STOP OPTICAL DETECTING DEVICE |

↓

| S112 | OPEN INLET AND OUTLET VALVES TO INTRODUCE CLEAN AIR INTO CONDENSATION CHAMBER TO INTRODUCE SURFACE IMPROVED PARTICLES TO OUTSIDE OF CONDENSATION CHAMBER |

↓

( END )

FIG. 21

(2)
↓
| SHUT INLET AND OUTLET VALVES TO SEAL CONDENSATION CHAMBER IN 2ND STAGE AIRTIGHT AFTER REPLACING AIR THEREIN WITH AEROSOL | S134 |

↓

| SEND CLEAN COMPRESSED AIR THROUGH PRESSURE APPLYING/REDUCING OPENING TO KEEP PRESSURE WITHIN CONDENSATION CHAMBER AT PREDETERMINED LEVEL ABOVE NORMAL PRESSURE (AMBIENT PRESSURE) | S135 |

↓

| SHUT PRESSURE APPLYING/REDUCING OPENING TO SEAL CONDENSATION CHAMBER AIRTIGHT | S136 |

↓

| LET CONDENSATION CHAMBER STAND TO OBTAIN SATURATION VAPOR ATMOSPHERE | S137 |

↓

| OPEN PRESSURE APPLYING/REDUCING OPENING TO DROP PRESSURE WITHIN CONDENSATION CHAMBER ABRUPTLY TO AMBIENT PRESSURE TO OBTAIN SUPERSATURATION VAPOR ATMOSPHERE THROUGH ADIABATIC EXPANSION | S138 |

↓

| LET CONDENSATION CHAMBER STAND UNTIL PARTICLE GROWTH REACHES EQUILIBRIUM | S139 |

↓

| MEASURE NUMBER CONCENTRATION AND PARTICLE SIZE OF RESULTING PARTICLES USING OPTICAL DETECTING DEVICE | S140 |

↓

| STOP OPTICAL DETECTING DEVICE | S141 |

↓

| OPEN INLET AND OUTLET VALVES TO INTRODUCE CLEAN AIR INTO CONDENSATION CHAMBER TO INTRODUCE SURFACE IMPROVED PARTICLES TO OUTSIDE OF CONDENSATION CHAMBER | S142 |

↓
( END )

FIG. 30

```
START
  ↓
[S191] HEAT INSIDE CONDENSATION CHAMBER TO KEEP TEMPERATURE OF INNER WALL SECTION AT 350K
  ↓
[S192] SEAL CONDENSATION CHAMBER AIRTIGHT AFTER INTRODUCING PARTICLES AND DIETHYLENE GLYCOL
  ↓
[S193] APPLY PRESSURE TO INSIDE CONDENSATION CHAMBER TO KEEP PRESSURE THEREIN ABOVE NORMAL PRESSURE BY 160mmHg
  ↓
[S194] LET CONDENSATION CHAMBER STAND FOR 1 MINUTE TO OBTAIN SATURATION VAPOR STATE OF SURFACE IMPROVING AGENT
  ↓
[S195] DROP PRESSURE WITHIN CONDENSATION CHAMBER ABRUPTLY TO AMBIENT PRESSURE TO OBTAIN SUPERSATURATION VAPOR STATE OF SURFACE IMPROVING AGENT THROUGH ADIABATIC EXPANSION
  ↓
[S196] SEAL CONDENSATION CHAMBER AIRTIGHT AFTER INTRODUCING TRIETHYLENE GLYCOL
  ↓
[S197] APPLY PRESSURE TO INSIDE CONDENSATION CHAMBER TO KEEP PRESSURE THEREIN ABOVE NORMAL PRESSURE BY 160mmHg
  ↓
[S198] LET CONDENSATION CHAMBER STAND FOR 1 MINUTE TO OBTAIN SATURATION VAPOR STATE OF SURFACE IMPROVING AGENT
  ↓
[S199] DROP PRESSURE WITHIN CONDENSATION CHAMBER ABRUPTLY TO AMBIENT PRESSURE TO OBTAIN SUPERSATURATION VAPOR STATE OF SURFACE IMPROVING AGENT THROUGH ADIABATIC EXPANSION
  ↓
[S200] TAKE OUT SURFACE IMPROVED PARTICLES FROM CONDENSATION CHAMBER
  ↓
END
```

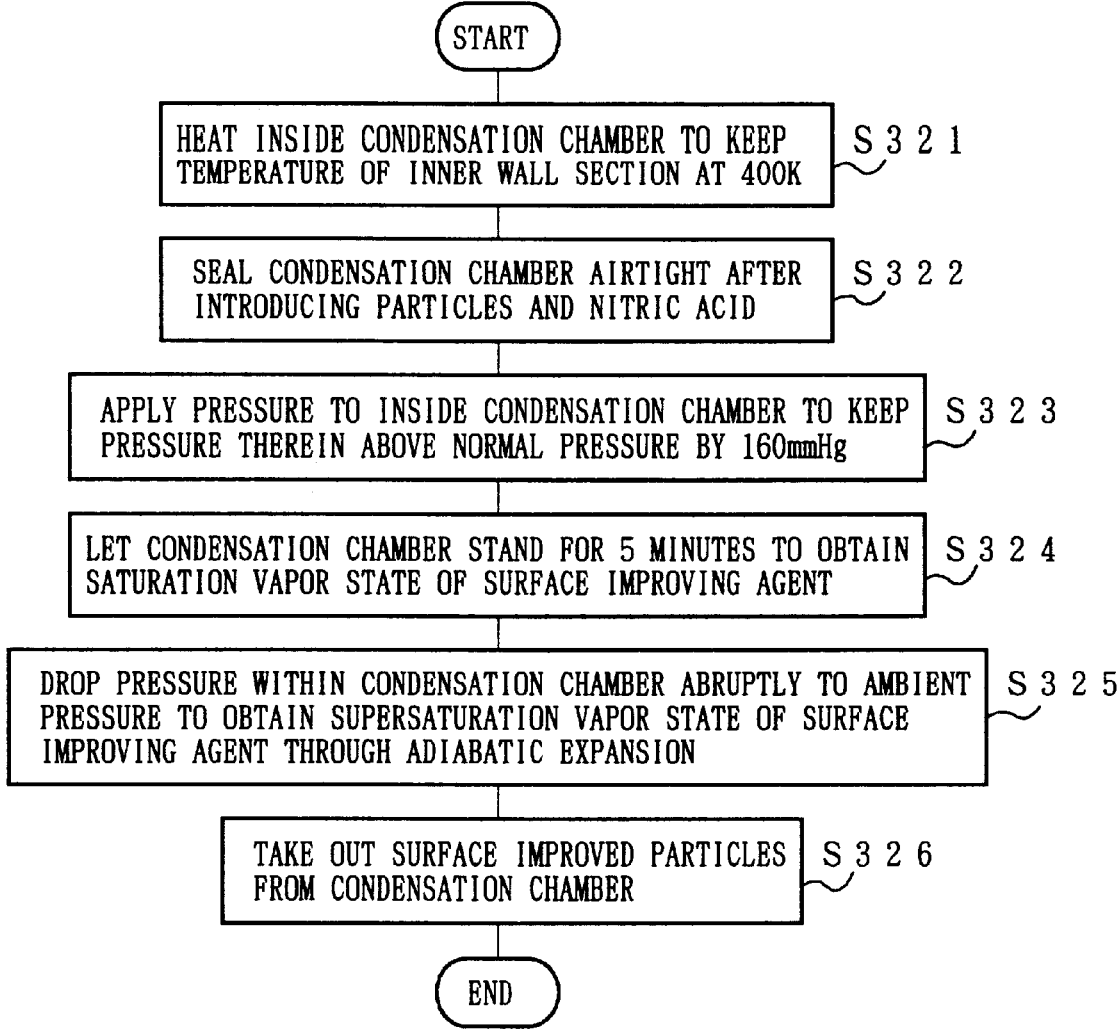

FIG. 44

```
START
  ↓
[S331] HEAT INSIDE CONDENSATION CHAMBER TO KEEP TEMPERATURE OF INNER WALL SECTION AT 350K
  ↓
[S332] SEAL CONDENSATION CHAMBER AIRTIGHT AFTER INTRODUCING PARTICLES AND DIETHYLENE GLYCOL
  ↓
[S333] APPLY PRESSURE TO INSIDE CONDENSATION CHAMBER TO KEEP PRESSURE THEREIN ABOVE NORMAL PRESSURE BY 160mmHg
  ↓
[S334] LET CONDENSATION CHAMBER STAND FOR 1 MINUTE TO OBTAIN SATURATION VAPOR STATE OF SURFACE IMPROVING AGENT
  ↓
[S335] DROP PRESSURE WITHIN CONDENSATION CHAMBER ABRUPTLY TO AMBIENT PRESSURE TO OBTAIN SUPERSATURATION VAPOR STATE OF SURFACE IMPROVING AGENT THROUGH ADIABATIC EXPANSION
  ↓
[S336] SEAL CONDENSATION CHAMBER AIRTIGHT AFTER INTRODUCING DIETHYLENE GLYCOL
  ↓
[S337] APPLY PRESSURE TO INSIDE CONDENSATION CHAMBER TO KEEP PRESSURE THEREIN ABOVE NORMAL PRESSURE BY 160mmHg
  ↓
[S338] LET CONDENSATION CHAMBER STAND FOR 1 MINUTE TO OBTAIN SATURATION VAPOR STATE OF SURFACE IMPROVING AGENT
  ↓
[S339] DROP PRESSURE WITHIN CONDENSATION CHAMBER ABRUPTLY TO AMBIENT PRESSURE TO OBTAIN SUPERSATURATION VAPOR STATE OF SURFACE IMPROVING AGENT THROUGH ADIABATIC EXPANSION
  ↓
[S340] TAKE OUT SURFACE IMPROVED PARTICLES FROM CONDENSATION CHAMBER
  ↓
END
```

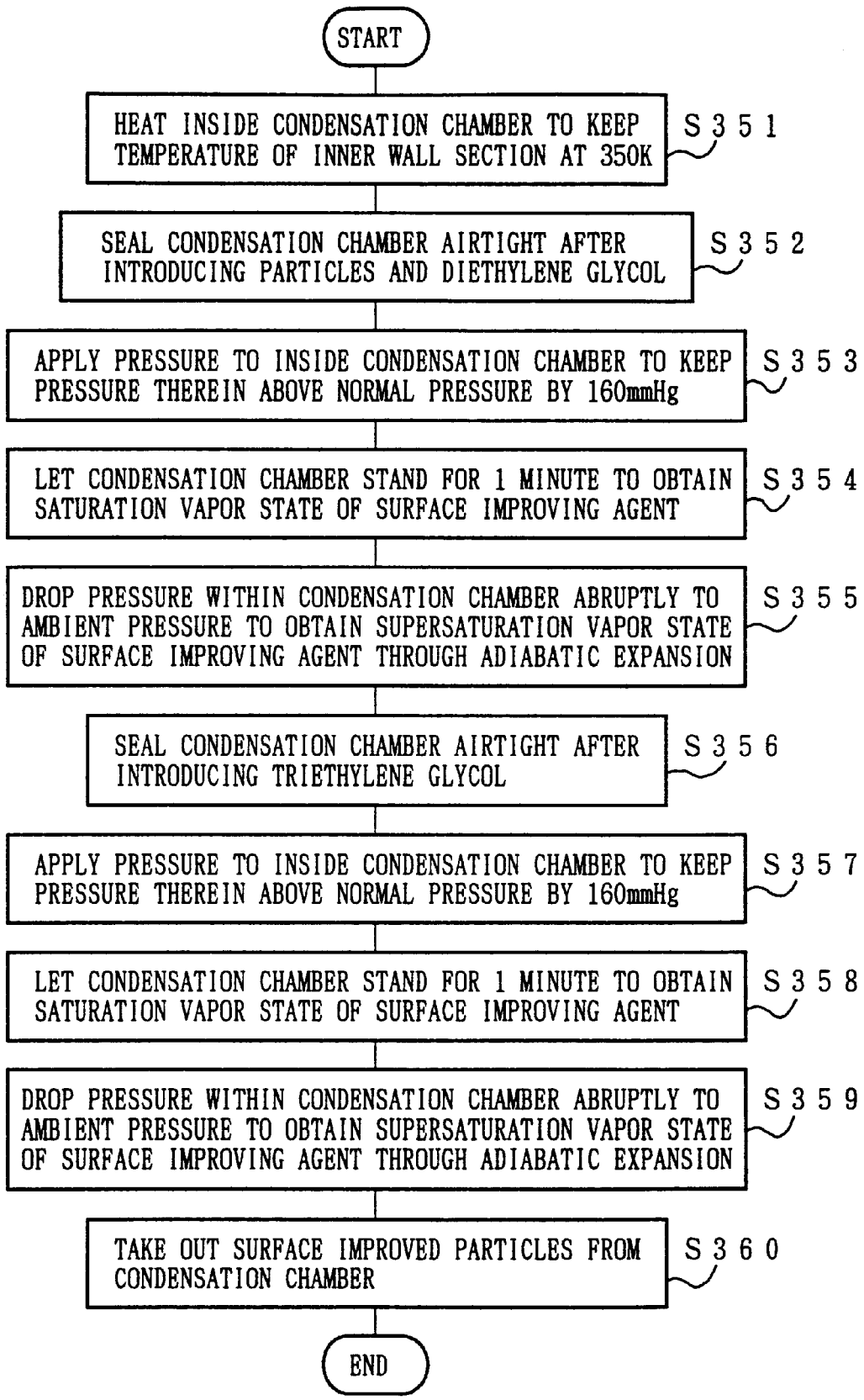

APPARATUS AND METHOD OF IMPROVING PARTICLE SURFACE

FIELD OF THE INVENTION

The present invention relates to an apparatus and method of improving a particle surface by forming a film thereon to improve the property of a particle.

BACKGROUND OF THE INVENTION

Covering the surface of a microscopic particle with a surface improving agent has been known as a technique to improve the particle surface. This technique is applied to either dry particles or particles in a liquid-phase. More specifically, this technique includes a kneading method, a stirring method using a medium, a spray dry method for coating a particle surface with a surface improving agent. These methods are well known and the detailed description is set forth in the following:

1. "Microscopic Particle Engineering: Basic and Application of Dispersion", pp. 123–136, edited by Japan Powder Industrial Technical Association and published by Asakura Shoten K. K.; and 2. "Today's Chemical Engineering 45 Microscopic Particle Engineering", edited by Chemical Engineering Association and published by Chemical Industrial Co., Ltd.

However, the above conventional particle surface improving methods have following problems:

(1) the particles are charged during the surface improving treatment, and the resulting charged particles are difficult to handle in the following procedure;

(2) the surface improving treatment takes quite a long time; and (3) the surface improving treatment demands a complex manipulation and the actual operation depends on an expensive apparatus for the most part.

SUMMARY OF THE INVENTION

It is therefore an object of the present invention to provide an apparatus and method of improving a particle surface which can improve the particle surface more readily in a shorter time than conventional methods without charging the particles.

To fulfill the above object, a method of improving a particle surface of the present invention is characterized by having the step of:

exposing particles to a supersaturation atmosphere of a surface improving agent that improves a property of a particle surface, so that a film of the surface improving agent is formed on the particle surface by letting the surface improving agent condense thereon.

The above arrangement makes it possible to form a film of the surface improving agent, namely, a surface improving film, on the particle surface without any action such that charges the particles, for example, stirring the particles.

Thus, the particles are not charged during the surface improving treatment, and the resulting surface improved particles are easy to handle.

Also, compared with an operation like stirring, it takes a very short time to form the surface improving film on the particle surface by exposing the particles to the supersaturation atmosphere of the surface improving agent to let the surface improving agent condense on the particle surface.

In addition, the present particle surface improving method uses a simple physical phenomenon that the supersaturation atmosphere of the surface improving agent is produced and the particles are exposed to the same to let the surface improving agent condense on the particle surface. Thus, the present particle surface improving method can be manipulated easily and carried out by a simple and inexpensive apparatus.

Further, the surface improving film grows on the particle surface to have a constant thickness due to its own surface tension, thereby making it possible to coat the particles with the surface improving film of a uniform thickness.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a view explaining a process of a surface improving treatment according to the particle surface improving method of FIG. 1;

FIG. 9 is a view explaining a process of a surface improving treatment carried out by the particle surface improving system of FIG. 8;

FIG. 10 is a flowchart detailing an example application of the particle surface improving method carried out by the particle surface improving system of FIG. 8;

FIG. 11 is a view explaining a process of a surface improving treatment according to an example particle surface improving method in accordance with a further embodiment of the present invention;

FIG. 15 is a flowchart detailing an example surface improving treatment carried out by the particle surface improving apparatus of FIG. 13;

FIG. 18 is a flowchart detailing a surface improving treatment carried out by the particle surface improving system of FIG. 16;

FIG. 19 is a flowchart detailing a treatment following the treatment of FIG. 18;

FIG. 21 is a flowchart detailing a treatment following the treatment of FIG. 20;

FIG. 30 is a flowchart detailing an example application of the particle surface improving method carried out by the particle surface improving apparatus of FIG. 29;

FIG. 43 is a flowchart detailing another example application of the particle surface improving method of FIG. 41;

FIG. 44 is a flowchart detailing a further example application of the particle surface improving method of FIG. 41;

FIG. 46 is a flowchart detailing an example application of the particle surface improving method carried out by the particle surface improving apparatus of FIG. 45.

DESCRIPTION OF THE EMBODIMENTS

Embodiment 1

Referring to FIGS. 1 through 7, the following description will describe an example embodiment of the present invention.

Figure 2:
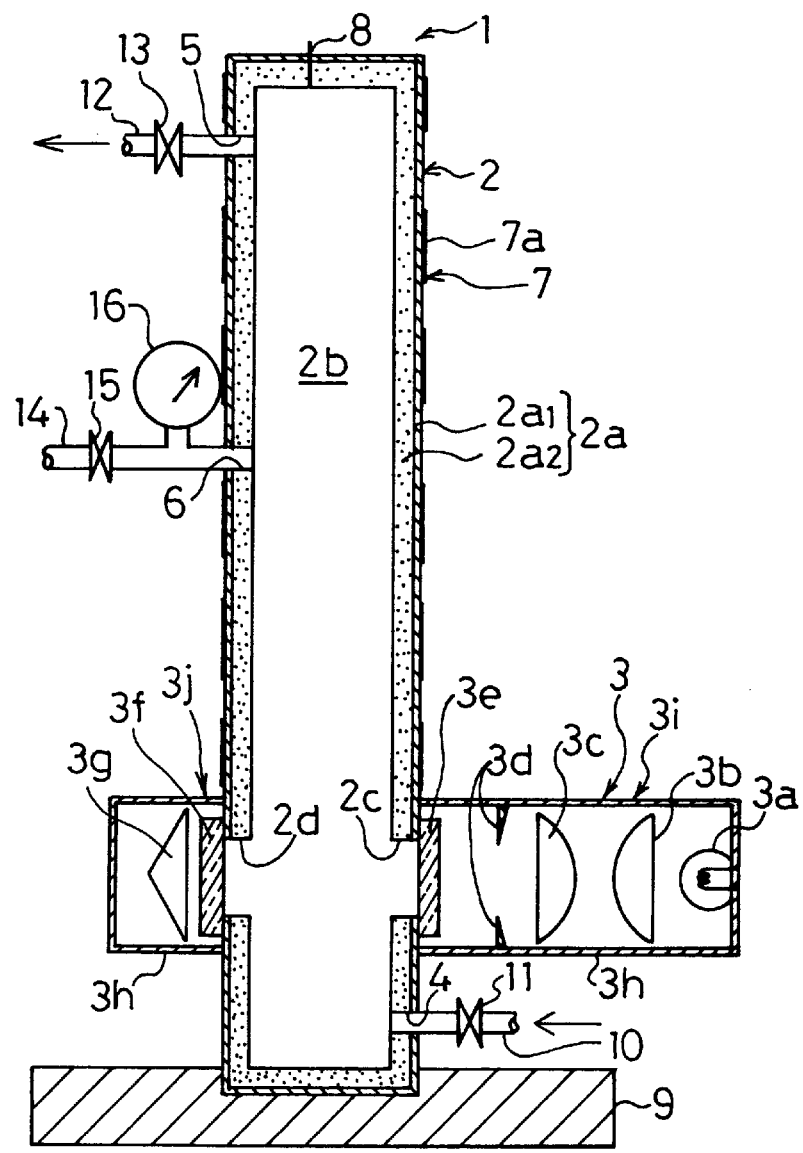
FIG. 2 is a longitudinal section of a particle surface improving apparatus carrying out the particle surface improving method of FIG. 1.
Figure 3:
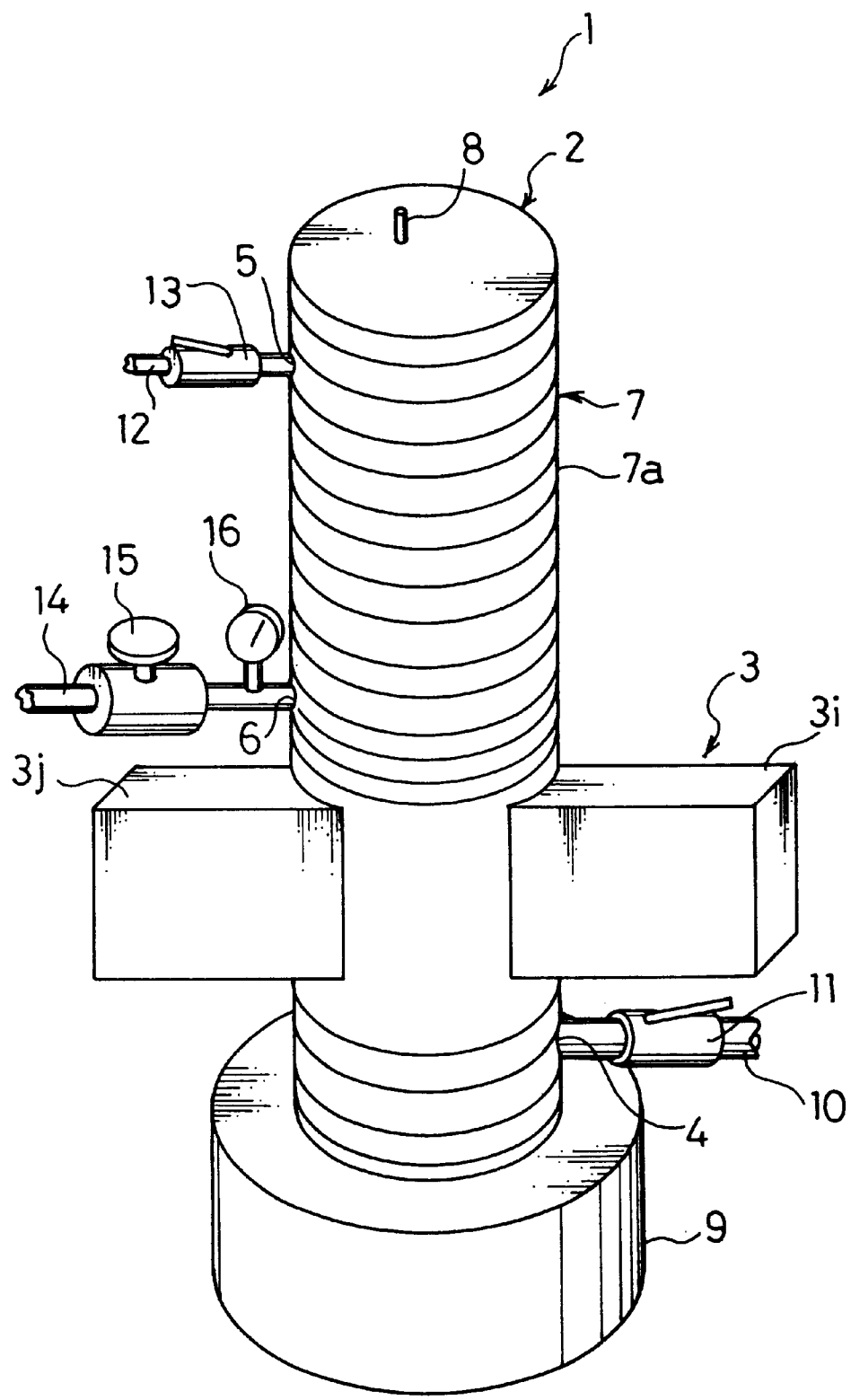
FIG. 3 is a perspective view of the particle surface improving apparatus of FIG. 2.
Figure 5:
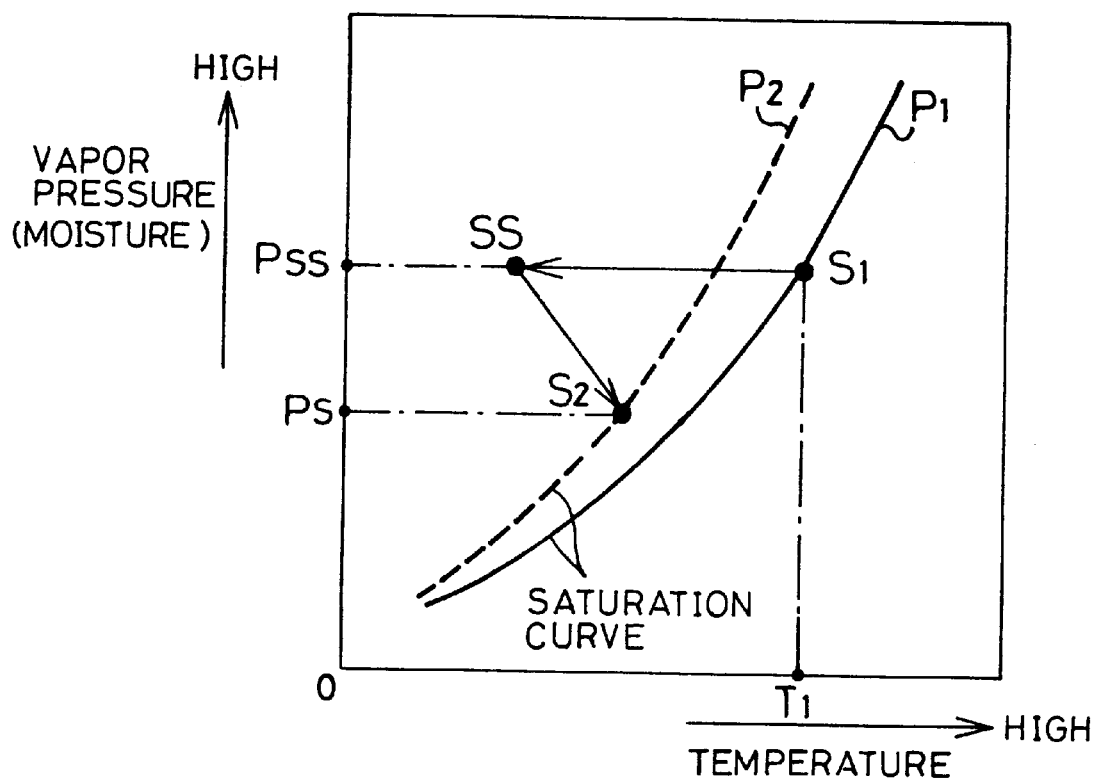
FIG. 5 is a graph explaining the principle of the surface improving treatment according to the particle surface improving method of FIG. 1.

A particle surface improving apparatus carrying out a particle surface improving method of the present embodiment is of a structure depicted in FIGS. 2 and 3. FIG. 2 is a longitudinal cross section and FIG. 3 is a perspective view depicting a structure of a particle surface improving apparatus 1. The particle surface improving apparatus 1 comprises a condensation chamber 2 and an optical detecting device 3 serving as particle size detecting means and also as particle number concentration detecting means. The condensation chamber 2 includes a particle inlet 4, a particle outlet 5, and a pressure applying/reducing opening 6. The condensation chamber 2 also includes a heating device 7 and a thermometer 8.

The condensation chamber 2 placed on a platform 9 is a slim cylinder extending in a vertical direction. Although the shape of the condensation chamber 2 is not especially limited, it is preferable that the condensation chamber 2 is longer in length than width in terms of suitability for a surface improving treatment herein. The condensation chamber 2 is composed of a wall section $2a$ comprising an outer wall section $2a_2$ and an inner wall section $2a_2$, and has an airtight treatment space $2b$ inside. The inner wall section $2a_2$ is made of a porous material, such as ceramic and felt, so that a condensation liquid serving as a surface improving agent is impregnated therein. When the inner wall section $2a_2$ made of the porous material covers the entire inner surface of the wall section $2a$ as is illustrated in FIG. 2, condensation liquids can turn into a vapor efficiently. However, the arrangement of the inner wall section $2a_2$ is not limited to the above, and the same can be provided partially as occasion demands.

An introduction pipe 10 for introducing particles into the treatment space $2b$ is fit into the particle inlet 4, while a releasing pipe 12 for releasing the particles from the treatment space $2b$ is fit into the particle outlet 5. Also, a pressure applying/reducing pipe 14 for increasing or reducing a pressure within the treatment space $2b$ is fit into the pressure applying/reducing opening 6. The pipes 10, 12, and 14 have their respective valves 11, 13, and 15 for opening or shutting a path therein. In addition, a pressure gauge 16 for measuring a pressure within the treatment space $2b$ is provided somewhere between the valve 15 of the pressure applying/reducing pipe 14 and the pressure applying/reducing opening 6.

The optical detecting device 3 is provided in the condensation chamber 2 to optically detect the particle size and particle number concentration of the particles therein. The optical detecting device 3 has a light irradiating section 3i and a light receiving section 3j. The light irradiating section 3i and light receiving section 3j are provided on the outer surface of the wall section 2a of the condensation chamber 2 in such a manner to oppose each other with the condensation chamber 2 inbetween. The light irradiating section 3i is enclosed in a device frame 3h and comprises a light source 3a, two lenses 3b and 3c, a lightproof member 3d, and a light transmitting plate 3e. The light receiving section 3j is also enclosed in the device frame 3h and comprises a light transmitting plate 3f and a photo-detector 3g. openings 2c and 2d are made through the wall section 2a where the light irradiating section 3i and light receiving section 3j are provided, respectively. The light transmitting plates 3e and 3f cover the openings 2c and 2d from the outside, respectively.

In the optical detecting device 3, light irradiated from the light source 3a goes into the photo-detector 3g by ways of the lenses 3b and 3c, the opening of the lightproof member 3d, light transmitting plate 3e, opening 2c, treatment space 2b, opening 2d, and light transmitting plate 3f. The incident light on the treatment space 2b scatters and loses its luminous amount depending on the particle size and particle number concentration of the particles therein, and according to which an amount of incident light on the photo-detector 3g varies. Thus, the particle size and particle number concentration of the particles in the treatment space 2b can be detected based on an output from the photo-detector 3g.

The optical detecting device 3 used herein can be any known device of this kind. More specifically, the optical detecting device 3 detects the particle size and particle number concentration using the light dialysis and scattering method. The detection principle is widely known and a detailed explanation is set forth in, for example, "Particle Measuring Technique", edited by the Powder Engineering Association and published by the Nikkan Kogyo Shimbun Ltd. Also, the X-ray transmission method, precipitation method, laser diffraction confusing method, etc. are known as typical methods of detecting particle size and particle number concentration. An explanation of the laser diffraction scattering method, 1011 photon correlating method using dynamic scattering, X-ray transmission method, etc. is also set forth in the above-referred "Particle Measuring Technique".

Besides the above optical detecting device, other methods, such as an image processing analysis method using an optical microscope or an electron microscope, are applicable to detect the particle size and particle number concentration.

Providing the optical detecting device 3 to the particle surface improving apparatus 1 is preferred because of the following advantages:

① A thickness of a liquid film of the surface improving agent formed on the particle surface can be controlled. More specifically, a thickness of the liquid film depends on the particle number concentration, that is, the higher the particle number concentration, the thinner the liquid film, and the lower the particle number concentration, the thicker the liquid film. Thus, a thickness of the liquid film can be controlled by adjusting the particle number concentration, a pressure or a temperature in advance in response to the particle number concentration detected by the optical detecting device 3. In addition, since the optical detecting device 3 also detects the particle size, namely, the largeness of the particle, the thickness of the liquid film can be controlled precisely.

② The productivity of surface improved particles can be adjusted. More specifically, the productivity also depends on the particle number concentration, that is, the higher the particle number concentration, the better the productivity. Thus, the productivity can be adjusted by adjusting the particle number concentration in advance in response to the particle number concentration detected by the optical detecting device 3.

③ The reproducibility of the surface improved particles can be enhanced. More specifically, the properties of the surface improved particles obtained in the preceding surface improving treatment are reproduced in the following surface improving treatment by matching the particle size and particle number concentration with those detected by the optical detecting device 3. Also, comparing the particle size and particle number concentration with the property of the resulting surface improved particles makes it possible to compute the particle size and particle number concentration demanded for a desired property.

The heating device 7 heats the inner wall section $2a_2$ and the treatment space 2b in the condensation chamber 2. The heating device 7, pressure applying/reducing opening 6, pressure applying/reducing pipe 14 and valve 15 constitute adjusting means herein. The heating device 7 includes a heater 7a and an unillustrated slidack (voltage adjuster), whereby the heater 7a is connected to either a D/C power source or A/C power source through the slidack. The heater 7a is, for example, a ribbon heater illustrated in FIG. 2, and provided on the outer surface of the wall section 2a of the condensation chamber 2 in spiral.

The thermometer 8 is attached to the wall section 2a of the condensation chamber 2 to measure a temperature of the inner wall section $2a_2$.

The particle surface improving apparatus 1 forms a film of a surface improving agent 21 on the surface of a particle 22 as is illustrated in states (a) through (c) of FIG. 4, that is, it carries out the surface improving treatment. The surface improving agent 21 may be a liquid at a normal temperature, or a solid at a normal temperature and turn into a liquid or vapor (gas) when heated. Note that since the surface improving agent 21 is impregnated into the inner wall section $2a_2$ made of a porous material, it is preferable that the surface improving agent 21 is a liquid at a normal temperature to facilitate the impregnation.

Examples of the surface improving agent 21 that remains in the form of liquid at a normal temperature include:

highly pure liquids, such as pure water, distilled water, and ion exchange water;

alcohols, such as methanol and isopropyl alcohol (IPA);

glycols, such as ethylene glycol, diethylene glycol, and triethylene glycol;

solvents, such as toluene and xylene;

water solutions or alcohol solutions with an addition of surfactants, stearic acid or the like; etc.

Of all these examples, the most preferred as the surface improving agent 21 are water solutions which are safe and easy to handle, and glycols attaining high saturation.

Although the particles 22 are not especially limited, aerosol particles, mist particles, fume, etc. are generally used. More specifically, the typical particles 22 are particles of an inorganic material, an organic material, plastic, latex, a metal compound, or the like. The above particle surface improving method can be suitably applied to the particles 22 having a particle size in a range between some nanometers and some microns. Note that the conventional surface improving methods can not be applied to microscopic particles, particularly, super-microscopic particles of some nanometers.

The present particle surface improving method is applied to improve the surface of particles made into ink pigments, such as carbon black. The present particle surface improving method can be also applied to particles used in diversified fields, such as particles made into an electrophotographic developing agent, particles made into raw materials of cosmetics, and particles made into medical supplies.

Figure 1:
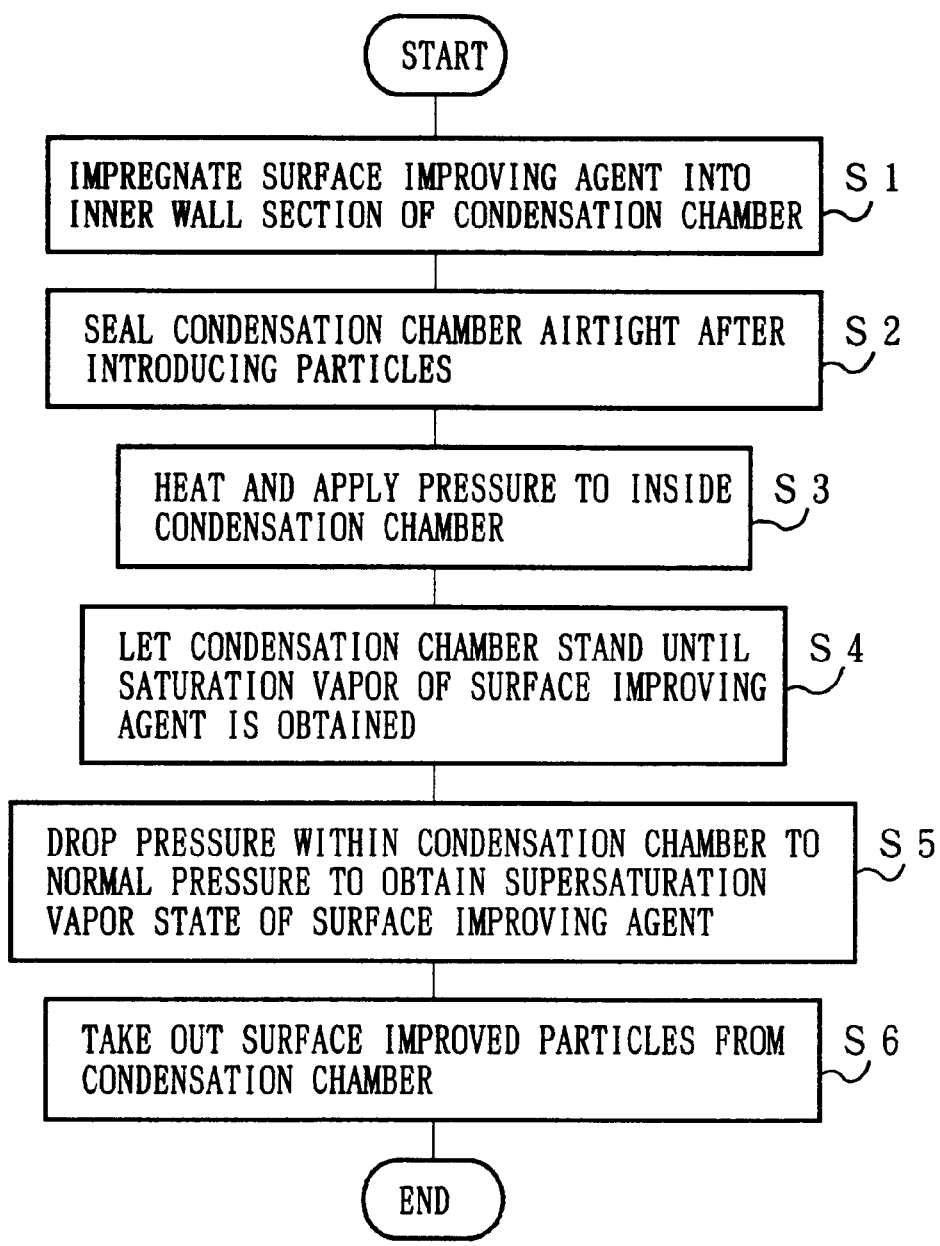
FIG. 1 is a flowchart detailing an example particle surface improving method in accordance with an embodiment of the present invention.

Next, an example particle surface improving method carried out by the above particle surface improving apparatus 1 will be explained with reference to the flowchart of FIG. 1.

To carry out the surface improving treatment by the particle surface improving apparatus 1, a predetermined surface improving agent is impregnated into the inner wall section $2a_2$ of the condensation chamber 2 in the first place (S1). Also, all the impurities that possibly become nuclei are eliminated from the condensation chamber 2, and for this purpose, air in the treatment space 2b is replaced with clean air in advance.

In the second place, the condensation chamber 2 is sealed airtight after particles subject to surface improvement are introduced into the treatment space 2b in the condensation chamber 2 (S2). In this case, the particles are introduced into the treatment space 2b through the particle inlet 4 in the form of aerosol via the introduction pipe 10. Therefore, the valves 11 and 13 of their respective introduction pipe 10 and releasing pipe 12 are opened when the aerosol is introduced, and the valves 11 and 13 are shut after air in the treatment space 2*b* is replaced with the aerosol to seal the condensation chamber 2 airtight.

Next, to obtain a saturation vapor of the surface improving agent in the treatment space 2*b,* a pressure is applied to inside the condensation chamber 2 while the same is heated inside (S3). A pressure is applied by opening the valve 15 to send clean air into the treatment space 2*b* through the pressure applying/reducing pipe 14. A pressure is applied to raise a pressure within the treatment space 2*b* to a predetermined level above a normal pressure (ambient pressure). A pressure within the treatment space 2*b* is measured by the pressure gauge 16. Also, the treatment space 2*b* is heated by the heating device 7. Once the heating device 7 is activated, heat from the heater 7*a* is conveyed to the inner wall section 2$a_2$ and treatment space 2*b* by ways of the outer wall section 2$a_1$, thereby heating the inner wall section 2$a_2$ and treatment space 2*b*. A temperature in the condensation chamber 2 is measured by the thermometer 8.

Then, the condensation chamber 2 is let stand until a saturation vapor of the surface improving agent 21 is obtained (S4). In other words, the condensation chamber 2 is left under the above conditions. Note that to obtain a saturation vapor of the surface improving agent 21, at least a pressure must be applied but heating is an auxiliary action and applied only when occasion demands. The same can be said in each embodiment described below.

As a result of the above procedure, a saturation vapor of the surface improving agent 21 is obtained in the treatment space 2*b* in the condensation chamber 2. Under these conditions, the vapor of the surface improving agent 21 surrounds the particle 22 as is illustrated in the state (a) of FIG. 4.

Then, a pressure within the treatment space 2*b* is dropped to a normal pressure to bring the saturation vapor of the surface improving agent 21 into a supersaturation state (S5). To do so, the valve 15 of the pressure applying/reducing pipe 14 is opened to expose the treatment space 2*b* to atmosphere to trigger adiabatic expansion of the saturation vapor of the surface improving agent 21 in the treatment space 2*b*. Accordingly, the saturation vapor of the surface improving agent 21 is brought into the supersaturation state in the treatment space 2*b,* which triggers a condensation reaction of the surface improving agent 21 on the surface of the particle 22 as is illustrated in the state (b) of FIG. 4. Consequently, as is illustrated in the state (c) of FIG. 4, a liquid film of the surface improving agent 21 coats the particle 22, thereby improving the property of the surface thereof. Note that the valve 15 is shut after adiabatic expansion took place.

Then, the operation ends when the post-surface-improving-treatment particles 22 in the treatment space 2*b,* namely, the surface improved particles, are taken out from the condensation chamber 2 (S6). To do so, the values 11 and 13 of their respective introduction pipe 10 and releasing pipe 12 are opened, for example, so that clean air is introduced into the treatment space 2*b* via the introduction pipe 10 to replace the aerosol containing the surface improved particles in the treatment space 2*b* with clean air.

Here, the principle of how a film of the surface improving agent 21 is formed on the surface of the particle 22 by the above method will be described in detail in the following.

When there exists a mixture of the vapor of the surface improving agent 21 and the particles 22 in the form of aerosol, it is assumed that a balance is maintained as the vapor repetitively adheres to or releases from the particles 22. In this case, it is assumed that a vapor molecule is transported while being diffused by a concentration gradient of the vapor that works as a driving force until the vapor molecule reaches a ultra-thin region near the surface of the particle 22, while a concentration of the vapor molecule is maintained at a constant level within the above region, so that the vapor molecule collides with the surface of the particle 22 and absorbed while performing isotropic thermal motion. This phenomenon has long been studied as a karyo-condensation phenomenon, and a summary of which is set forth in pp. 1–20 and pp. 241–259 in "Basic of Powder Engineering", edited by editing committee of "Basic of Powder Engineering" and issued by the Nikkan Kogyo Shimbun Ltd.

The present particle surface improving method uses the above karyocondensation phenomenon, and a surface improving film forming action in the present particle surface improving method using the karyocondensation phenomenon is illustrated in FIG. 5. In the drawing, $P_1$ and $P_2$ denote saturation curves of the surface improving agent 21 before and after adiabatic expansion, respectively. A point SS denotes a point of supersaturation state when adiabatic expansion takes place at a point $S_1$ (temperature $T_1$) on the saturation curve $P_1$. $P_{SS}$ denotes a vapor pressure of the surface improving agent 21 at the point SS. Also, a point $S_2$ on the saturation curve $P_2$ denotes a saturation point where the condensation started at the supersaturation point SS ends. $P_S$ denotes a vapor pressure of the surface improving agent 21 at the point $S_2$ Thus, a supersaturation ratio is $$\frac{P_{SS}}{P_S}.$$

As shown in FIG. 5, as the environment surrounding the particles 22 changes from the supersaturation point SS to the saturation point $S_2$, that is, from the supersaturation state to saturation state, the vapor starts to condense on the surface of the particle 22 as is illustrated in FIG. 4. Then, a film of the surface improving agent 21 keeps growing on the surface of the particle 22 until the surface improving agent 21 reaches the saturation point $S_2$. Here, a total amount of vapor that condenses on the surface of the particle 22 corresponds to a balance of vapor pressures between the supersaturation point SS and saturation point $S_2$. In other words, the above amount of vapor forms a film of the surface improving agent 21 on the surface of the particle 22. Thus, the higher the supersaturation ratio $$\frac{P_{SS}}{P_S},$$

the thicker a liquid film of the surface improving agent 21 coating the particle 22, thereby making the particle 22 larger in size. For this reason, a surface improving agent 21 attaining a high supersaturation ratio $$\frac{P_{SS}}{P_S}$$

is preferred.

However, even when a surface improving agent attaining only a low supersaturation ratio $$\frac{P_{SS}}{P_S}$$

is used, a liquid film formed on the particle surface can be made thicker gradually by repeating the surface improving treatment several times in the manner described below. In this case, using different kinds of surface improving agents in each surface improving treatment can result a surface improved particles coated with a multi-layer of different materials.

Also, impregnating several kinds of surface improving agents 21 into the inner wall section $2a_2$ of the particle surface improving apparatus 1 makes it possible to form a film made of a mixed ingredients of these surface improving agents 21 on the surface of the particle 22. Using more than one kind of surface improving agent 21 concurrently can trigger a chemical reaction between the surface improving agents 21 and surface material of the particle 22.

EXAMPLE 1

Figure 6:
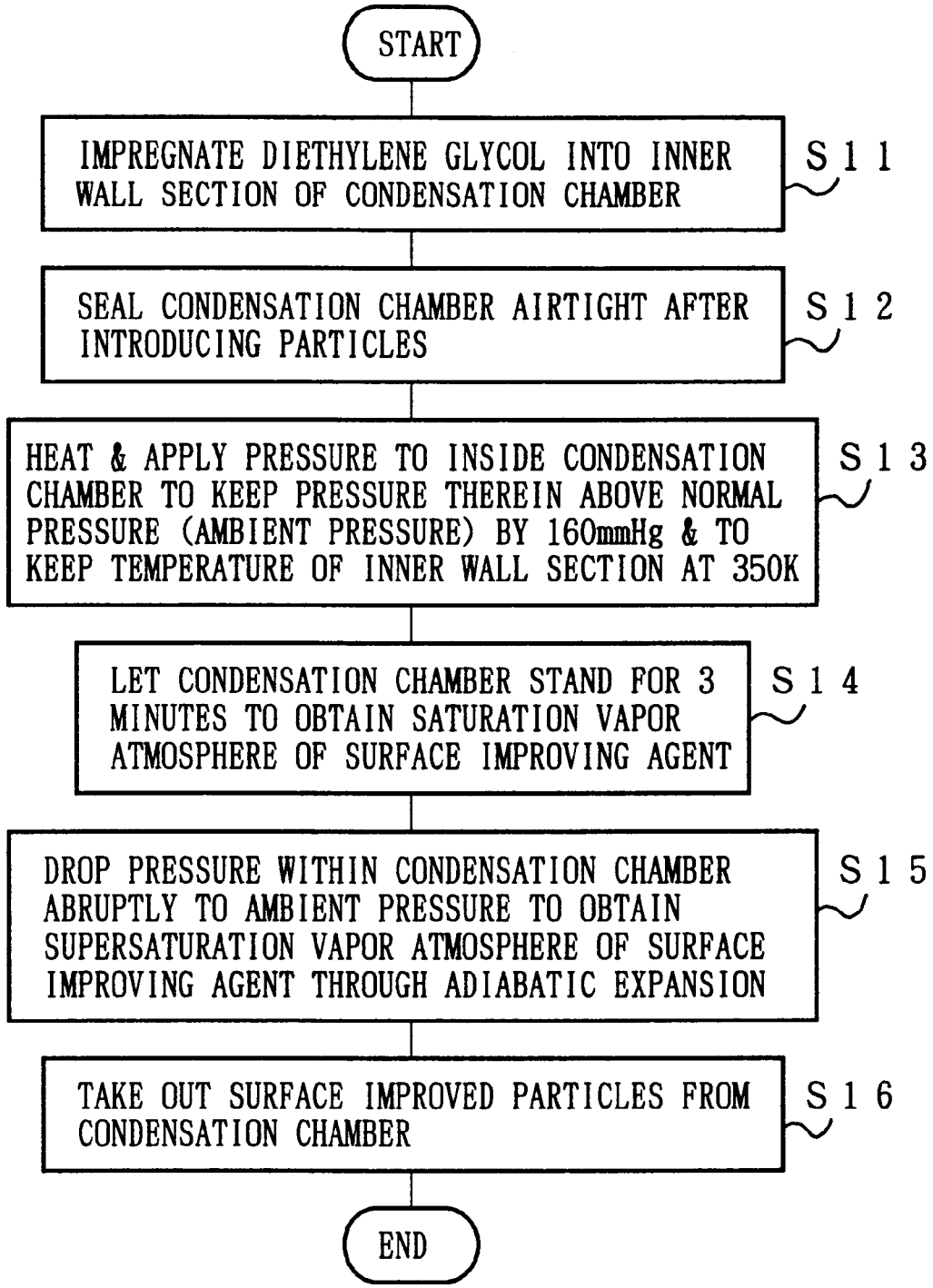
FIG. 6 is a flowchart detailing an example application of the particle surface improving method of FIG. 1.

Next, an example of a surface improving treatment carried out under predetermined conditions in accordance with the present particle surface improving method will be explained with reference to the flowchart of FIG. 6. Note that actual actions in S11–S16 of the flowchart in FIG. 6, namely, introducing the particles into the treatment space 2b, releasing the particles from the treatment space 2b, and increasing/reducing a pressure within the treatment space 2b, are identical with those in S1–S6 of the flowchart in FIG. 1, respectively.

To begin with, diethylene glycol is impregnated into the inner wall section $2a_2$ of the condensation chamber 2 as the surface improving agent 21 (S11).

Then, the condensation chamber 2 is sealed airtight after particles of titanium oxide having a primary particle size of approximately 0.5 µm and a particle number concentration of $10^{11}$ pcs/m$^3$ are introduced into the treatment space 2b in the condensation chamber 2 through the particle inlet 4 (S12). Note that the primary particle referred herein means a separate, individual particle in comparison with a condensed particle composed of an agglomerate of a number of particles.

Next, to obtain a saturation vapor of diethylene glycol, a pressure is applied to inside the condensation chamber 2 while the same is heated inside (S13). A pressure is applied to keep a pressure within the treatment space 2b at 160 mmHg above a normal pressure (ambient pressure). Also, the condensation chamber 2 is heated to keep a temperature of the inner wall section $2a_2$ at 350 K.

Then, the condensation chamber 2 is let stand for three minutes under these conditions to obtain a saturation vapor of diethylene glycol (S14).

Next, a pressure within the treatment space 2b is dropped abruptly to a normal pressure (S15) to bring diethylene glycol into a supersaturation state through adiabatic expansion. Consequently, a condensation reaction of diethylene glycol takes place on the particle surface of titanium oxide, and eventually, a liquid film of diethylene glycol coats the same. Note that it only takes a few seconds until the growth of the particles reaches equilibrium since adiabatic expansion started, and the same can be said in examples described below.

Obtained as a result of the above operation are substantially regular surface improved particles, each encoated with diethylene glycol with a particle of titanium oxide as a nucleus and having a primary particle size of 1 µm.

The operation ends when the post-surface-improving-treatment particles of titanium oxide are taken out from the condensation chamber 2 (S16).

In Step 14 above, the condensation chamber 2 is let stand for a sufficiently long period of three minutes to obtain the saturation vapor state. However, the time can be shortened to one minute to a few seconds depending on the kind of the condensation liquid. The same can be said in S34 and S40 of the flowchart in FIG. 10 and S54 and S59 of the flowchart in FIG. 12, which will be described below.

EXAMPLE 2

Figure 7:
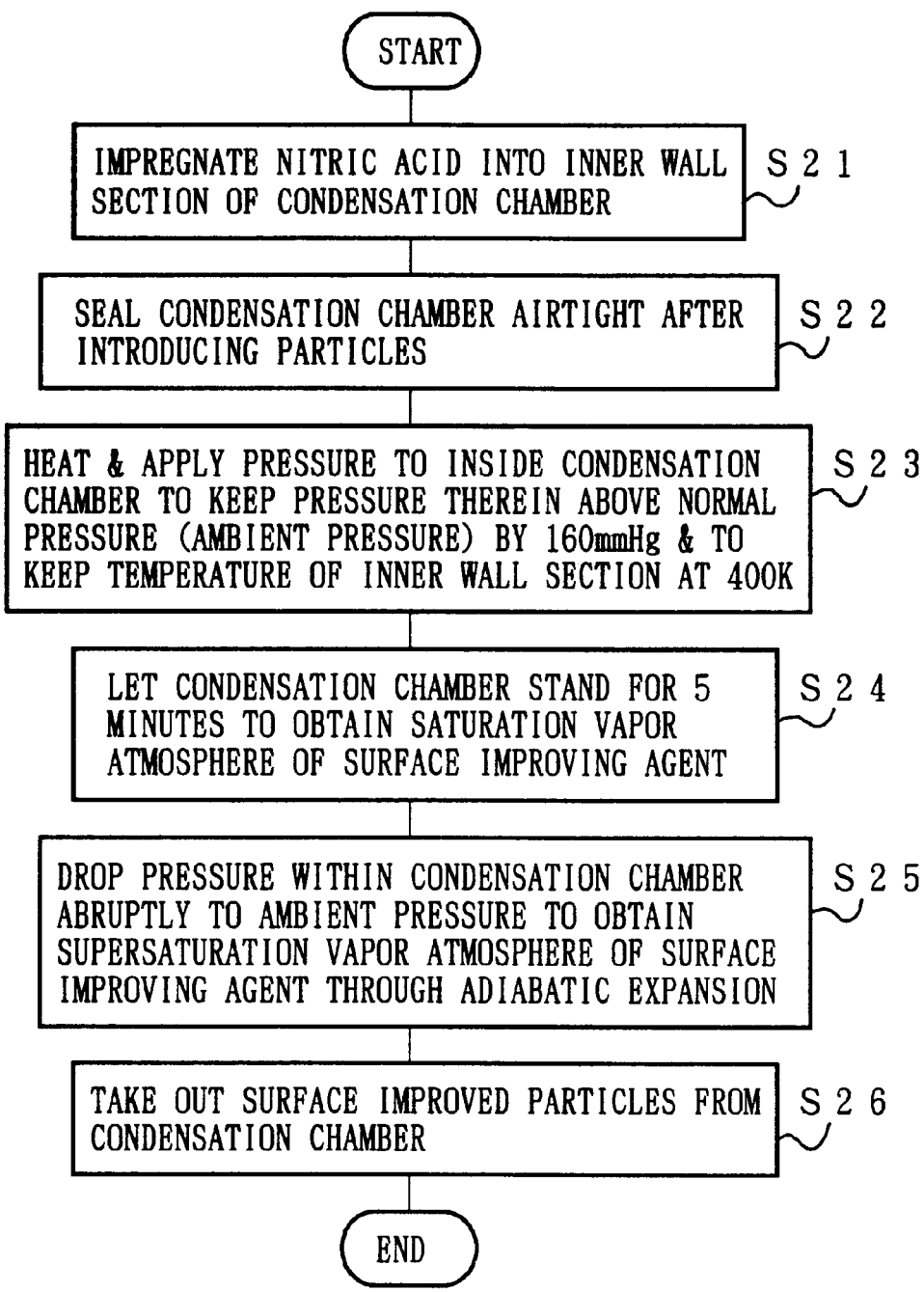
FIG. 7 is a flowchart detailing another example application of the particle surface improving method of FIG. 1.

Next, another example of the surface improving treatment carried out under predetermined condition in accordance with the present particle surface improving method will be explained with reference to the flowchart of FIG. 7. Note that actual actions in S21–S26 of the flowchart in FIG. 7 are identical with those in S1–S6 of the flowchart in FIG. 1, respectively.

To begin with, nitric acid is impregnated into the inner wall section $2a_2$ of the condensation chamber 2 as the surface improving agent 21 (S21).

Then the condensation chamber 2 is sealed airtight after particles of carbon black having a geometrical mean size of approximately 0.5 µm and a particle number concentration of $10^{11}$ pcs/m$^3$ are introduced into the treatment space 2b in the condensation chamber 2 through the particle inlet 4 (S22).

Next, to obtain a saturation vapor of nitric acid, a pressure is applied to inside the condensation chamber 2 while the same is heated inside (S23). A pressure is applied to keep a pressure within the treatment space 2b at 160 mmHg above a normal pressure (ambient pressure). Also, the condensation chamber 2 is heated to keep a temperature of the inner wall section $2a_2$ at 400 K.

Then, the condensation chamber 2 is let stand for five minutes under these conditions to obtain a saturation vapor of nitric acid (S24).

Next, a pressure within the treatment space 2b is dropped abruptly to a normal pressure (S25) to bring nitric acid into a supersaturation state through adiabatic expansion. Consequently, a condensation reaction of nitric acid takes place immediately on the particle surface of carbon black, and eventually, a liquid film of nitric acid coats the same. Then, after being allowed to stand for five minutes, the carbon black particles encoated with nitric acid are taken out from the condensation chamber 2 to end the operation (S26).

The above post-surface-improving-treatment particles of carbon black are washed well with super-pure water and dried. Then, the resulting surface improved particles of carbon black and non-treated particles of carbon black are stirred in super-pure water, and wettablility of each is evaluated. Then, the non-treatment particles do not get wet and remain on the surface of the super-pure water. In contrast, the surface improved particles get wet and dispersed or afloat in the super-pure water. This reveals that the wettability of the particles of carbon black used as a pigment is enhanced when the surface improving treatment is applied to the same in accordance with the present particle surface improving method.

As has been explained, the present particle surface improving method makes it possible to form a surface improving film on the surface of each particle 22 without taking any action such that charges the particles 22, for example, stirring the particles 22. Thus, the particles 22 are not charged during the surface improving treatment, and the resulting surface improving particles are easy to handle. Compared with a particle surface improving treatment like stirring, it take a very short time to form a surface improving film on the surface of each particle 22 by exposing the particles 22 to the supersaturation atmosphere of the surface improving agent 21 to let the surface improving agent 21 condense on the surface of each particle 22. Since the present particle surface improving method uses a simple physical phenomenon that the supersaturation atmosphere of the surface improving agent 21 is produced to expose the particles 22 to let the surface improving agent 21 condense on the surface of each particle 22. Thus, not only the present particle surface improving method can simplify its manipulation, but also the same can be carried out by a simple and inexpensive particle surface improving apparatus 1. Also, the surface improving film grows on the surface of each particle 22 to have a constant thickness due to its own surface tension, thereby making it possible to coat the particles 22 with the surface improving film of a uniform thickness.

Moreover, the present particle surface improving method uses a simple physical phenomenon of adiabatic expansion of a saturation vapor of the surface improving agent 21, so that the supersaturation atmosphere of the same can be obtained easily in a very short time. This can further speed up the surface improving treatment, and simplify both the manipulation and apparatus, as well as enhancing the productivity of the surface improved particles.

Also, since the surface improving agent 21 is compressed to obtain the saturation vapor of the same, the following adiabatic expansion of the surface improving agent 21 can be readily triggered by reducing a pressure to obtain the supersaturation atmosphere of the same.

The saturation vapor of the surface improving agent 21 is obtained efficiently by inpregnating the surface improving agent 21 into a porous material having a large surface area exposed to an atmosphere in the condensation chamber 2. Also, since the optical detecting device 3 detects the particle size of the surface improved particles immediately after the surface improving treatment, the particle size of the surface improved particles can be controlled by promptly reflecting the detection result. Also, since the optical detecting device 3 can detect the particle number concentration of the surface improved particles obtained as the result of the surface improving treatment, the productivity of the particle surface improving apparatus can be confirmed.

According to the present particle surface improving method, the particle surface is subject to chemical treatment by condensing the surface improving agent 21 thereon, so that the particle surface is improved without changing the particle size. Further, the present particle surface improving method can minimize an amount of the surface improving agent 21, thereby saving the manufacturing costs.

Embodiment 2

Figure 8:
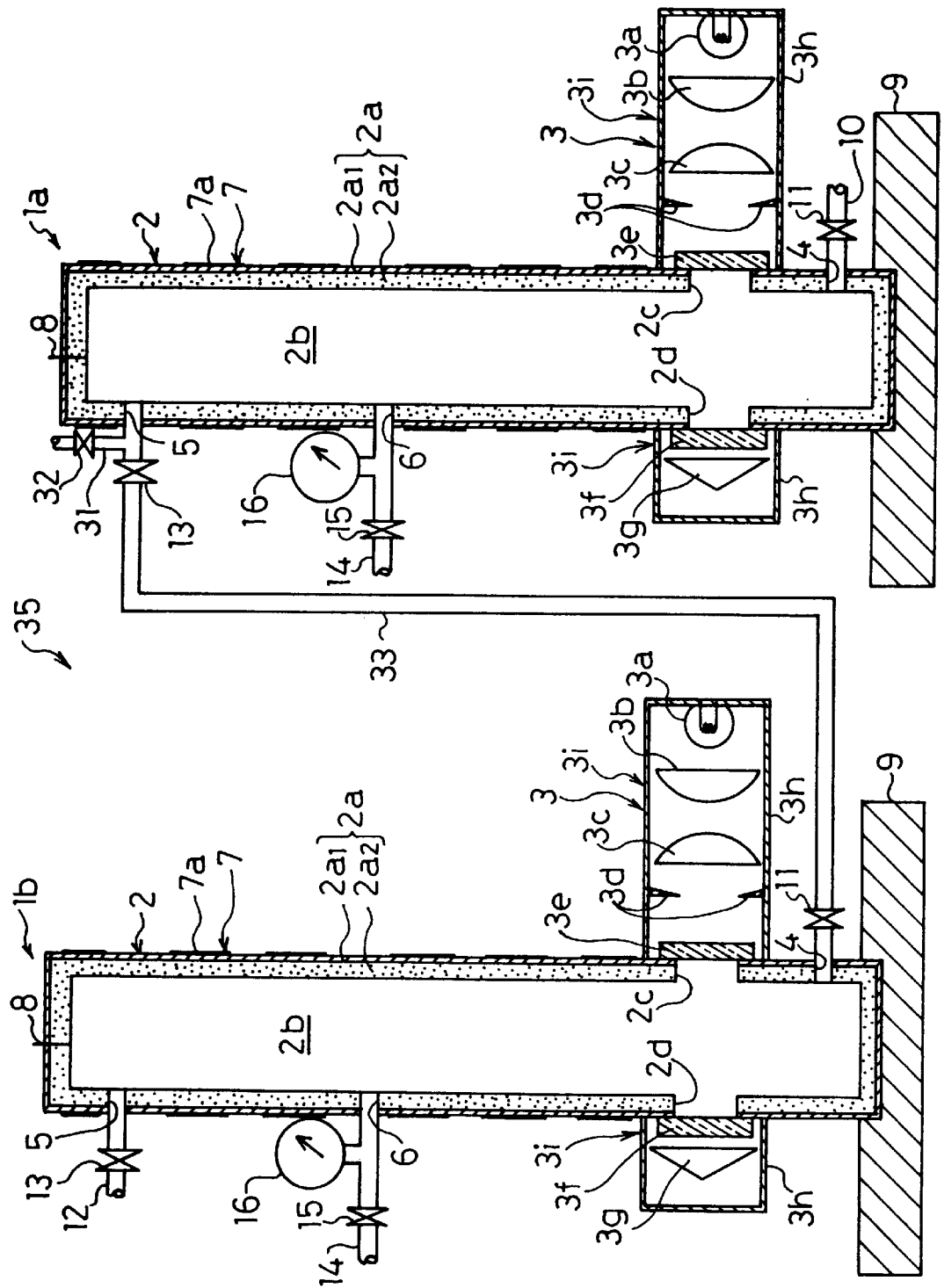
FIG. 8 is a longitudinal section of a particle surface improving system carrying out an example particle surface improving method in accordance with another embodiment of the present invention.

Referring to FIGS. 8 through 10, the following description will describe another example embodiment of the present invention. Hereinafter, like components are labeled with like reference numerals with respect to Embodiment 1, and the description of these components is not repeated for the explanation's convenience.

In a particle surface improving method of the present embodiment, the surface improving treatment is repeated several times.

As has been explained, the higher the supersaturation ratio $$\frac{P_{SS}}{P_S},$$

the thicker the liquid film of the surface improving agent 21 coating the particles 22. Thus, when larger particles 22 are desired, the surface improving agent 21 attaining a high supersaturation ratio $$\frac{P_{SS}}{P_S}$$

is preferable. However, some kinds of surface improving agents 21 can not attain a supersaturation ratio $$\frac{P_{SS}}{P_S}$$

sufficiently high to form a film of a desired thickness by applying the surface improving treatment once. On the other hand, if the supersaturation ratio $$\frac{P_{SS}}{P_S}$$

is excessively high, besides karyocondensation with the particles 22, the surface improving agent 21 undergoes akaryote self-condensation during the condensation reaction to form unwanted particles of the condensation liquid. Thus, in the present particle surface improving method, the step of obtaining a film of the surface improving agent 21 is repeated several times with the same particles 22. This makes it possible to obtain a film of the surface improving agent 21 of a desired thickness on the surface of each particle 22, or to obtain surface improved particles of a desired particle size event when the supersaturation ratio $$\frac{P_{SS}}{P_S}$$

of the surface improving agent 21 is low.

A structure carrying out the present particle surface improving method is realized by serially connecting a necessary number of the particle surface improving apparatuses 1 of FIG. 2. For example, to apply the surface improving treatment twice to the same particles 22, two particle surface improving apparatuses 1 are connected in series as is illustrated in FIG. 8.

A particle surface improving system 35 of FIG. 8 comprises a particle surface improving apparatus 1a in the first stage and a particle surface improving apparatus 1b in the second stage connected to each other. More specifically, the particle outlet 5 of the former is connected to the particle inlet 4 of the latter through a transporting pipe 33. Compared with the particle surface improving apparatus 1, the particle surface improving apparatus 1a additionally includes a releasing pipe 31 and a valve 32. The releasing pipe 31 is provided somewhere between the particle outlet 5 and valved 13 in the transporting pipe 33, and the valve 32 shuts/opens a path in the releasing pipe 31. Note that the particle surface improving system 35 does not necessarily have both the valve 13 in the particle surface improving apparatus 1a side and the valve 11 in the particle surface improving apparatus 1b side, and either can be omitted.

To apply the surface improving treatment to the particles 22 by the above particle surface improving system 35, the surface improving treatment is applied to the particles 22 by the particle surface improving apparatus 1a first. Then, the resulting surface improved particles are introduced into the particle surface improving apparatus 1b from the particle surface improving apparatus 1a to apply the surface improving treatment to the introduced particles again. The particle surface improving apparatuses 1a and 1b carry out the surface improving treatment in the same manner as was detailed by the flowchart of FIG. 1.

Note that, however, to introduce the particles 22 into the particle surface improving apparatus 1a in the form of aerosol, the valves 13 and 15 of their respective transporting pipe 33 and pressure applying/reducing pipe 14 are shut, while the values 11 and 32 of their respective transporting pipe 33 and releasing pipe 31 are opened. Under these conditions, the aerosol is introduced into the treatment space 2b through the particle inlet 4 to release air in the treatment space 2b through the particle outlet 5 via releasing pipe 31 to replace the air in the treatment space 2b with aerosol. After this replacement, the valves 11, 13, 15, and 32 are shut in the action of S2 to seal the condensation chamber 2 airtight.

To transport the surface improved particles from the particle surface improving apparatus 1a to the particle surface improving apparatus 1b, the valves 15 and 32 are shut and the valves 11 and 13 are opened in the particle surface improving apparatus 1a side, while the valve 15 is shut and the valves 11 and 13 are opened in the particle surface improving apparatus 1b side. Under these conditions, clean air is introduced into the particle surface improving apparatus 1a through its particle inlet 4, whereby the surface improved particles in the particle surface improving apparatus 1a are transported to the particle surface improving apparatus 1b. When the transportation ends, the valves 11, 13, and 15 of the particle surface improving apparatus 1b side are shut to start the surface improving treatment.

To release the final surface improved particles from the particle surface improving apparatus 1b, the valves 15 and 32 are shut and the valves 11 and 13 are opened in the particle surface improving apparatus 1a side, while the valve 15 is shut and the valves 11 and 13 are opened in the particle surface improving apparatus 1b side. Under these conditions, clean air is further introduced into the particle surface improving apparatus 1a through its particle inlet 4, whereby the clean air in the particle surface improving apparatus 1a is introduced into the particle surface improving apparatus 1b, thereby releasing the final surface improved particles from the particle surface improving apparatus 1b through its particle outlet 5.

The first surface improving treatment carried out by the particle surface improving apparatus 1a corresponds to the states illustrated in states (a) through (c) of FIG. 9, which correspond to the states (a) through (c) in FIG. 4, respectively. The second surface improving treatment carried out by the particle surface improving apparatus 1b corresponds to the states illustrated in states (d) through (f) of FIG. 9. In the second surface improving treatment, the surface improving agent 21 condenses on the film of the surface improving agent 21 that has been formed on the surfaces of the surface improved particles by the particle surface improving apparatus 1a to make the film of the surface improving agent 21 thicker. Applying the surface improving treatment to the same particles 22 repetitively in this manner can increase the particle size of the surface improved particles up to a desired level.

In the structure of FIG. 8, the surface improving treatment is applied repetitively to the same particles 22 using the two particle surface improving apparatuses 1a and 1b separately. However, the same can be done by a single particle surface improving apparatus 1 of FIG. 2. In this case, the surface improved particles released through the releasing pipe 12 are introduced into the treatment space 2b again through the introduction pipe 10.

EXAMPLE 3

Next, an example of a surface improving treatment carried out under predetermined conditions in accordance with the present particle surface improving method will be explained with reference to the flowchart of FIG. 10. Assume that a single particle surface improving apparatus 1 of FIG. 2 repeats the surface improving treatment several times. Also, note that actual actions in S31–S36 and S37–S42 of the flowchart in FIG. 10 are identical with those in S1–S6 of the flowchart in FIG. 1, respectively.

To begin with, diethylene glycol is impregnated into the inner wall section $2a_2$ made of ceramic as the surface improving agent 21 (S31).

Then, the condensation chamber 2 is sealed airtight after particles of polystyrene latex having a primary particle size of approximately 40 nm and a particle number concentration of $10^{11}$ pcs/m$^3$ are introduced into the treatment space 2b in the condensation chamber 2 through the particle inlet 4 (S32).

Next, to obtain a saturation vapor of diethylene glycol, a pressure is applied to inside the condensation chamber 2 while the same is heated inside (S33). A pressure is applied to keep a pressure within the treatment space 2b at 160 mmHg above a normal pressure (ambient pressure). Also, the condensation chamber 2 is heated to keep a temperature of the inner wall section $2a_2$ at 350 K.

Then, the condensation chamber 2 is let stand for three minutes under these conditions to obtain a saturation vapor of diethylene glycol(S34).

Next, a pressure within the treatment space 2b is dropped abruptly to a normal pressure (S35) to bring diethylene glycol into a supersaturation state through adiabatic expansion. As a result, a condensation reaction of diethylene glycol takes place on the particle surface of polystyrene latex, and eventually, a liquid film of diethylene glycol coats the same. Obtained as a result of the above operation are substantially regular surface improved particles, each encoated with diethylene glycol with a particle of polystyrene latex as a nucleus and having a primary particle size of 1 μm.

Subsequently, the post-surface-improving-treatment particles of polystyrene latex are taken out from the condensation chamber 2 (S36).

Then, diethylene glycol is impregnated into the inner wall section $2a_2$ made of ceramic as the surface improving agent 21 (S37).

Subsequently, the condensation chamber 2 is sealed airtight after the above surface improved particles are introduced into the treatment space 2b of the particle surface improving apparatus 1 again (S38)

In following S39–S42, the same actions in S33–S36 are repeated, respectively. Then, obtained as a result of the above operation are substantially regular surface improved particles, each encoated with diethylene glycol with a particle of polystyrene latex as a nucleus and having a primary particle size of 2 μm.

Embodiment 3

Referring to FIG. 11, the following description will describe a further example embodiment of the present invention.

In a particle surface improving method of the present embodiment, the surface improving treatment is applied repetitively to the particles 22 several times, and at least two kinds of surface improving agents 21 are used respectively in separate treatments. Such a repetitive surface improving treatment can render a plurality of functions to the same particles 22 depending on the kinds of the surface improving agents 21.

To carry out the present particle surface improving method, for example, the particle surface improving system 35 of FIG. 8 is used. The particle surface improving system 35 can apply the surface improving treatment twice to the same particles 22 using two kinds of surface improving agents 21 respectively in each treatment. When the particle surface improving system 35 carries out the present particle surface improving method, different kinds of surface improving agents 21 are impregnated into the inner wall sections $2a_2$ of the particle surface improving apparatuses 1a and 1b, respectively. Other actions are identical with actions detailed in Embodiment 2 with reference to FIG. 8.

When the above repetitive surface improving treatment is carried out by the particle surface improving system 35 using two kinds of surface improving agents 21a and 21b respectively in each treatment, the first surface improving treatment carried out by the particle surface improving apparatus 1a corresponds to the states illustrated in states (a) through (c) of FIG. 11, which correspond to the states illustrated in the states (a) through (c) of FIG. 4, respectively. As a result of the first treatment, a film of the surface improving agent 21a is formed on the surface of each particle 22 as is illustrated in the state of FIG. 11.

The second surface improving treatment carried out by the particle surface improving apparatus 1b corresponds to the states illustrated in states (d) through (f) of FIG. 11. As a result of the second treatment, a film of the surface improving agent 21b is layered on the film of the surface improving agent 21a coating the surface improved particles. Thus, when different kinds of surface improving agents 21 are used in the repetitive surface improving treatment, the resulting surface improved particles can render various functions depending on the kinds of the surface improving agents 21, thereby upgrading the performance of the particles 22. In addition, the film of each surface improving agent 21 can be increased in thickness and the particles 22 can be increased up to a desired particle size.

When more than two kinds of surface improving agents 21 are used, as many particle surface improving apparatuses 1 as the kinds of the surface improving agents 21 are connected in series. Alternatively, more than one kind of surface improving agent 21 may be impregnated into the inner surface section $2a_2$ of a single particle surface improving apparatus 1, so that a film of mixed ingredients of the surface improving agents 21 is formed on the surface of each particle 22 by carrying out the surface improving treatment once. Using more than one kind of surface improving agent 21 concurrently can trigger a chemical reaction of the surface improving agents 21 and a surface material of the particles 22.

EXAMPLE 4

Figure 12:
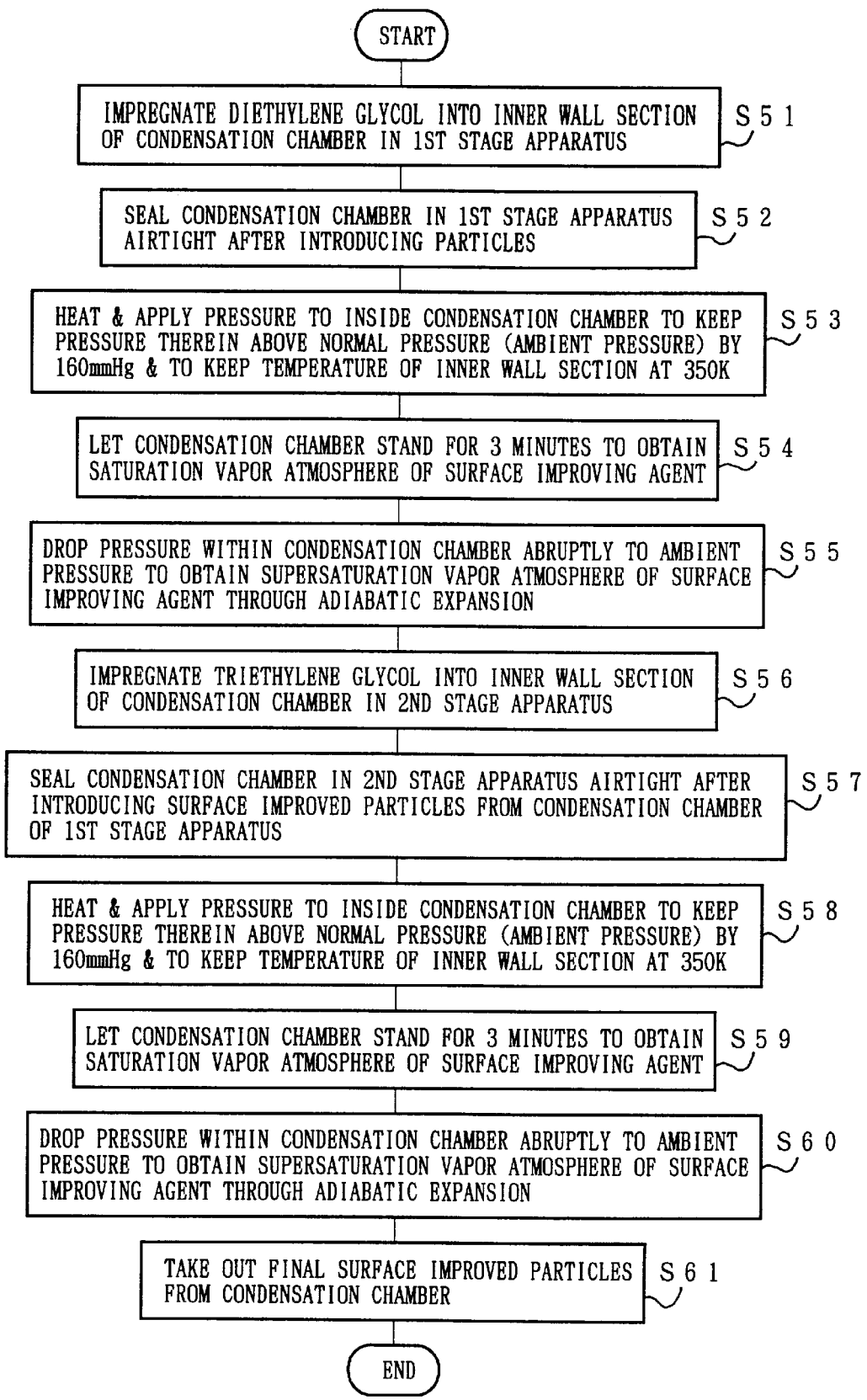
FIG. 12 is a flowchart detailing an example application of the particle surface improving method for the surface improving treatment of FIG. 11.

Next, an example of the surface improving treatment carried out under predetermined conditions in accordance with the present particle surface improving method will be explained with reference to the flowchart of FIG. 12. Note that actual actions in S51–S55 and S56–S61 of the flowchart in FIG. 12 are identical with those in S1–S5 and S1–S6 of the flowchart in FIG. 1, respectively, which are identical with those in S31–S35 and S37–S42 of the flowchart in FIG. 10, respectively.

To begin with, diethylene glycol is impregnated into the inner wall section $2a_2$ of the apparatus in the first stage, namely, the particle surface improving apparatus 1a, as the surface improving agent 21a (S51).

Then, the condensation chamber 2 is sealed airtight after particles of polystyrene latex having a primary particle size of approximately 40 nm and a particle number concentration of $10^{11}$pcs/m$^3$ are introduced into the treatment space 2b in the condensation chamber 2 through the particle inlet 4 (S52).

Next, to obtain a saturation vapor of diethylene glycol, a pressure is applied to inside the condensation chamber 2 while the same is heated inside (S53). A pressure is applied to keep a pressure within the treatment space 2b at 160 mmHg above a normal pressure (ambient pressure). Also, the condensation chamber 2 is heated to keep a temperature of the inner wall section $2a_2$ at 350 K.

Then, the condensation chamber 2 is let stand for three minutes under these conditions to obtain a saturation vapor of diethylene glycol (S54).

Next, a pressure within the treatment space 2b is dropped abruptly to a normal pressure (S55) to bring diethylene glycol into a supersaturation state through adiabatic expansion. Consequently, a condensation reaction of diethylene glycol takes place immediately on the particle surface of polystyrene latex, and eventually, a liquid film of diethylene glycol coats the same. Obtained as a result of the above operation are substantially regular surface improved particles, each encoated with diethylene glycol with a polystyrene latex particle as a nucleus and having a primary particle size of 1 μm.

Then, triethylene glycol is impregnated into the inner wall section $2a_2$ of the apparatus in the second stage, namely the particle surface improving apparatus 1b, as the surface improving agent 21b (S56).

Subsequently, the condensation chamber 2 is sealed airtight after the above surface improved particles are introduced into the treatment space 2b through the particle inlet 4 in the particle surface improving apparatus 1b side (S57).

In following S58–S60, the actions in S53–S56 are repeated, respectively. Obtained as a result are substantially regular surface improved particles, each encoated with a double-layer film of diethylene glycol on the bottom and triethylene glycol on the top with a polystyrene latex particle as nucleus and having primary particle size of 4 μm.

The operation ends when the final surface improved particles are taken out from the particle surface improving apparatus 1b through the particle outlet 5 (S61).

In the above particle surface improving method, the surface improving agent 21b is impregnated into the inner wall section $2a_2$ of the particle surface improving apparatus 1b in the second stage in S56. However, this step may be carried out concurrently with Step 51, where the surface improving agent 21a is impregnated into the inner wall section $2a_2$ of the particle surface improving apparatus 1a in the first stage. In this case, S57 is carried out after S55.

Embodiment 4

Referring to FIGS. 13 through 21, the following description will describe still another example embodiment of the present invention. Hereinafter, like components are labeled with like reference numerals with respect to Embodiments 1 through 3, and the description of these components is not repeated for the explanation's convenience.

Figure 13:
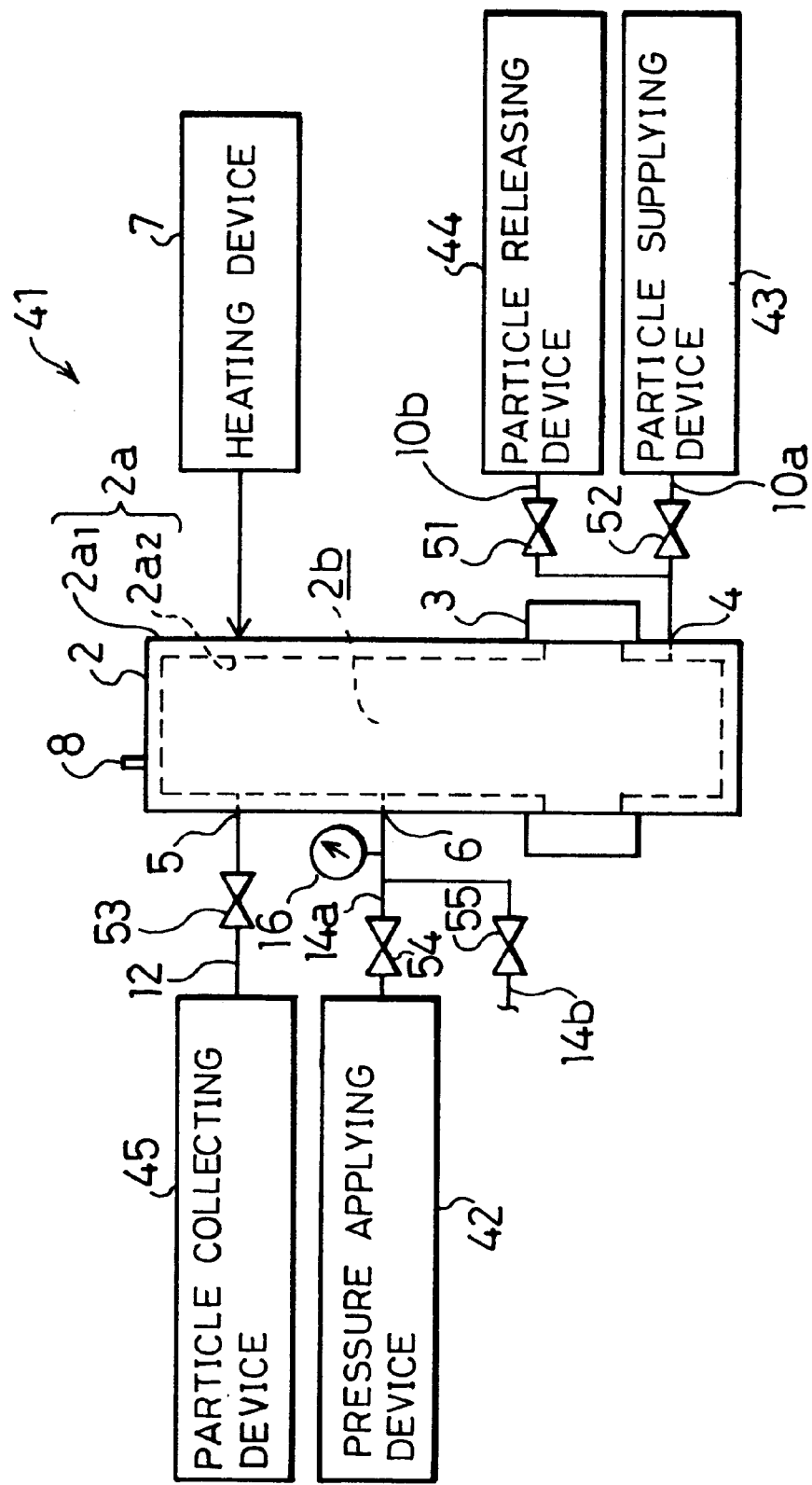
FIG. 13 is a view depicting an entire structure of an example particle surface improving apparatus in accordance with still another embodiment of the present invention.

A particle surface improving apparatus of the present embodiment can automatically carry out any of the above-explained particle surface improving methods. As is depicted in FIG. 13, a particle surface improving apparatus 41 comprises the condensation chamber 2, optical detecting device 3, heating device 7, thermometer 8, pressure gauge 16, a pressure applying device 42, a particle supplying device 43, a particle releasing device 44, a particle collecting device 45, and five electromagnetic valves 51–55. The particle surface improving apparatus 41 corresponds to the particle surface improving apparatus 1 of FIG. 2.

The pressure applying device 42 sends clean air into the treatment space 2b in the condensation chamber 2 to apply the pressure to the treatment space 2b. The pressure applying device 42 is connected to the pressure applying/reducing opening 6 of the condensation chamber 2 by means of a pressure applying pipe 14a through the electromagnetic valve 54. A pressure reducing pipe 14b, to which the electromagnetic valve 55 is provided, is branched from the pressure applying pipe 14a somewhere between the electromagnetic valve 54 and pressure applying/reducing opening 6.

The particle releasing device 44 releases the surface improved particles from the treatment space 2b through the particle outlet 5 by sending clean air into the treatment space 2b. The particle releasing device 44 is connected to the particle inlet 4 of the condensation chamber 2 by means of an introduction pipe 10b through the electromagnetic valve 51. The introduction pipe 10b is branched from an introduction pipe 10a somewhere between the electromagnetic valve 52 and particle inlet 4.

The particle collecting device 45 collects the surface improved particles released from the treatment space 2b through the particle outlet 5. The particle collecting device 45 is connected to the particle outlet 5 by means of the releasing pipe 12 through the electromagnetic valve 53.

In the present particle surface improving apparatus 41, the particle supplying device 43, introduction pipe 10a, electromagnetic valve 52, particle inlet 4, particle outlet 5, and electromagnetic valve 53 constitute particle supplying means. Also, the particle releasing device 44, introduction pipe 10b, electromagnetic valve 51, particle inlet 4, particle outlet 5, and electromagnetic valve 53 constitute particle releasing means. In addition, the heating device 7, pressure applying device 42, electromagnetic valves 54 and 55, pressure applying pipe 14a, pressure reducing pipe 14b, and pressure applying/reducing opening 6 constitute adjusting means.

The particle supplying device 43 supplies the particles 22 in the form of aerosol into the treatment space 2b in the condensation chamber 2. The particle supplying device 43 is connected to the particle inlet 4 of the condensation chamber 2 by means of the introduction pipe 10a through the electromagnetic valve 52.

Figure 14:
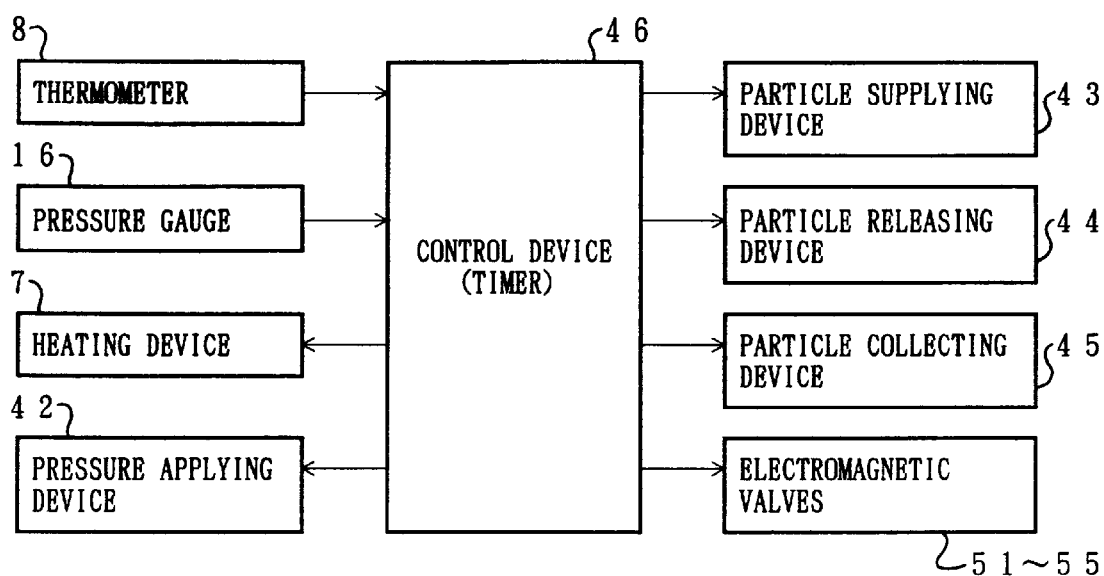
FIG. 14 is a block diagram depicting a structure of control mechanism provided in the particle surface improving apparatus of FIG. 13.

The particle surface improving apparatus 41 includes a control device 46 depicted in FIG. 14, to which the thermometer 8, pressure gauge 16, heating device 7, pressure applying device 42, particle supplying device 43, particle releasing device 44, particle collecting device 45, and electromagnetic valves 51–55 are connected. The control device 46 includes a timer inside and controls the overall operation of the surface improving treatment by the particle surface improving apparatus 41.

Next, the surface improving treatment carried out by the particle surface improving apparatus 41 will be explained with reference to the flowchart of FIG. 15. Note that each action is carried out under the control of the control device 46, and that the surface improving treatment is applied to the particles 22 once herein as is detailed by the flowchart of FIG. 1.

To begin with, a predetermined surface improving agent 21 is impregnated into the inner wall section $2a_2$ of the condensation chamber 2 (S71). The surface improving agent 21 is supplied to the inner wall section $2a_2$ manually by an operator or automatically by providing a supplying device.

Next, the heating device 7 is activated to heat the condensation chamber (S72). During this step, the control device 46 controls the heating device 7 to keep the inner wall section $2a_2$ at a predetermined temperature based on a temperature detected by the thermometer 8.

Next, the electromagnetic valves 52 and 53 are opened while the particle supplying device 43 is activated to introduce the particles 22 into the treatment space 2b in the condensation chamber 2 from the particle supplying device 43 (S73). Then, after air in the treatment space 2b is replaced with the aerosol (particles 22), the electromagnetic valves 52 and 53 are shut to stop the particle supplying device 43 (S74), whereby the condensation chamber 2 is sealed airtight. The timing of shutting the electromagnetic valves 52 and 53 and stopping the particle supplying device 43 can be set by measuring the time since the introduction of the aerosol into the treatment space 2*b* started using the timer.

Next, the electromagnetic valve 54 is opened while the pressure applying device 42 is activated, so that clean air will be flown into the treatment space 2*b* from the pressure applying device 42 to apply a pressure (S75). During this step, the control device 46 controls the pressure applying device 42 to keep a pressure within the treatment space 2*b* at a predetermined level above a normal pressure (ambient pressure) by a certain pressure units based on a pressure detected by the pressure gauge 16.

Next, when the pressure within the treatment space 2*b* reaches the above predetermined level pressure, the electromagnetic valve 54 is shut and heating device 42 is stopped (S76), whereby the condensation chamber 2 is sealed airtight. Then, the condensation chamber 2 is let stand under these conditions to obtain a saturation vapor of the surface improving agent 21 (S77) . The time for standing varies with the kinds of the surface improving agents 21; however, an average time is approximately one minute and the time for standing is measured by the timer.

Next, the electromagnetic valve 55 is opened to drop the pressure within the treatment space 2b to a normal pressure to obtain a supersaturation state of the surface improving agent 21 through adiabatic expansion of the saturation vapor of the same (S78). Then, the electromagnetic valve 55 is shut and the condensation chamber 2 is allowed to stand until the particle growth reaches equilibrium, that is, a film of the surface improving agent 21 of a uniform thickness is formed on the surface of each particle 22 (S79).

Next, the optical detecting device 3 is activated to measure the particle number concentration and particle size of the surface improved particles in the treatment space 2b (S80). The optical detecting device 3 is stopped when the measuring ends (S81).

Subsequently, the electromagnetic valves 51 and 53 are opened while the particle releasing device 44 is activated to send clean air into the treatment space 2b by the particle releasing device 44. Consequently, the surface improved particles in the treatment space 2b are sent to the particle collecting device 45 through the particle outlet 5 and collected therein. Also, air in the treatment space 2b is replaced with clean air, at which the operation ends (S82).

Figure 16:
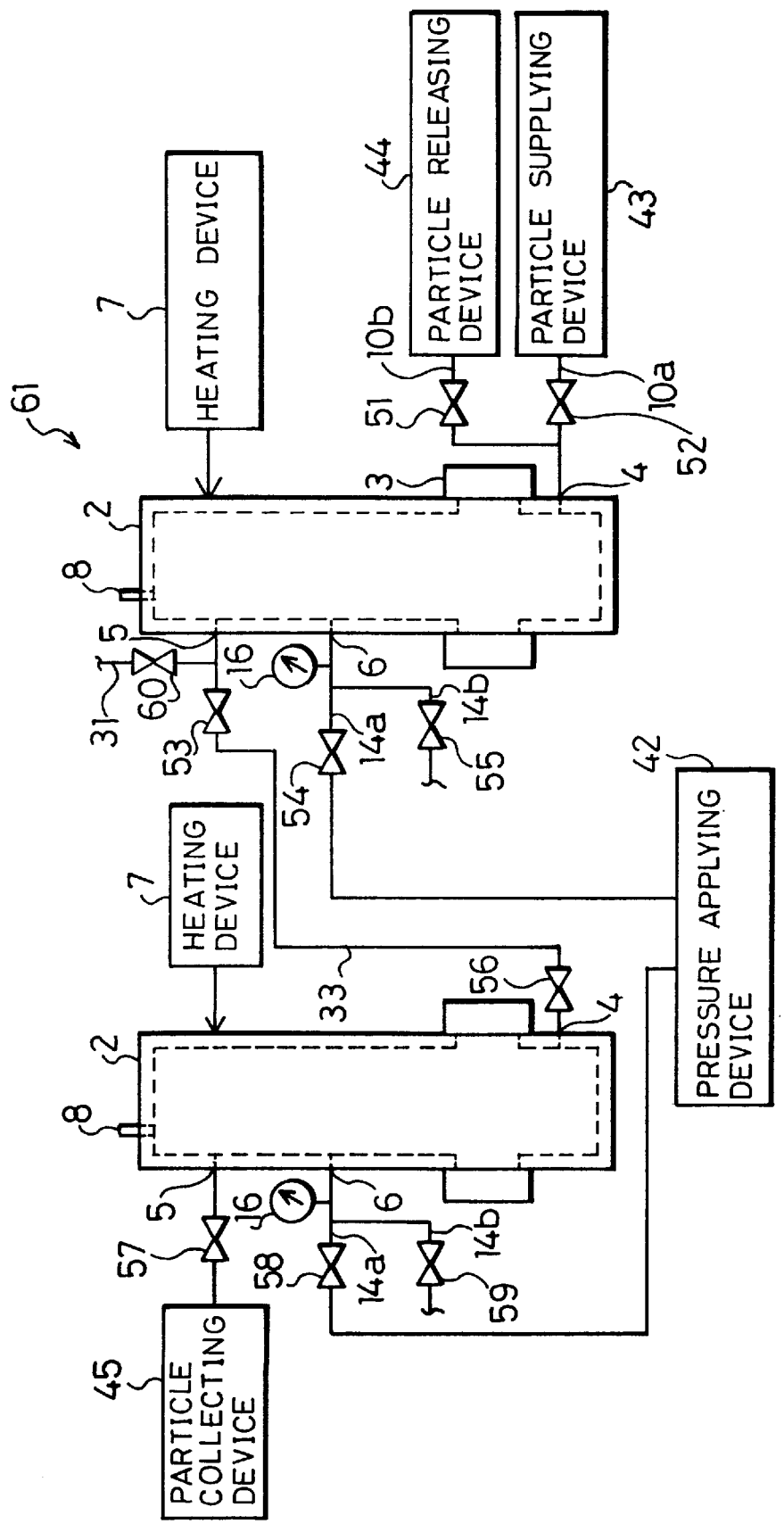
FIG. 16 is a view explaining an entire structure of another example particle surface improving apparatus of FIG. 13.

Next, FIG. 16 shows a particle surface improving system which can automatically repeat the surface improving treatment several times with the same particles 22. A particle surface improving system 61 can repeat the surface improving treatment twice successively with the same particles 22, and corresponds to the particle surface improving system 35 of FIG. 8.

In the particle surface improving system 61, the particle outlet 5 of the condensation chamber 2 in the first stage is connected to the particle inlet 4 of the condensation chamber 2 in the second stage through the transporting pipe 33. The pressure applying device 42 is shared by the apparatuses in both the first and second stages. Also, the electromagnetic valves 56–59 are provided to the condensation chamber 2 in the second stage side in the same manner as are in the first stage. Note that the transportation pipe 33 does not necessarily include both the electromagnetic valves 53 and 56, and either can be omitted.

Figure 17:
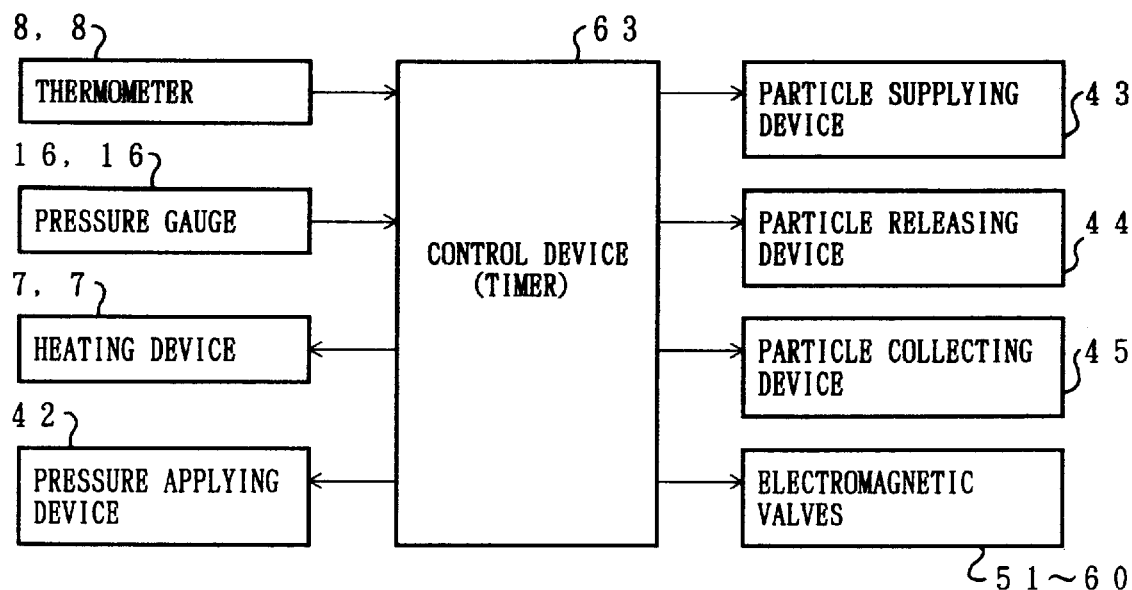
FIG. 17 is a block diagram depicting a structure of control mechanism provided in the particle surface improving system of FIG. 16.

Also, the control mechanism of the particle surface improving system 61 is depicted in FIG. 17, in which a control device 63 is provided.

When the surface improving treatment is repeated twice with the same particles 22 using the same kind of surface improving agent 21, the particle surface improving system 61 operates in accordance with the flowcharts of FIGS. 18 and 19.

More specifically, the same kind of surface improving agent 21 is impregnated into the inner wall sections $2a_2$ of the condensation chambers 2 in both the first and second stages (S91). Following S92–S101 are carried out in the condensation chamber 2 in the first stage, which are identical with S72–S81 of the flowchart in FIG. 15. However, it is the valves 52 and 60 that are opened to introduce the particles 22 into the condensation chamber 2 in the first stage.

When the surface improved particles are produced in the condensation chamber 2 in the first stage in S101, the electromagnetic valves 51 and 53 of the condensation chamber 2 in the first stage side and the electromagnetic valves 56 and 57 of the condensation chamber 2 in the second stage side are opened, while the particle releasing device 44 is activated. Then, clear air starts to flow into the treatment space 2b in the condensation chamber 2 in the first stage, whereby the surface improved particles in the treatment space 2b in the condensation chamber 2 in the first stage are sent into the treatment space 2b in the condensation chamber 2 in the second stage through the particle outlet 5 in the first stage (S102). After the action of S102 is started, the condensation chamber 2 in the second stage is heated (S103).

Next, when the action of S102 ends, the electromagnetic valves 56 and 57 are shut to seal the condensation chamber 2 in the second stage airtight (S104). Following S105–S111 are carried out in the condensation chamber 2 in the second stage, which are identical with S95–S101 of the flowchart in FIG. 18, respectively, and hence, S75–S81 of the flowchart in FIG. 15, respectively.

When the action of S111 ends, the electromagnetic valves 56 and 57 are opened, while the particle releasing device 44 is activated. Then, clean air flows further into the treatment space 2b in the condensation chamber 2 in the first stage, whereby the surface improved particles in the treatment space 2b in the condensation chamber 2 in the second stage are sent into the particle collecting device 45 through the particle outlet 5 in the second stage and collected therein. Also, air in the treatment space 2b in the condensation chamber 2 in the second stage is replaced with clean air, at which the operation ends (S112).

Figure 20:
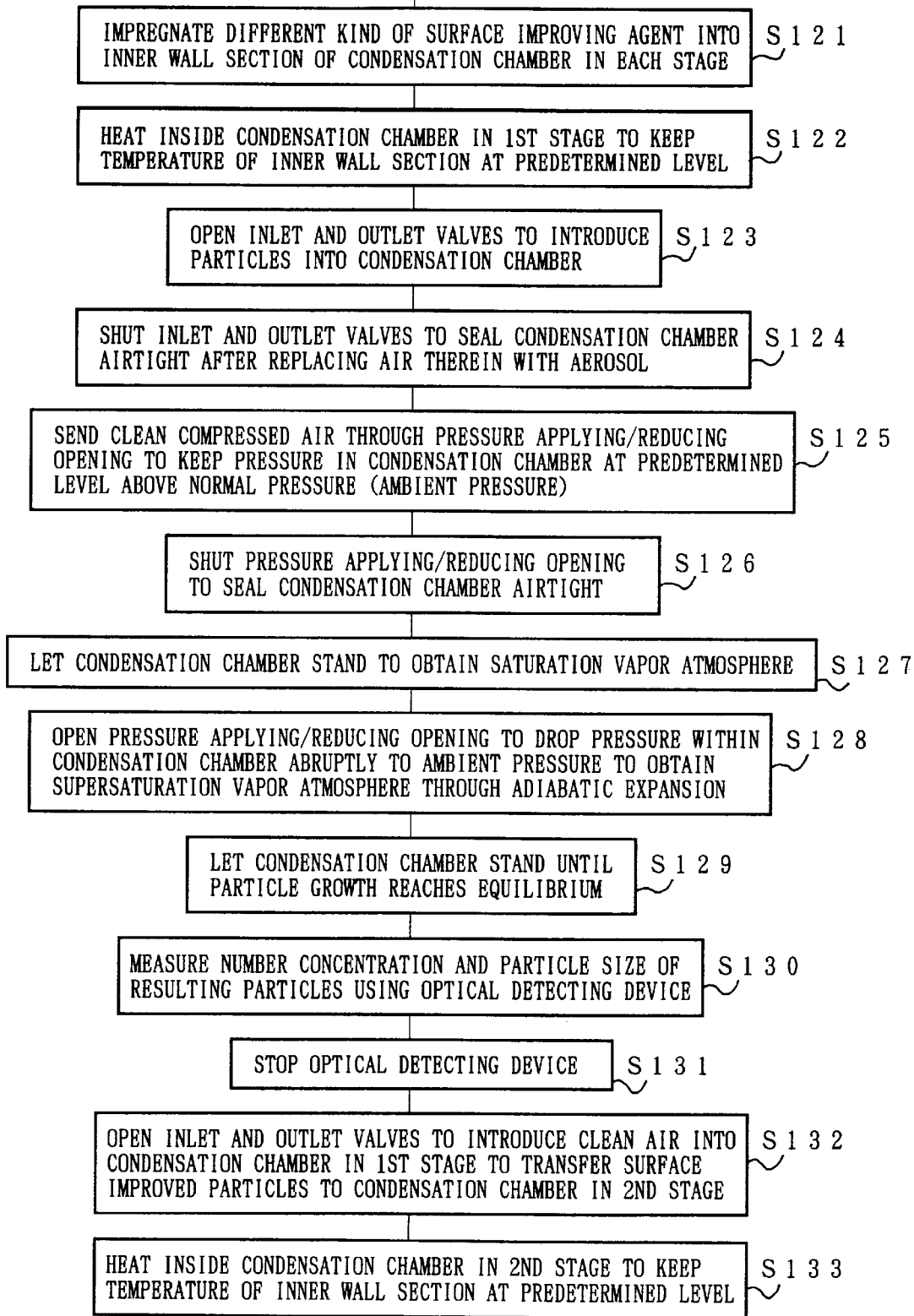
FIG. 20 is a flowchart detailing another example surface improving treatment carried out by the particle surface improving system of FIG. 16.

When the surface improving treatment is repeated twice with the same particles 22 using two kinds of surface improving agents 21a and 21b respectively in each treatment, the particle surface improving system 61 operates in accordance with the flowchart of FIGS. 20 and 21.

More specifically, the surface improving agent 21a is impregnated into the inner wall section $2a_2$ of the condensation chamber 2 in the first stage, while the other surface improving agent 21b is impregnated into the inner wall sections $2a_2$ of the condensation chamber 2 in the second stage (S121). Following S122–S142 are identical with S92–S112 of the flowchart in FIGS. 18 and 19, respectively.

Embodiment 5

Referring to FIGS. 22 through 27, the following description will describe still another example embodiment of the present invention. Hereinafter, like components are labeled with like reference numerals with respect to Embodiments 1 through 4, and the description of these components is not repeated for the explanation's convenience.

Figure 22:
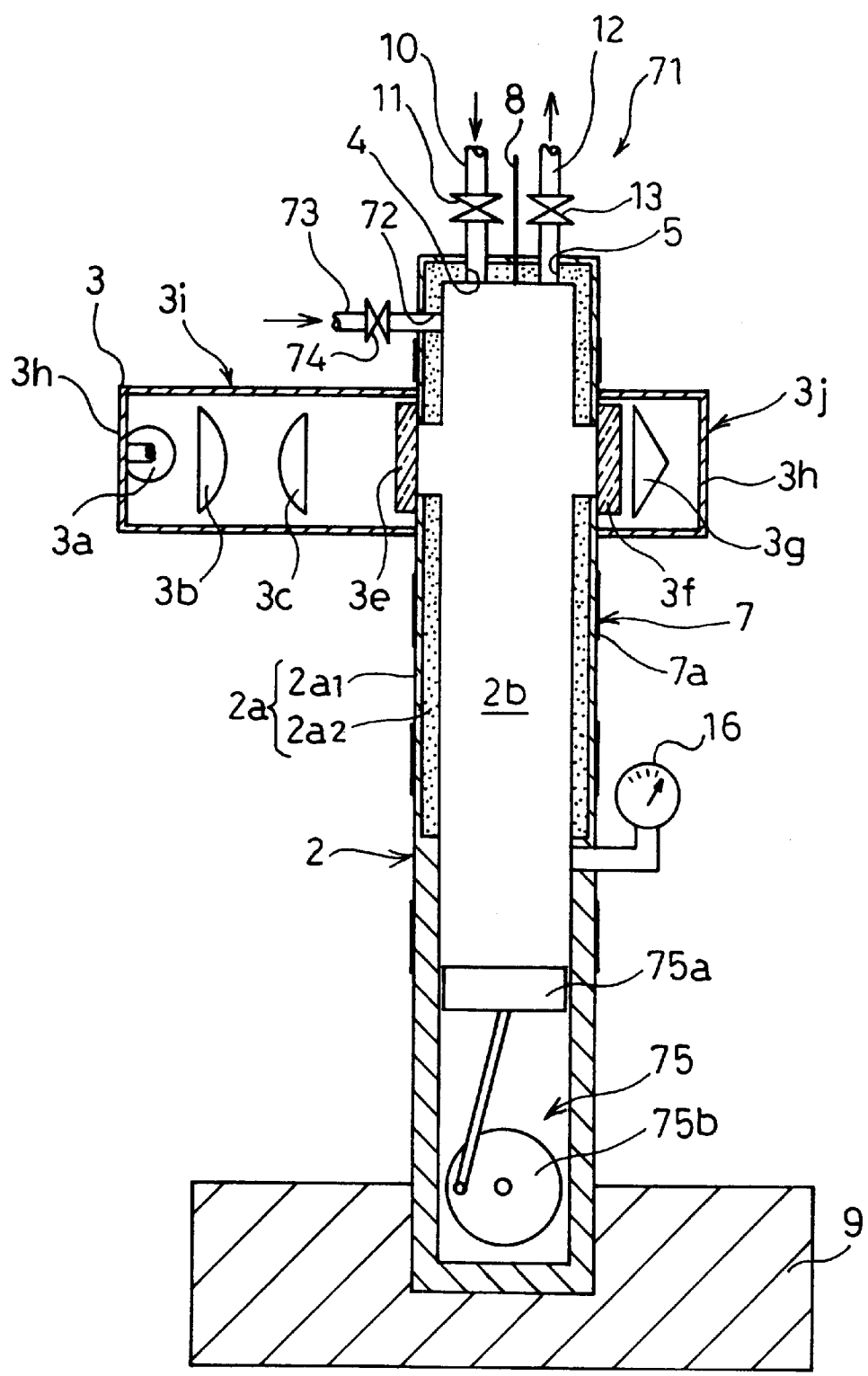
FIG. 22 is a longitudinal section of an example particle surface improving apparatus carrying out an example particle surface improving method in accordance with still another embodiment of the present invention.
Figure 23:
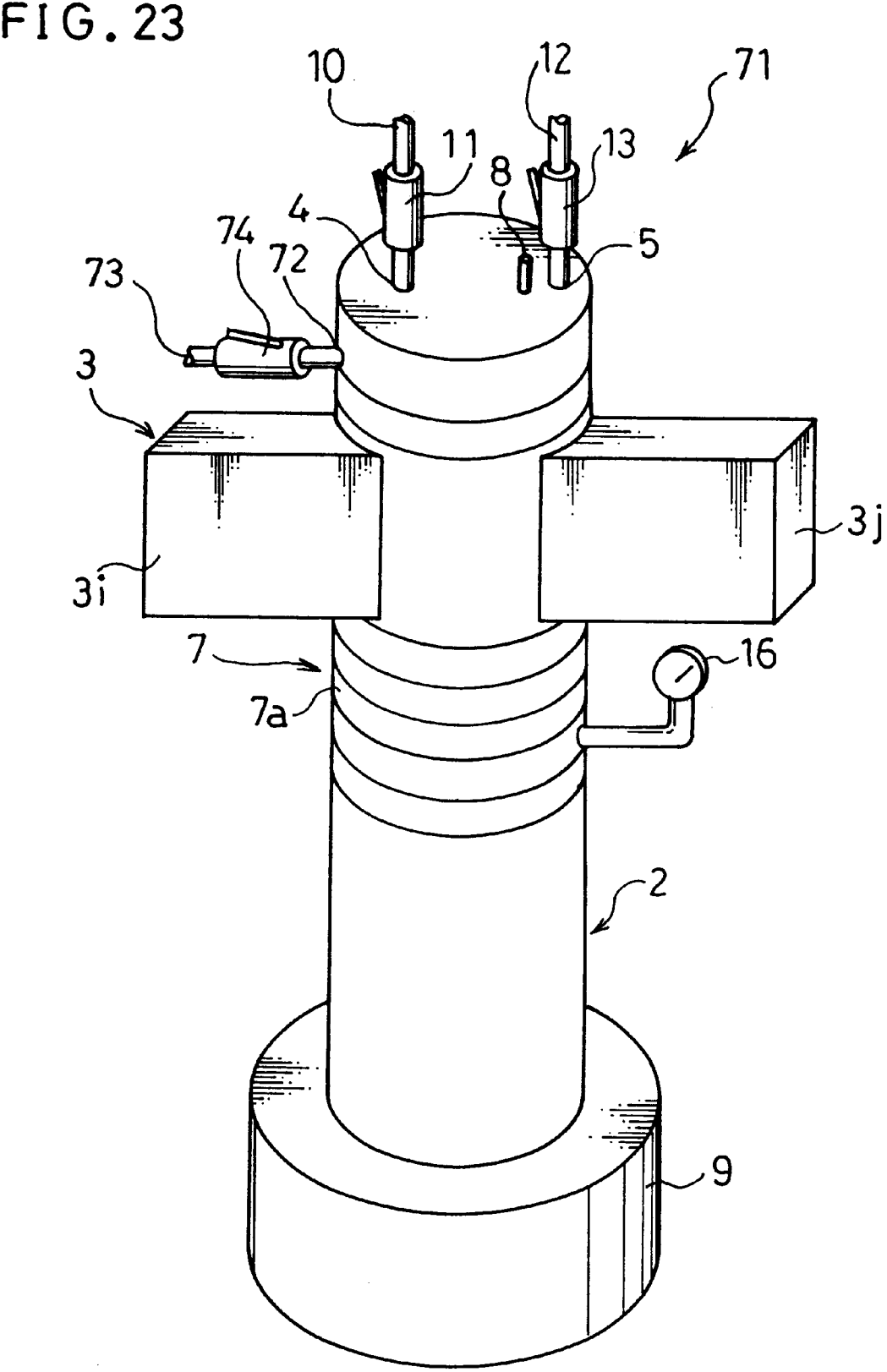
FIG. 23 is a perspective view of the particle surface improving apparatus of FIG. 22.

A particle surface improving apparatus 71 carrying out a particle surface improving method of the present embodiment is of a structure depicted in FIGS. 22 and 23. FIG. 22 is a longitudinal cross section and FIG. 23 is a perspective view of the particle surface improving apparatus 71. The present particle surface improving apparatus 71 includes a pressure applying/reducing device 75 for increasing or reducing a pressure within the condensation chamber 2 in the lower part thereof. Thus, the optical detecting device 3, particle inlet 4, and a surface improving agent inlet 72 are provided in the upper part of the condensation chamber 2 and the pressure applying/reducing opening 6 is omitted herein.

The surface improving agent inlet 72 is made through for introducing the surface improving agent 21 into the condensation chamber 2, and an introduction pipe 73, which includes a valve 74, is fit into the surface improving agent inlet 72.

The pressure applying/reducing device 75 includes a piston 75a, a crank shaft 75b, and an unillustrated driving device driving the crank shaft 75b.

It is preferable that the entire surface of the condensation chamber 2 enclosing the treatment space 2b, namely, the inner wall section $2a_2$, is made of a porous material to enhance efficiency in the evaporation of the surface improving agent 21 of any kind. However, since the condensation chamber 2 of the present particle surface improving apparatus 71 includes the pressure applying/reducing device 75 having the piston 75a in its lower part, the porous inner wall section $2a_2$ in the lower part is replaced with the metal outer wall section $2a_1$. The particle surface improving apparatus 71 is of the same structure as the particle surface improving apparatus 1 except for the above arrangement.

Figure 24:
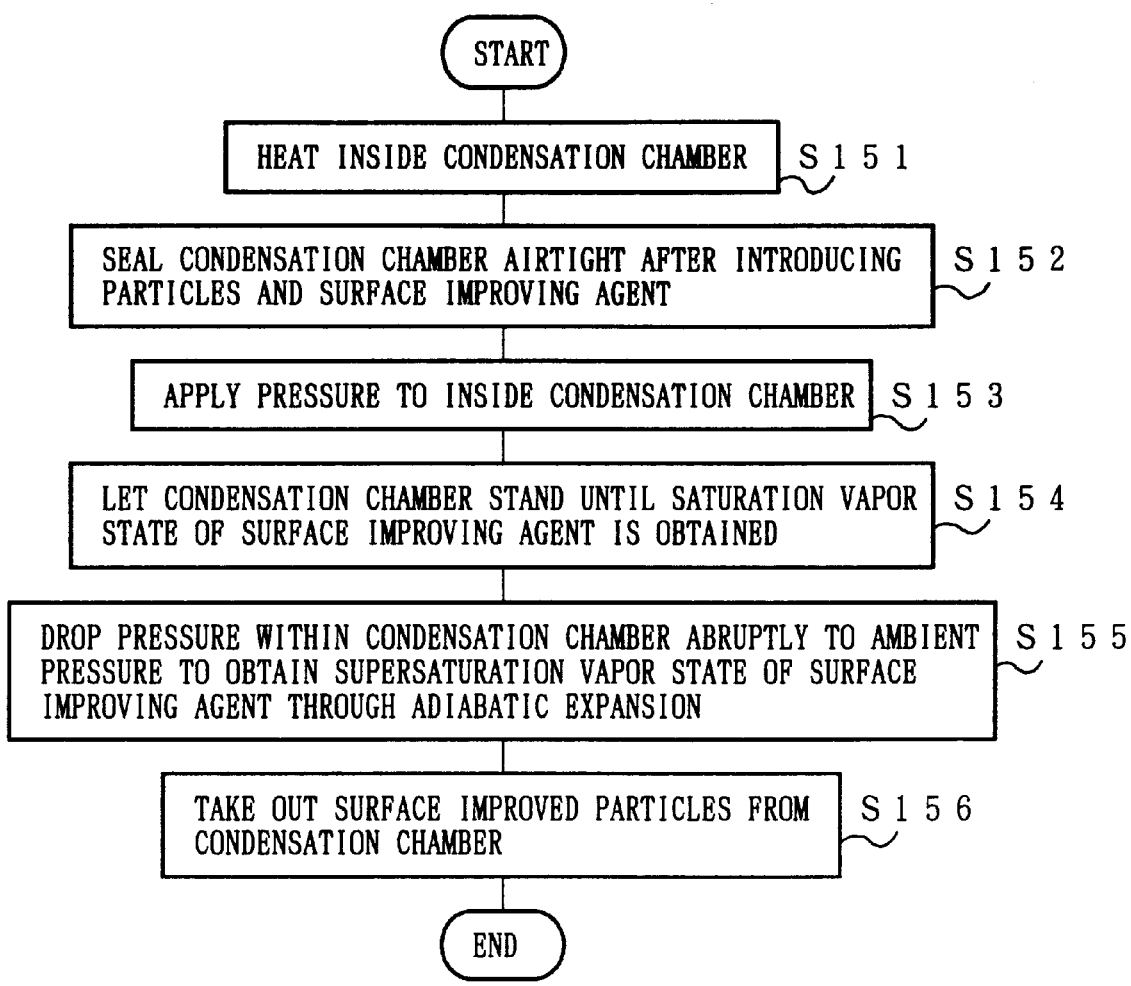
FIG. 24 is a flowchart detailing an example particle surface improving method carried out by the particle surface improving apparatus of FIG. 22.

Next, the particle surface improving method carried out by the particle surface improving apparatus 71 will be explained with reference to the flowchart of FIG. 24.

To begin with, the valves 11 and 72 are opened and the valve 13 is shut to bring the piston 75a to the upper dead-center position, while the condensation chamber 2 is heated inside by the heating device 7 to keep a temperature therein at a predetermined level (S151). As previously mentioned, the above heating action is an auxiliary action to the pressure applying action with respect to the condensation chamber 2. The condensation chamber 2 is heated before the particles 22 subject to surface improvement and surface improving agent 21 are introduced into the same, because by so doing, the surface improving treatment can be accelerated.

Next, the particles 22 subject to the surface improvement are supplied through the particle inlet 4, for example, in the form of aerosol, while the surface improving agent 21 is provided through the surface improving agent inlet 72, for example, in the form of mist, and the piston 75a of the pressure applying/reducing device 75 is lowered to the lower dead-center position. Accordingly, both the particles 22 and surface improving agent 21 are introduced into the treatment space 2b in the condensation chamber 2. As soon as the piston 75a is lowered, the valves 11 and 72 are shut to seal the condensation chamber 2 airtight (S152).

Next, a pressure is applied to inside the condensation chamber 2 to obtain a saturation vapor state of the surface improving agent 21 in the treatment space 2b by raising the piston 75a to a predetermined position. Herein, a pressure within the treatment space 2b is increased to a predetermined level above a normal pressure (ambient pressure) (S153). Note that the surface improving agent 21 is heated while the pressure is being applied.

Subsequently, the condensation chamber 2 is let stand until a saturation vapor of the surface improving agent 21 is obtained (S154). In short, the condensation chamber 2 is left in the above conditions.

Next, a pressure within the treatment space 2b is dropped abruptly to a normal pressure to bring the saturation vapor of the surface improving agent 21 into a supersaturation state by lowering the piston 75a to the lower dead-center position abruptly (S155). Accordingly, as previously mentioned, a condensation reaction of the surface improving agent 21 starts on the surface of each particle 22, and eventually, a liquid film of the surface improving agent 21 coats the same.

Then, the post-surface-improving-treatment particles 22 in the treatment space 2b, namely, the surface improved particles, are taken out from the condensation chamber 2 to end the operation (S156). To do so, the valve 13 is opened while the valves 11 and 74 are kept shut, and the piston 75a is raised to the upper dead-center position from the lower dead-center position under these conditions.

EXAMPLE 5

Figure 25:
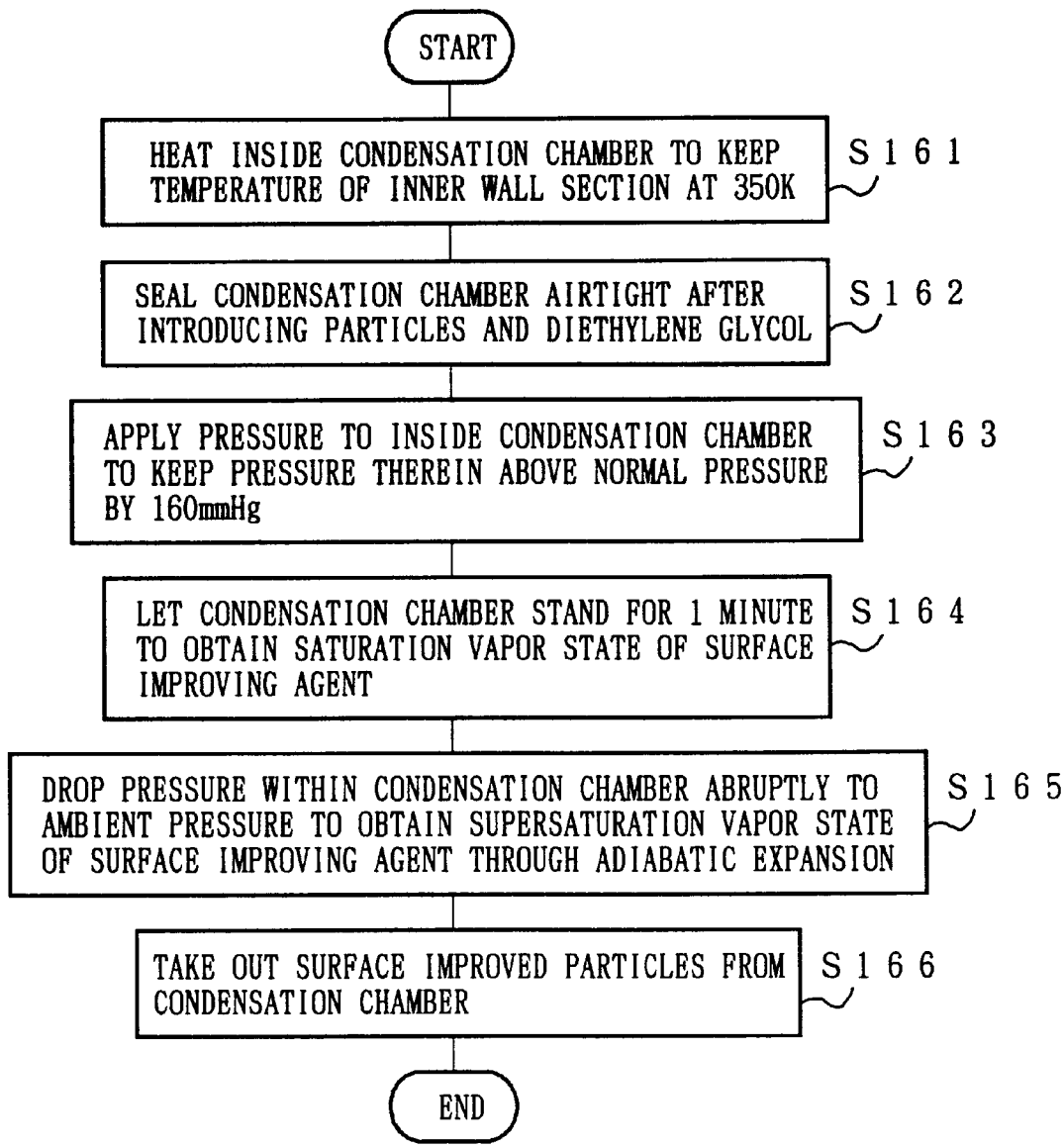
FIG. 25 is a flowchart detailing an example application of the particle surface improving method of FIG. 24.

An example of the surface improving treatment carried out under predetermined conditions in accordance with the particle surface improving method by the particle surface improving apparatus 71 of FIG. 22 will be explained with reference to the flowchart of FIG. 25. Note that the actual actions in S161–S166 of the flowchart in FIG. 25, such as introducing the particles into the treatment space 2b, releasing the particles therefrom, and increasing/reducing a pressure within the treatment space 2b, are identical with those in S151–S156 of the flowchart in FIG. 24, respectively.

To begin with, the condensation chamber 2 is heated inside (S161) to keep a temperature of the inner wall section $2a_2$ at 350 K.

Then, the condensation chamber 2 is sealed airtight after particles of titanium oxide having a primary particle size of approximately 0.5 $\mu$m and particle number concentration of $10^{11}$pcs/m$^3$, and diethylene glycol serving as the surface improving agent 21 are introduced into the treatment space 2b in the condensation chamber 2 through the particle inlet 4 and surface improving agent inlet 72, respectively (S162).

Next, to obtain a saturation vapor of diethylene glycol, a pressure is applied to the treatment space 2b to keep a pressure therein at 160 mmHg above a normal pressure (ambient pressure) (S163). Note that diethylene glycol is heated while the pressure is being applied.

Subsequently, the condensation chamber 2 is let stand for one minute to obtain a saturation vapor state of diethylene glycol (S164).

Next, a pressure within the treatment space 2b is dropped abruptly to a normal pressure to bring diethylene glycol into a supersaturation vapor state through adiabatic expansion (S165). Consequently, diethylene glycol starts to condense on the particle surface of the titanium oxide, and eventually a liquid film of diethylene glycol coats the same. Obtained as a result of the above operation are substantially regular surface improved particles, each encoated with diethylene glycol with a particle of titanium oxide as a nucleus and having a primary particle size of 1 $\mu$m.

Then, the surface improved particles are taken out from the condensation chamber 2 to end the operation (S166).

The condensation chamber 2 is let stand for one minute herein. However, one minute is ample to obtain the saturation vapor, and the time for standing may be shortened to a few seconds depending on the kinds of condensation liquids.

EXAMPLE 6

Figure 26:
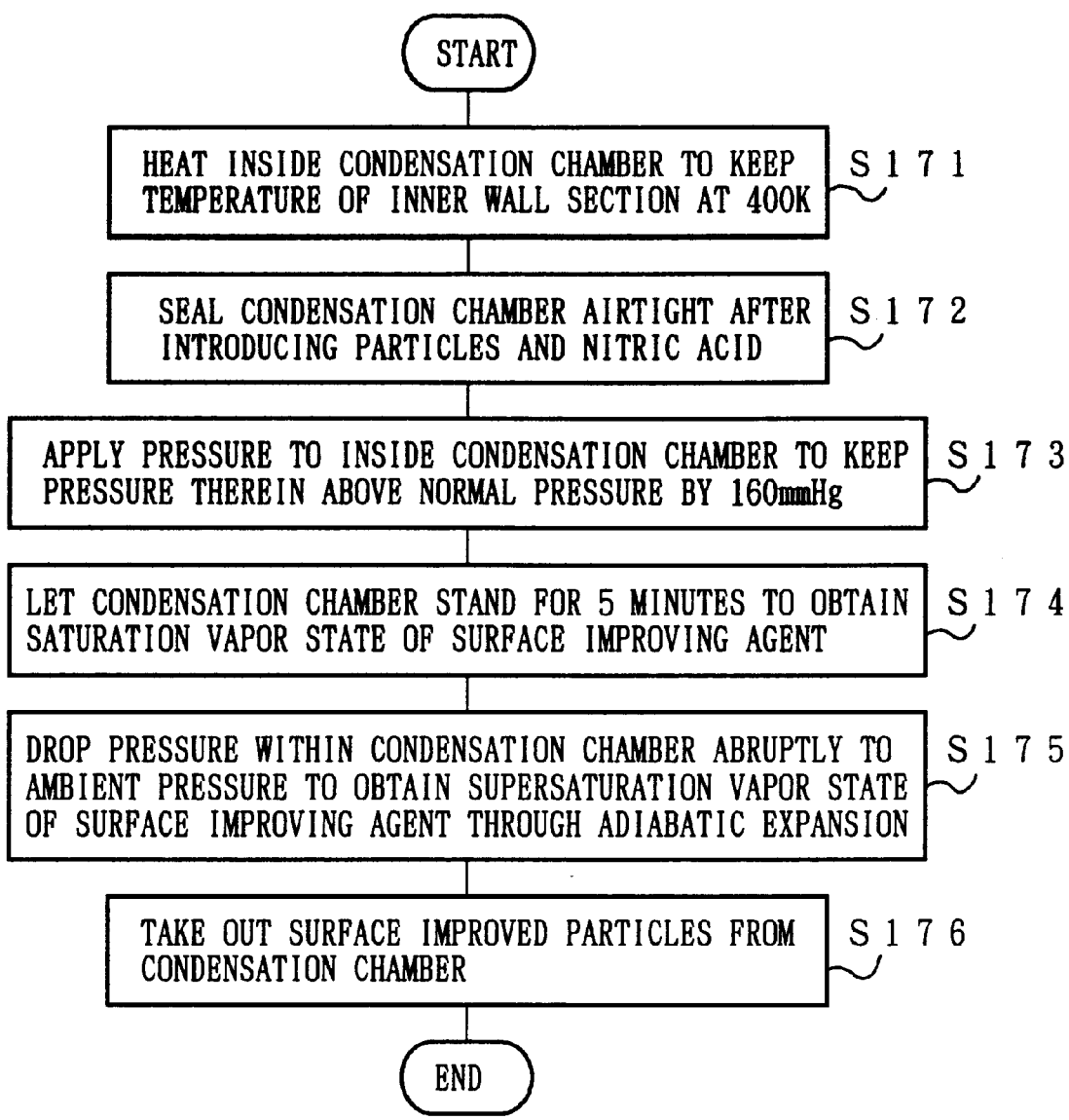
FIG. 26 is a flowchart detailing another example application of the particle surface improving method of FIG. 24.

Another example of the surface improving treatment carried out under predetermined conditions in accordance with the particle surface improving method by the particle surface improving apparatus 71 of FIG. 22 will be explained with reference to the flowchart of FIG. 26. Note that the actual actions in S171–S176 of the flowchart in FIG. 26 are identical with those in S151–S156 of the flowchart in FIG. 24, respectively.

To begin with, the condensation chamber 2 is heated inside (S171) to keep a temperature of the inner wall section $2a_2$ at 400 K.

Then, the condensation chamber 2 is sealed airtight after particles of carbon black having a primary particle size of approximately 0.5 $\mu$m and particle number concentration of $10^{11}$pcs/m$^3$, and nitric acid serving as the surface improving agent 21 are introduced into the treatment space 2b in the condensation chamber 2 through the particle inlet 4 and surface improving agent inlet 72, respectively (S172).

Next, to obtain a saturation vapor state of nitric acid, a pressure is applied to inside the condensation chamber 2 to keep a pressure within the treatment space 2b at 160 mmHg above a normal pressure (ambient pressure) (S173). Note that nitric acid is heated while the pressure is being applied.

Subsequently, the condensation chamber 2 is let stand for five minutes to obtain a saturation vapor of nitric acid (S174).

Next, a pressure within the treatment space 2b is dropped abruptly to a normal pressure to bring nitric acid into a supersaturation vapor state through adiabatic expansion (S175). Consequently, nitric acid starts to condense on the particle surface of carbon black, and eventually, a liquid film of nitric acid coats the same. Obtained as a result of the above operation are surface improved particles, each encoated with nitric acid with a particle of carbon black as a nucleus.

Then, the post-surface-improving-treatment particles of carbon black are taken out from the condensation chamber 2 to end the operation (S176).

As has been explained, the present particle surface improving apparatus 71 includes the pressure applying/reducing device 75 having the piston 75a in the lower part of the condensation chamber 2. Thus, the particles subject to surface improvement and surface improving agent 21 are introduced into the condensation chamber 2 and a pressure within the treatment space 2b is increased/reduced by raising/lowering the piston 75a. Hence, each action can be carried out by the pressure applying/reducing device 75 of a simple structure. Moreover, the present particle surface improving apparatus 71 can be simple and inexpensive as well.

Since the surface improving agent 21 is introduced into the treatment space 2b by the pressure applying/reducing device 75, the step of impregnating the surface improving agent 21 into the porous material of the treatment space 2b, namely, the inner wall section $2a_2$, in advance can be omitted.

Also, since the treatment space 2b is heated before the particles and surface improving agent 21 are introduced into the condensation chamber 2, the surface improving agent 21 can be heated promptly as soon as it is introduced into the treatment space 2b, thereby speeding up the surface improving treatment.

In addition, the present particle surface improving apparatus 71 increases/reduces a pressure within the treatment space 2b by changing a volume thereof by means of the pressure applying/reducing device 75. Thus, it has become possible to apply the surface improving treatment successively to the same particles 22 while withholding the particles 22 in the treatment space 2b, in other words, using a single particle surface improving apparatus 71.

Further, allowing the piston 75a in the pressure applying/reducing device 75 to move up to the upper wall section of the condensation chamber 2 makes it possible to take out all the surface improved particles in the condensation chamber 2 in a reliable manner.

Alternatively, the surface improved particles can be taken out from the condensation chamber 2 in a reliable manner by sending clean air through the particle inlet 4 after the valves 11 and 13 are opened while the valve 74 is kept shut.

In the particle surface improving method carried out by the present particle surface improving apparatus 71, no action such that charges the particles 22, for example, stirring the particles 22, is taken, and instead, the surface improving agent 21 is condensed on the surface of each particle 22 in the same manner as the other particle surface improving methods carried out by the particle surface improving apparatuses/systems explained above. Thus, the present particle surface improving method holds the advantages of these particle surface improving methods as well.

Figure 27:
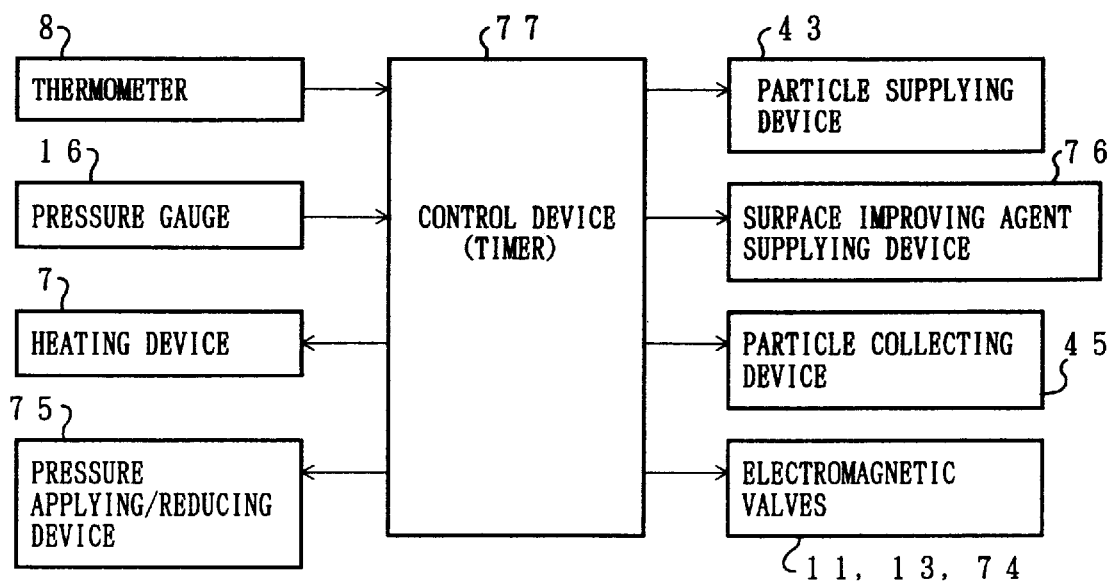
FIG. 27 is a block diagram depicting control mechanism provided in the particle surface improving apparatus of FIG. 22.

Like the other apparatuses/systems explained above, the present particle surface improving apparatus 71 can be automated. In this case, the heating device 7, pressure applying/reducing device 75, particle supplying device 43, surface improving agent supplying device 76, and valves 11, 13, and 74 made of electromagnetic valves are placed under the control of a control device 77 as is illustrated in FIG. 27. Here, the particle supplying device 43 is connected to the introduction pipe 10 of FIG. 22, the surface improving agent supplying device 76 is connected to the introduction pipe 73, and the particle collecting device 45 is connected to the releasing pipe 12.

Also, the present particle surface improving apparatus 71 can apply the surface improving treatment to the same particles 22 repetitively in the above-explained manner. Thus, even when a saturation ratio of the surface improving agent 21 is low, a film of the surface improving agent 21 of a desired thickness can be formed on the surface of each particle 22, or the surface improved particle having a desired particle size can be obtained.

In addition, in the particle surface improving method carried out by the present particle surface improving apparatus 71, the surface improving agent 21 may be impregnated into the inner wall section $2a_2$ made of the porous material in the condensation chamber 2 in advance. By so doing, the step of introducing the surface improving agent 21 through the surface improving agent inlet 72 can be omitted.

EXAMPLE 7

Figure 28:
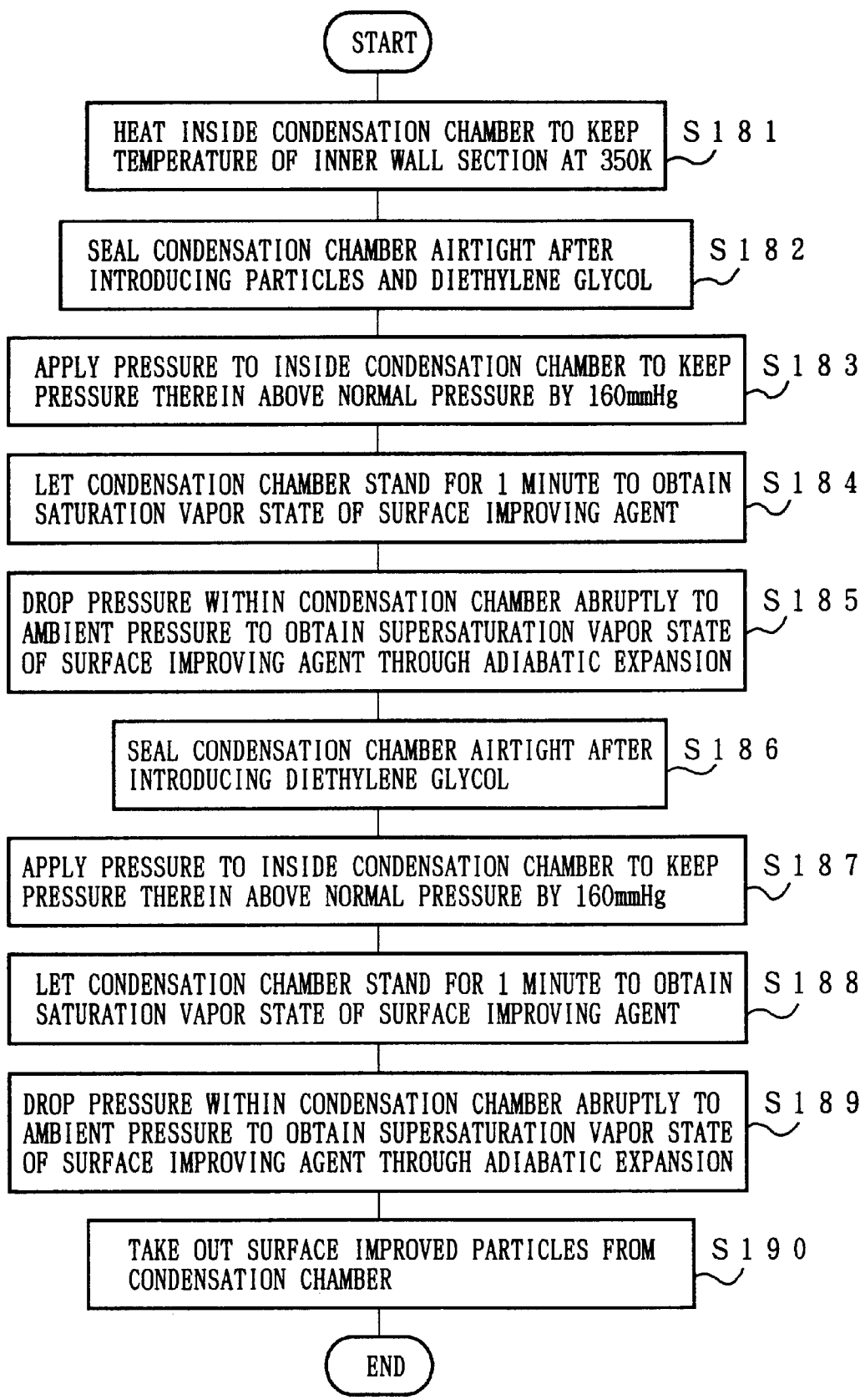
FIG. 28 is a flowchart detailing a further example application of the particle surface improving method carried out by the particle surface improving apparatus of FIG. 22.

Another example of the surface improving treatment carried out under predetermined conditions in accordance with the present particle surface improving method will be explained with reference to the flowchart of FIG. 28. Note that the surface improving treatment is carried out repetitively by a single particle surface improving apparatus 71 of FIG. 22. Also, note that actual actions in S181–S185 and S186–S190 of the flowchart in FIG. 28 are identical with those in S151–S155 and S152–S156 of the flowchart in FIG. 24, respectively.

To begin with, the condensation chamber 2 is heated inside (S181) to keep a temperature of the inner wall section $2a_2$ at 350 K.

Then, the condensation chamber 2 is sealed airtight after particles of polystyrene latex having a primary particle size of approximately 40 nm and particle number concentration of $10^{11}$pcs/m$^3$, and diethylene glycol serving as the surface improving agent 21 are introduced into the treatment space 2b in the condensation chamber 2 through the particle inlet 4 and surface improving agent inlet 72, respectively (S182).

Next, to obtain a saturation vapor state of diethylene glycol, a pressure is applied to inside the condensation chamber 2 to keep a pressure within the treatment space 2b at 160 mmHg above a normal pressure (ambient pressure) (S183). Note that diethylene glycol is heated while the pressure is being applied.

Subsequently, the condensation chamber 2 is let stand for one minute to obtain a saturation vapor of diethylene glycol (S184).

Next, a pressure within the treatment space 2b is dropped abruptly to a normal pressure to bring diethylene glycol into a supersaturation state through adiabatic expansion (S185). Consequently, diethylene glycol starts to condense on the particle surface of polystyrene latex immediately, and eventually, a liquid film of diethylene glycol coats the same. Obtained as a result of the above operation are substantially regular surface improved particles, each encoated with diethylene glycol with a particle of polystyrene latex as a nucleus and having a primary particle size of 1 μm.

Then, to repeat the surface improving treatment, the piston 75a of the pressure applying/reducing device 75 is raised and the value 74 alone is opened to supply diethylene glycol to the surface improving agent inlet 72. Subsequently, the piston 75a is lowered to introduce the surface improving agent 21 alone, namely, diethylene glycol, into the treatment space 2b, and after which the condensation chamber 2 is sealed airtight (S186).

Then, S183–S185 are repeated in S187–S189 to coat the surface improved particles again with ethylene glycol to obtain substantially regular surface improved particles, each encoated with diethylene glycol with a polystyrene latex particle as a nucleus and having a primary size of 2 μm.

Embodiment 6

Figure 29:
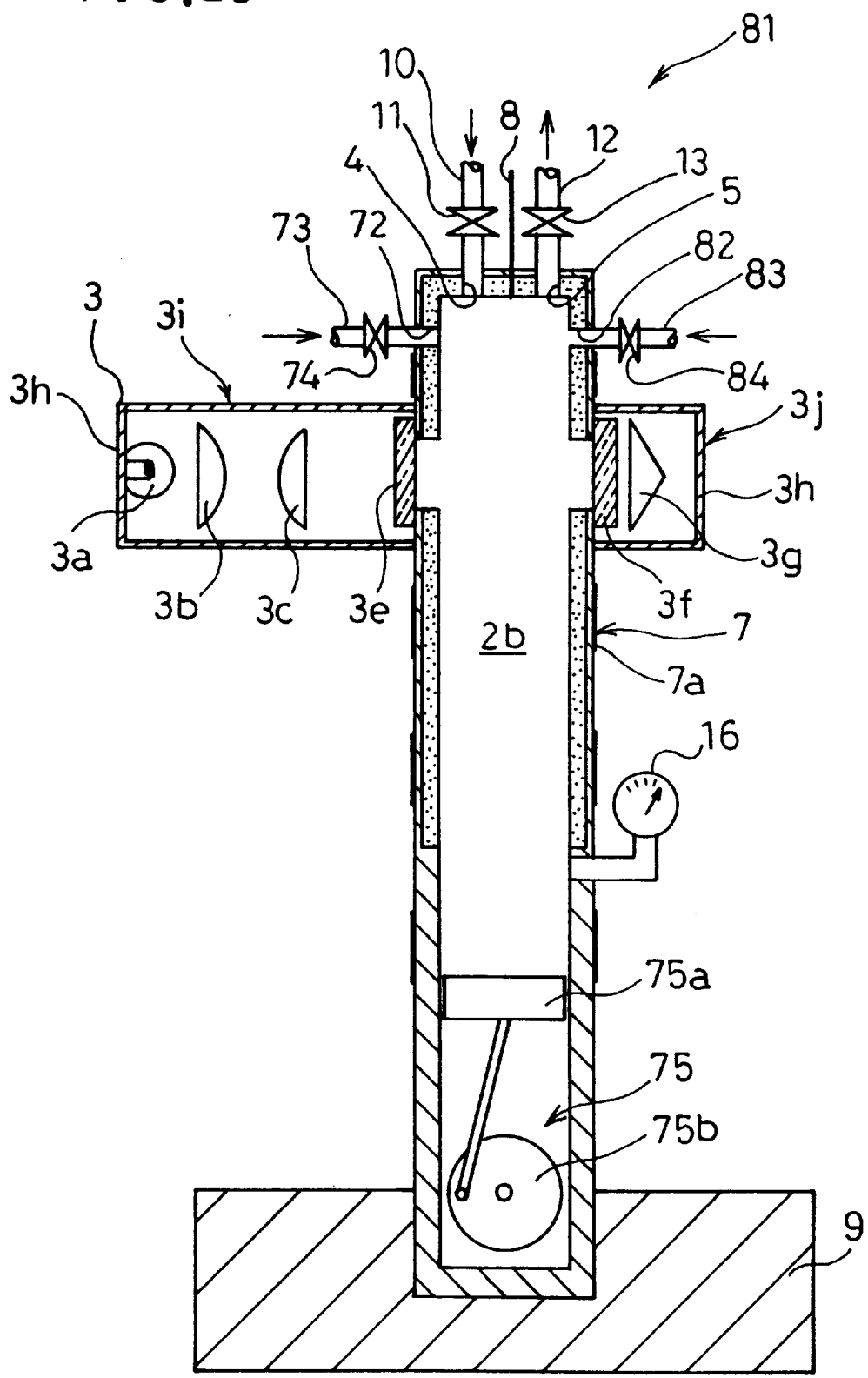
FIG. 29 is a longitudinal section of an example particle surface improving apparatus carrying out an example particle surface improving method in accordance with still another embodiment of the present invention.

Referring to FIGS. 29 and 30, the following description will describe still another example embodiment of the present invention. Hereinafter, like components are labeled with like reference numerals with respect to Embodiments 1 through 5, and the description of these components is not repeated for the explanation's convenience.

A particle surface improving apparatus 81 carrying out a particle surface improving method of the present embodiment is of a structure depicted in FIG. 29. The particle surface improving apparatus 81 is preferred for the particle surface improving method where the surface improving treatment is applied to the same particles 22 repetitively using at least two kinds of surface improving agents 21 separately.

As shown in FIG. 29, the particle surface improving apparatus 81 is of a same structure as the particle surface improving apparatus 71 except that it includes a second surface improving agent inlet 82 near the first surface improving agent inlet 72, and an introduction pipe 83 having a valve 84 is fit into the surface improving agent inlet 82. The introduction pipe 83 is connected to a surface improving agent supplying device 85 of FIG. 31 for supplying a different kind of surface improving agent 21 from the one supplied from the surface improving agent supplying device 76 through the introduction pipe 73.

For example, the surface improving agent inlet 72 is used for the first surface improving treatment to the particles 22 using one kind of surface improving agent 21 and the other surface improving agent inlet 82 is used for the second surface improving treatment to the same particles 22 using another kind of surface improving agent 21. The valve 74 is opened and the valve 84 is shut to use the surface improving agent inlet 72, while the valve 74 is shut and the valve 84 is opened to used the surface improving agent inlet 82.

To use more than two kinds of surface improving agents 21, as many surface improving agent inlets as the kinds of the surface improving agents 21 are made through the condensation chamber 2. Alternatively, more than one kind of surface improving agent 21 may be introduced into the treatment space 2b concurrently through a single surface improving agent inlet 72 as previously mentioned.

Also, more than one kind of surface improving agent may be introduced into the treatment space 2b through their respective inlets concurrently, so that a film of resulting mixed ingredients will be formed on the surface of each particle 22. Using more than one kind of surface improving agent 21 concurrently can trigger a chemical reaction of the surface improving agents 21 and a surface material of the particles 22.

EXAMPLE 8

An example of the surface improving treatment carried under predetermined conditions in accordance with the particle surface improving method by the particle surface improving apparatus 81 of FIG. 29 will be explained with reference to the flowchart of FIG. 30. Note that the actual actions in S191–S195 and S196–S200 of the flowchart in FIG. 30 are identical with those in S151–S155 and S152–S156 of the flowchart in FIG. 24, respectively. Herein, diethylene glycol is supplied through the introduction pipe 73 to the surface improving agent inlet 72 from the surface improving agent supplying device 76, and triethylene glycol is supplied through the introduction pipe 83 to the surface improving agent inlet 82 from the surface improving agent supplying device 85.

To begin with, the condensation chamber 2 is heated inside (S191) to keep a temperature of the inner wall section $2a_2$ at 350 K.

Then, the condensation chamber 2 is sealed airtight after particles of polystyrene latex having a primary particle size of approximately 40 nm and particle number concentration of $10^{11}$pcs/m$^3$, and diethylene glycol serving as the surface improving agent 21a are introduced into the treatment space 2b in the condensation chamber 2 through the particle inlet 4 and surface improving agent inlet 72, respectively (S192).

Next, to obtain a saturation vapor state of diethylene glycol, a pressure is applied to inside the condensation chamber 2 to keep a pressure within the treatment space 2b at 160 mmHg above a normal pressure (ambient pressure) (S193). Note that diethylene glycol is heated while a pressure is being applied.

Subsequently, the condensation chamber 2 is let stand for one minute to obtain a saturation vapor of diethylene glycol (S194).

Next, a pressure within the treatment space 2b is dropped abruptly to a normal pressure to bring diethylene glycol into a supersaturation state through adiabatic expansion (S195). Consequently, diethylene glycol starts to condense on the particle surface of polystyrene latex, and eventually, a liquid film of diethylene glycol coats the same. Obtained as a result of the above operation are substantially regular surface improved particles, each encoated with diethylene glycol with a particle of polystyrene latex as a nucleus and having a primary particle size of 1 μm.

Then, to repeat the surface improving treatment, the piston 75a of the pressure applying/reducing device 75 is raised, and after the valve 84 alone is opened, the piston 75a is lowered to introduce triethylene glycol serving as the surface improving agent 21b alone into the treatment space 2b, after which the condensation chamber is sealed airtight (S196).

Then, S193–S195 are repeated in S197–S199. Consequently, the particles are coated with a double-layer film of diethylene glycol on the bottom and triethylene glycol on the top. Thus, obtained as a result of the above operation are substantially regular surface improved particles, each with a particle of polystyrene latex as a nucleus and having a primary particle size of 4 μm.

Figure 31:
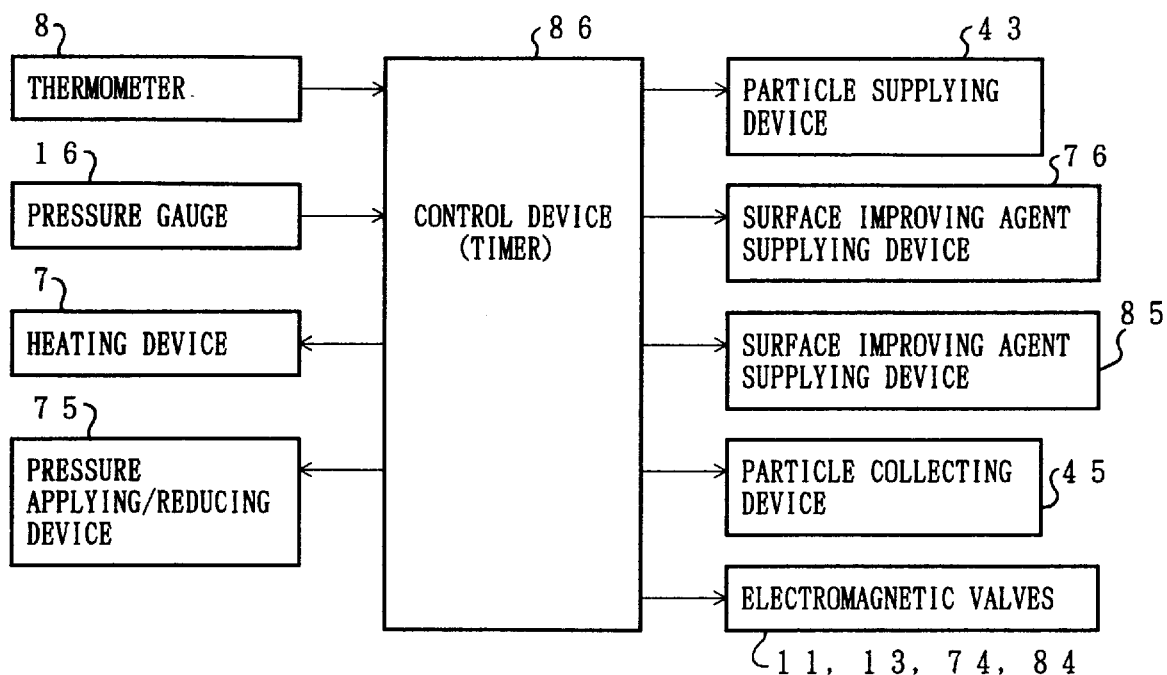
FIG. 31 is a block diagram depicting a structure of control mechanism provided in the particle surface improving apparatus of FIG. 29.

Also, like the other particle surface improving apparatuses/systems explained above, the present particle surface improving apparatus 81 can be automated. In this case, as shown in FIG. 31, the heating device 7, pressure applying/reducing device 75, particle supplying device 43, particle surface improving devices 76 and 85, and valves 11, 13, 74, and 84 which are made of electromagnetic valves are placed under the control of a control device 86.

Embodiment 7

Referring to FIGS. 32 through 35, the following description will describe still another example embodiment of the present invention. Hereinafter, like components are labeled with like reference numerals with respect to Embodiments 1 through 6, and the description of these components is not repeated for the explanation's convenience.

Figure 32:
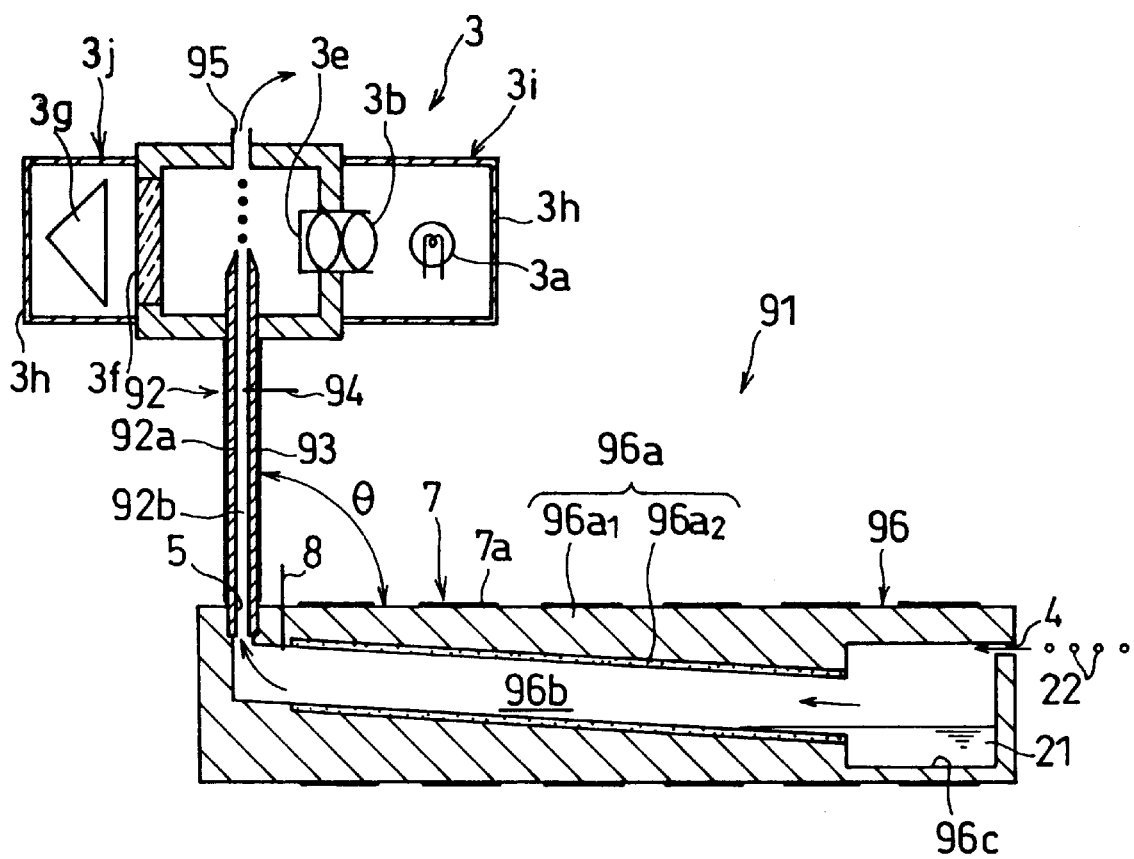
FIG. 32 is a longitudinal section of an example particle surface improving apparatus carrying out an example particle surface improving method in accordance with still another embodiment of the present invention.
Figure 33:
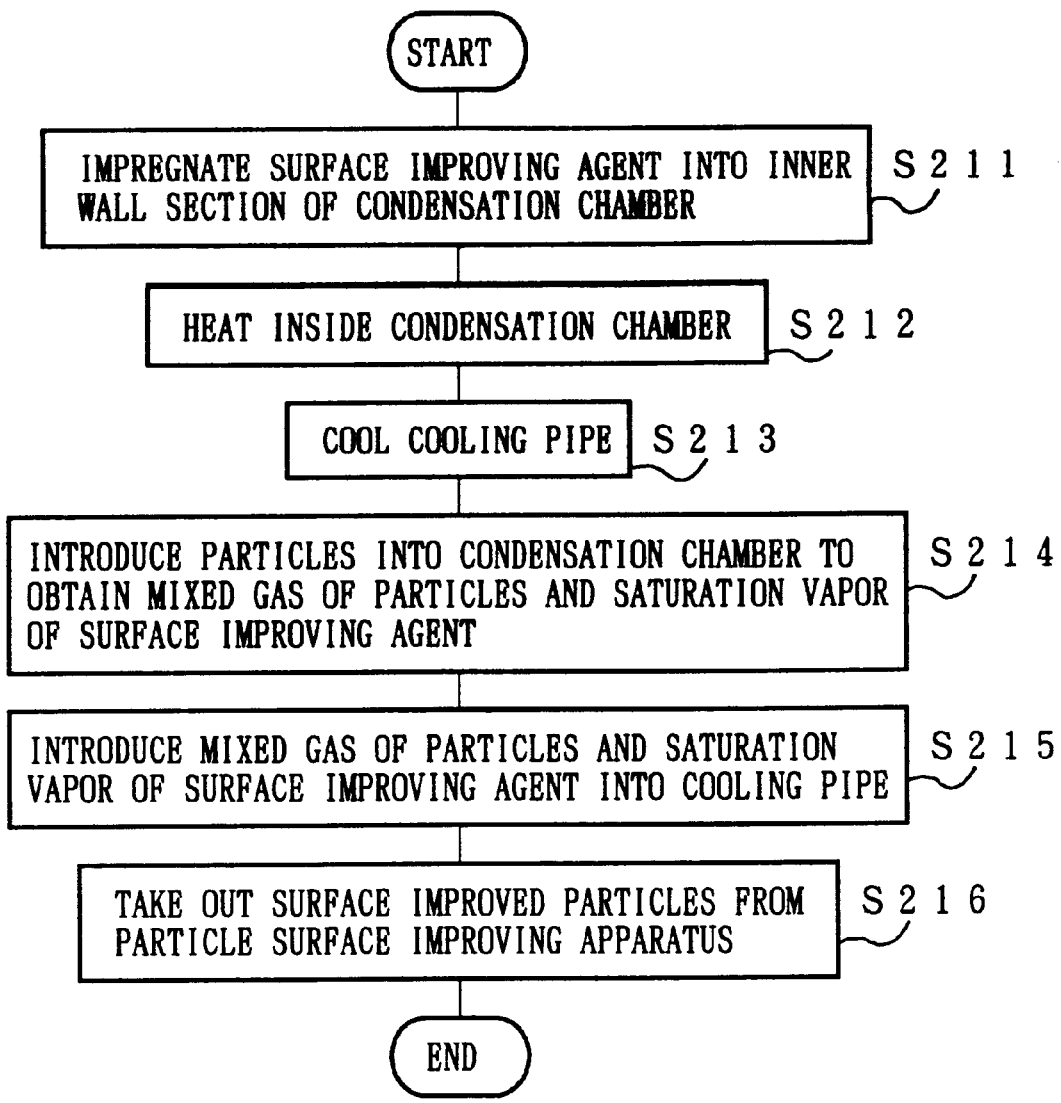
FIG. 33 is a flowchart detailing the particle surface improving method carried out by the particle surface improving apparatus of FIG. 32.
Figure 34:
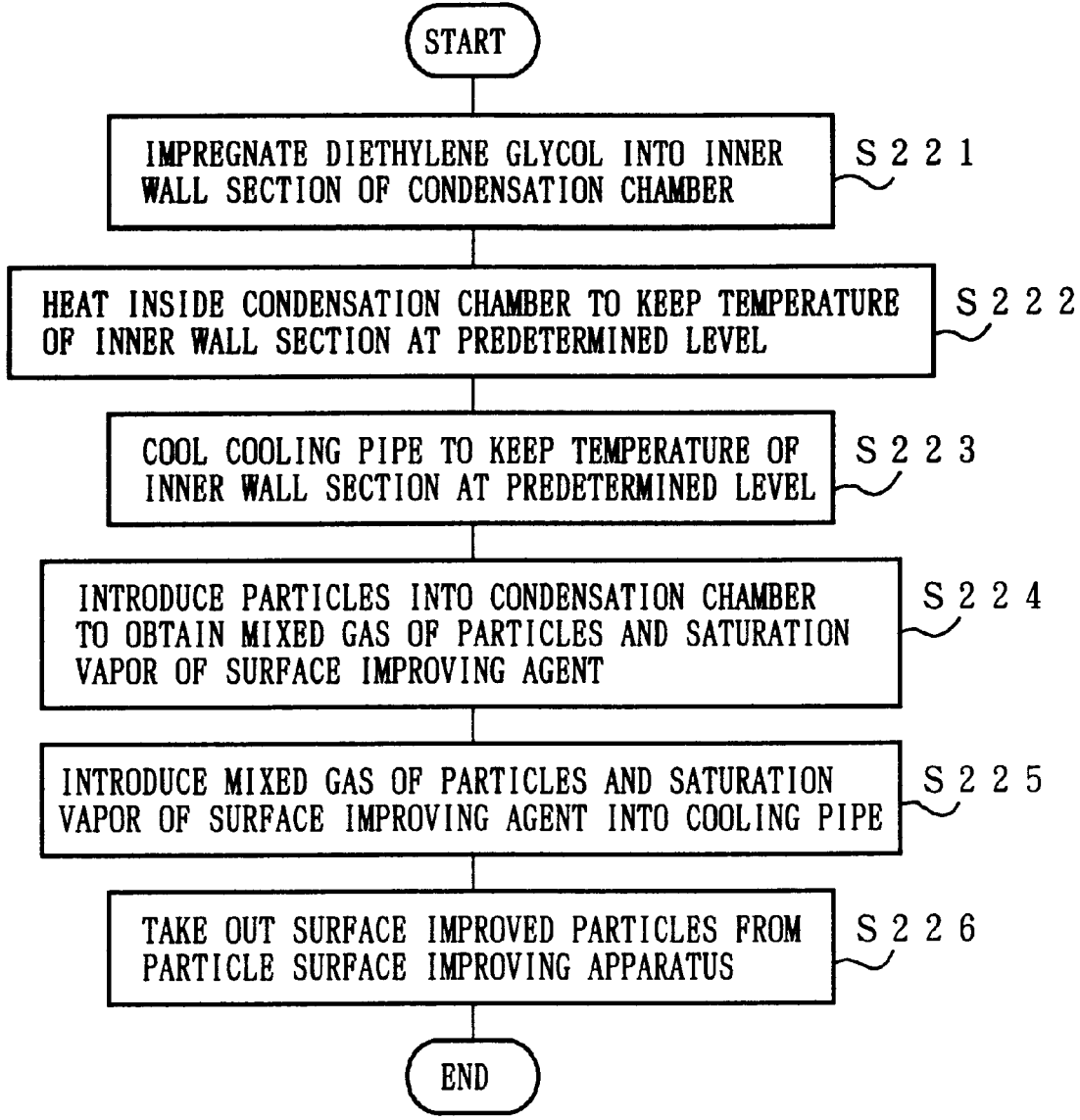
FIG. 34 is a flowchart detailing an example application of the particle surface improving method of FIG. 33.

A particle surface improving apparatus 91 carrying out a particle surface improving method of the present embodiment is of a structure depicted in FIG. 32. The particle surface improving apparatus 91 includes a condensation chamber 96, a cooling pipe 92, and the optical detecting device 3.

The condensation chamber 96 is an elongate cylinder or prism extending horizontally. Although the shape of the condensation chamber 96 is not especially limited, the condensation chamber 92 longer in width than length is preferred for a smooth surface improving treatment herein.

A treatment space 96b extending in a longitudinal direction of the condensation chamber 96 is provided inside the condensation chamber 96. The treatment space 96b is, for example, a cylindrical hole inclined vertically with respect to a direction along the axis of the condensation chamber 96. The treatment space 96b includes a reservoir section 96c for withholding the surface improving agent 21 at its lower end. The treatment space 96b is inclined, so that the surface improving agent 21 adhering to the inner wall surface enclosing the treatment space 96b will flow into the reservoir section 96c.

The condensation chamber 96 includes the particle inlet 4 at the end portion in the reservoir section 96c side to communicate with an upper space thereof. Also, the condensation chamber 96 includes the particle outlet 5 having an opening that communicates with a space above at the other end portion. Further, the condensation chamber 96 includes the thermometer 8 and heating device 7. The condensation chamber 96 is composed of an outer wall section $96a_1$ and an inner wall section $96a_2$. Like the other surface improving apparatuses/systems explained above, the inner wall section $96a_2$ is made of a porous material, such as ceramic and felt.

The cooling pipe 92 is fit into the particle outlet 5 of the condensation chamber 96. The cooling pipe 92 is a linear pipe and provided in such a manner to keep an angle of approximately 90° with respect to a horizontal direction.

The cooling pipe 92 includes a transportation path 92b inside a pipe wall section 92a. The cooling pipe 92 also includes a cooling device 93 on its outer surface for cooling the transportation path 92b, and the pipe wall section 92a includes a thermometer 94 for detecting a temperature of the transportation path 92b. The cooling device 93 is made of, for example, a Peltier element for cooling a material through the Peltier effect. The cooling device 93 may be another type of cooling device using an organic solvent cooled by coolants, such as a liquid nitrogen, water, and dry ice, or still another type of cooling device using ice water or water cooled by a Liebig condenser.

The upper part of the cooling pipe 92 reaches a space between the light irradiating section 3i and light receiving section 3j in the optical detecting device 3. The optical detecting device 3 functions in the same manner as the one used in the particle surface improving apparatus 1, and hence, the advantages of using the optical detecting device 3 can be obtained herein as well. A particle outlet 95 to the external of the apparatus is made through the optical detecting device 3 above the upper end of the cooling pipe 92.

Next, the particle surface improving method carried out by the particle surface improving apparatus 91 will be explained with reference to the flowchart of FIG. 33.

To begin with, the surface improving agent 21 is withheld in the reservoir section 96*c* in the condensation chamber 96, while being impregnated into the inner wall section $\mathbf{96}a_2$ at the same time (S211).

Next, the condensation chamber 96 is heated by the heating device 7 to obtain a saturation vapor of the surface improving agent 21 in the treatment space 96*b* in the condensation chamber 96 (S212). Once the heating device 7 starts the operation, the heat from the heater 7*a* is conveyed through the outer wall section $\mathbf{96}a_1$ to heat the inner wall section $\mathbf{96}a_2$ and the treatment space 96*b*. A temperature in the condensation chamber 96 is measured by the thermometer 8. A saturation vapor of the surface improving agent 21 is produced by the above heating action.

Next, the cooling pipe 92 is cooled by the cooling device 93 (S213).

Then, the particles 22 subject to the surface improvement are introduced into the treatment space 96*b* in the form of, for example, aerosol, through the particle inlet 4. Once the particles 22 are introduced into the treatment space 96*b*, the particles 22 are mixed with the saturation vapor of the surface improving agent 21 filling the treatment space 96*b*, and transported toward the cooling pipe 92 within the treatment space 96*b* (S214), which is illustrated in the state of FIG. 4.

Next, a mixed gas of the particles 22 and surface improving agent 21 is introduced into the transportation path 92*b* of the cooling pipe 92 to be cooled therein (S215). Accordingly, the saturation vapor of the surface improving agent 21 is brought into a supersaturation state, and a condensation reaction of the surface improving agent 21 starts on the surface of each particle 22 as is illustrated in the state (b) of FIG. 4. Eventually, a liquid film of the surface improving agent 21 coats the same as is illustrated in the state (c) of FIG. 4, thereby improving the surface thereof.

Subsequently, the operation ends when the post-surface-improving-treatment particles in the transportation path 92*b*, namely, the surface improved particles, are taken out through the particle outlet 95 by way of the optical detecting device 3 (S216).

EXAMPLE 9

An example of the surface improving treatment carried out under predetermined conditions in accordance with the particle surface improving method by the particle surface improving apparatus 91 of FIG. 32 will be explained with reference to the flowchart of FIG. 34. Note that the actual actions in S221–S226 of the flowchart in FIG. 34 are identical with those in S211–216 of the flowchart in FIG. 33, respectively.

To begin with, diethylene glycol serving as the surface improving agent 21 is impregnated into the inner wall section $\mathbf{96}a_2$ of the condensation chamber 96 (S221), and the condensation chamber 96 is heated inside to keep the inner wall section $\mathbf{96}a_2$ at a predetermined temperature (S222). Accordingly, a saturation vapor of diethylene glycol is produced in the treatment space 96*b*.

Next, the cooling pipe 92 is cooled to keep a temperature of the pipe wall section 92*a* to a predetermined level (S223).

Next, particles of titanium oxide having a primary particle size of approximately 0.5 μm and particle number concentration of $10^{11}$pcs/m$^3$ are introduced into the treatment space 96*b* in the condensation chamber 96 through the particle inlet 4. Accordingly, a mixed gas of the titanium oxide particles and the saturation vapor of diethylene glycol is obtained in the treatment space 96*b* (S224).

Subsequently, the mixed gas is introduced into the cooling pipe 92 (S225) to be cooled therein, whereby diethylene glycol is brought into a supersaturation state. As a result, diethylene glycol starts to condense on the particle surface of titanium oxide, and eventually, a liquid film of diethylene glycol coats the same. Obtained as a result of the above operation are substantially regular surface improved particles, each encoated with diethylene glycol with a particle of titanium oxide as a nucleus and having a primary particle size of 1 μm.

Subsequently, the surface improved particles are taken out from the apparatus to end the operation (S226).

EXAMPLE 10

Figure 35:
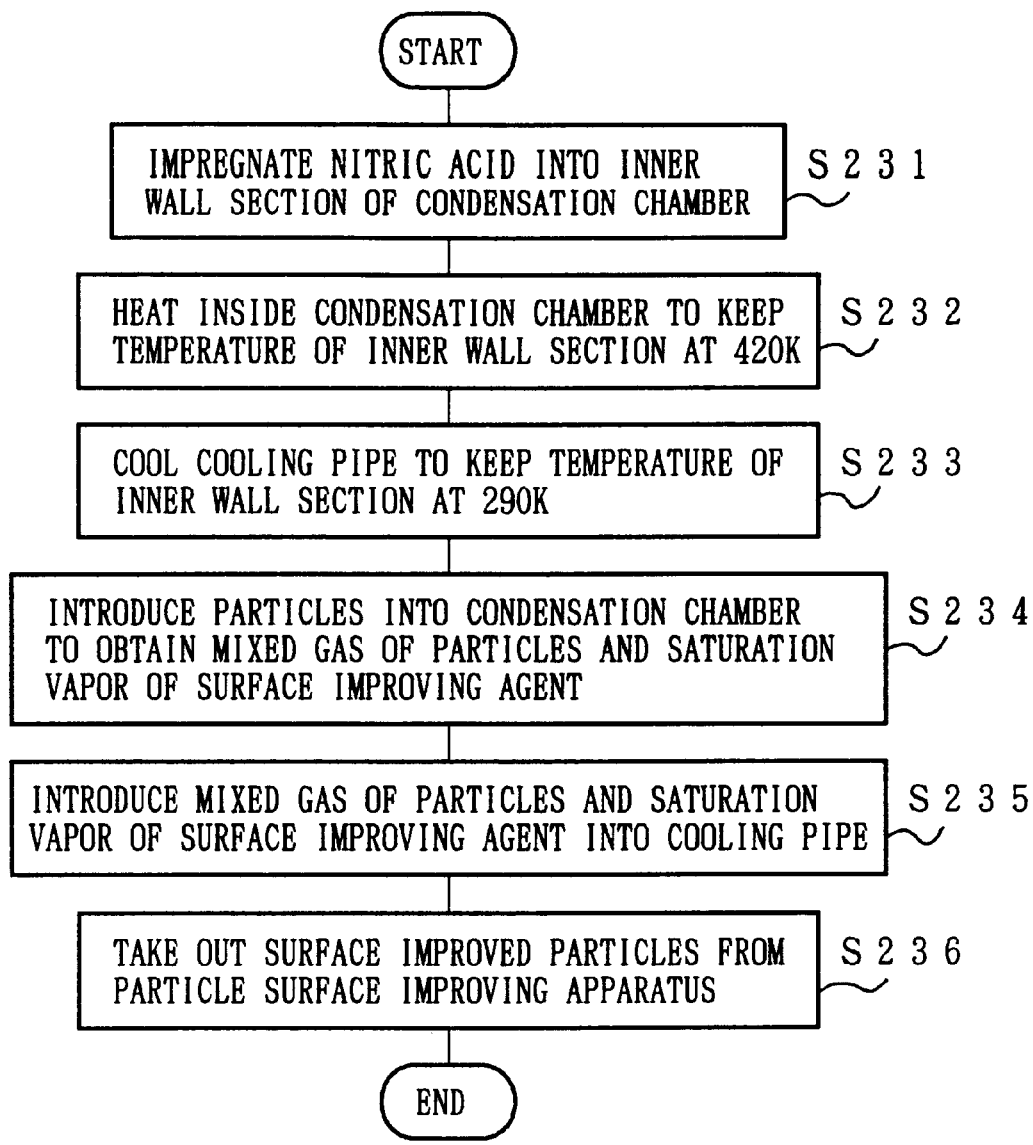
FIG. 35 is a flowchart detailing another example application of the particle surface improving method of FIG. 33.

Another example of the surface improving treatment carried out under predetermined conditions in accordance with the particle surface improving method by the particle surface improving apparatus 91 of FIG. 32 will be explained with reference to the flowchart of FIG. 35. Note that the actual actions in S231–S236 of the flowchart in FIG. 35 are identical with those in S211–216 of the flowchart in FIG. 33, respectively.

To begin with, nitric acid serving as the surface improving agent 21 is impregnated into the inner wall section $96a_2$ in the condensation chamber 96 (S231), and the condensation chamber 2 is heated to keep a temperature of the inner wall section $96a_2$ at 420 K (S232). Accordingly, a saturation vapor of nitric acid is produced in the treatment space 96b.

Also, the cooling pipe 92 is cooled to keep a temperature of the pipe wall section 92a at 290 K (S233).

Next, particles of carbon black having a geometric mean particle size of approximately 0.5 μm and particle number concentration of $10^{11} pcs/m^3$ are introduced into the treatment space 96b in the condensation chamber 96 through the particle inlet 4. Accordingly, a mixed gas of the carbon black particles and the saturation vapor of nitric acid is obtained in the treatment space 96b (S234).

Subsequently, the mixed gas is introduced into the cooling pipe 92 (S235) to be cooled therein, whereby nitric acid is brought into a supersaturation state. As a result, nitric acid starts to condense on the particle surface of carbon black, and eventually, a liquid film of nitric acid coats the same. Obtained as a result of the above operation are surface improved particles, each encoated with nitric acid with a particle of carbon black as a nucleus.

Subsequently, the post-surface-improving-treatment particles of carbon black are taken out from the apparatus to end the operation (S236).

In the particle surface improving method carried out by the present surface improving apparatus 91, no action such that charges the particles 22, for example, stirring the particles 22, is taken, and instead, the surface improving agent 21 is condensed on the surface of each particle 22 to improve the property of the same like the other particle surface improving methods carried by the particle surface improving apparatuses/systems explained above. Thus, the present particle surface improving apparatus 91 holds the advantages of these particle surface improving methods as well.

In the particle surface improving method carried out by the present surface improving apparatus 91, the surface improving treatment is basically carried out in accordance with the following procedure:

① producing a saturation vapor of the surface improving agent 21 in the treatment space 96b in the condensation chamber 96, while introducing the particles 22 into the treatment space 96b;

② sending a mixed gas of the particles 22 and saturation vapor of the surface improving agent 21 into the cooling pipe 92 to let the saturation vapor condense on the surface of each particle 22; and ③ releasing the surface improved particles from the cooling pipe 92.

Thus, the surface improving treatment can be carried out successively by introducing the particles 22 steadily into the treatment space 96b through the particle inlet 4.

Also, a supersaturation atmosphere of the surface improving agent 21 is obtained by simply cooling the saturation vapor of the same. This further simplifies both the manipulation of the surface improving treatment and particle surface improving apparatus.

Moreover, since the saturation vapor of the surface improving agent 21 is generated through heating, it is easy to cool the saturation vapor of the surface improving agent 21 to obtain the supersaturation atmosphere of the same.

Although it is most preferable that the cooling pipe 92 is inclined at an angle ranging from 89° to 90° with respect to a horizontal direction, the surface improved particles can be released from the cooling pipe 92 using an air flow heated by the condensation chamber 96 when the cooling pipe 92 is inclined by an angle ranging from 1° to 90°.

Also, inclining the cooling pipe 92 by the above-specified angle range makes it possible to return the surface improving agent 21 condensed in the transportation path 92b to the treatment space 96 of the condensation chamber 96 by gravity. In other words, the surface-improving agent 21 can be recycled. As a result, a consumption amount of the surface improving agent 21 is reduced, and so is the manufacturing cost of the surface improved particles.

Embodiment 8

Figure 36:
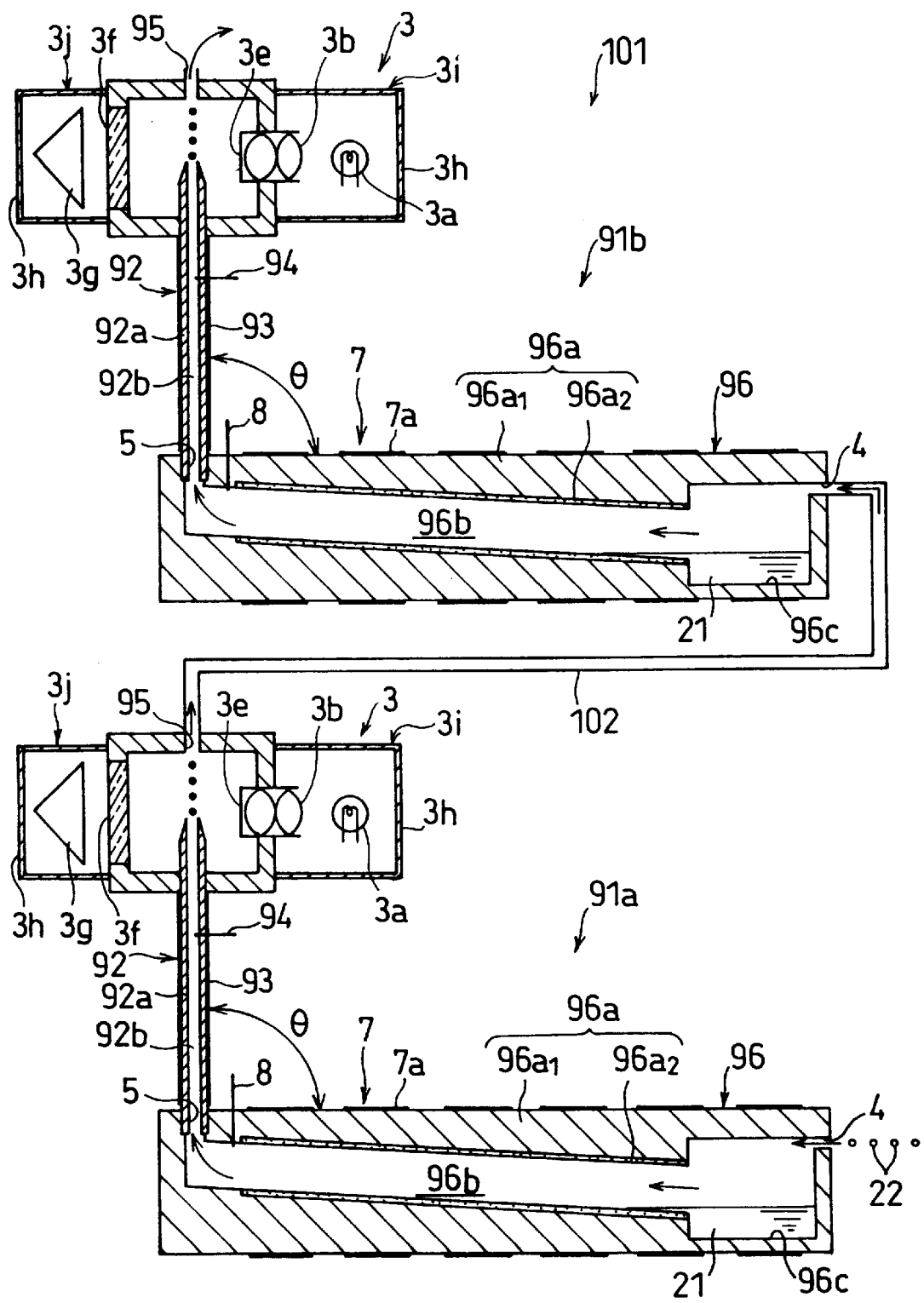
FIG. 36 is a longitudinal section of an example particle surface improving system carrying out an example particle surface improving method in accordance with still another embodiment of the present invention.
Figure 37:
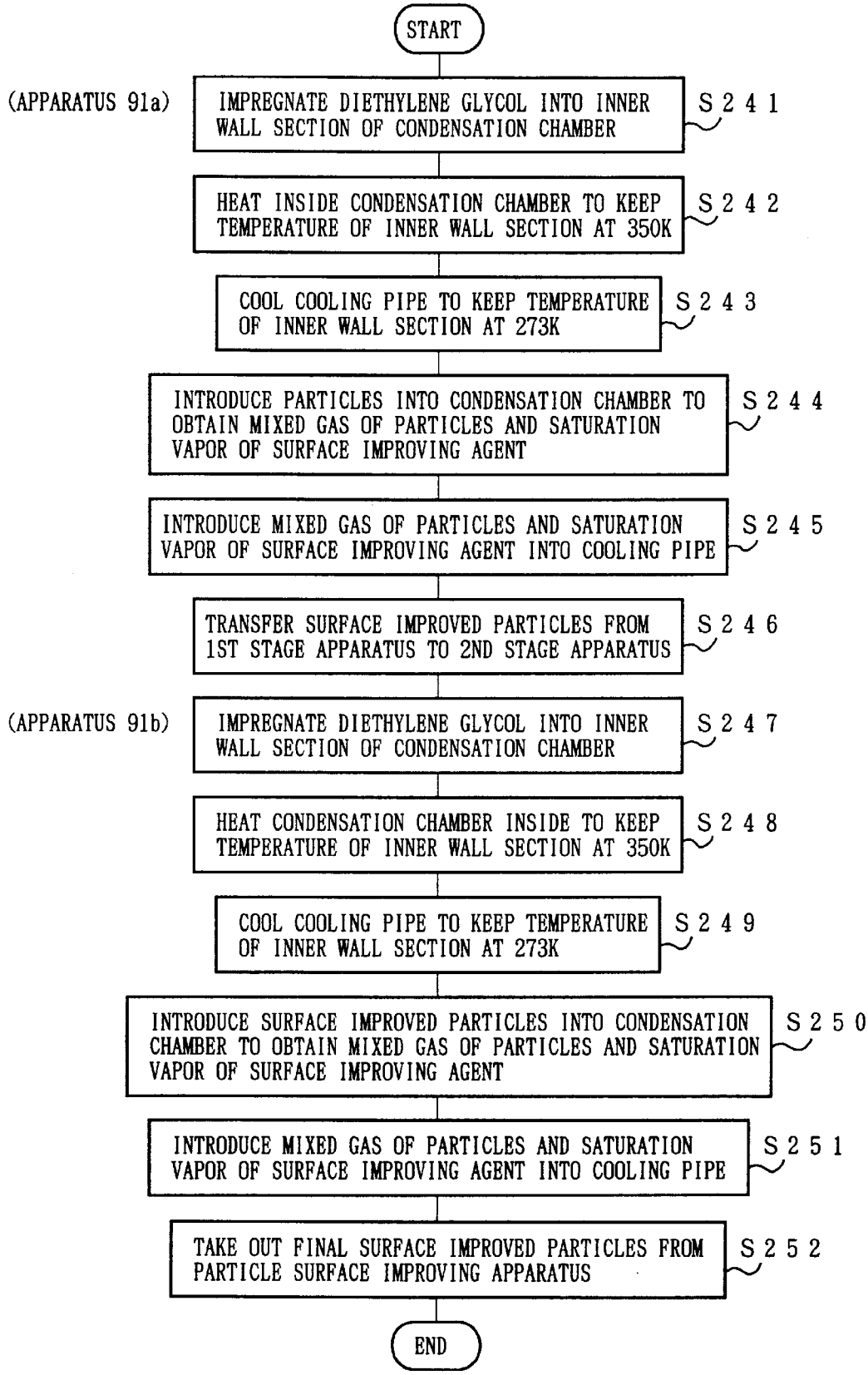
FIG. 37 is a flowchart detailing an example application of the particle surface improving method carried out by the particle surface improving system of FIG. 36.
Figure 38:
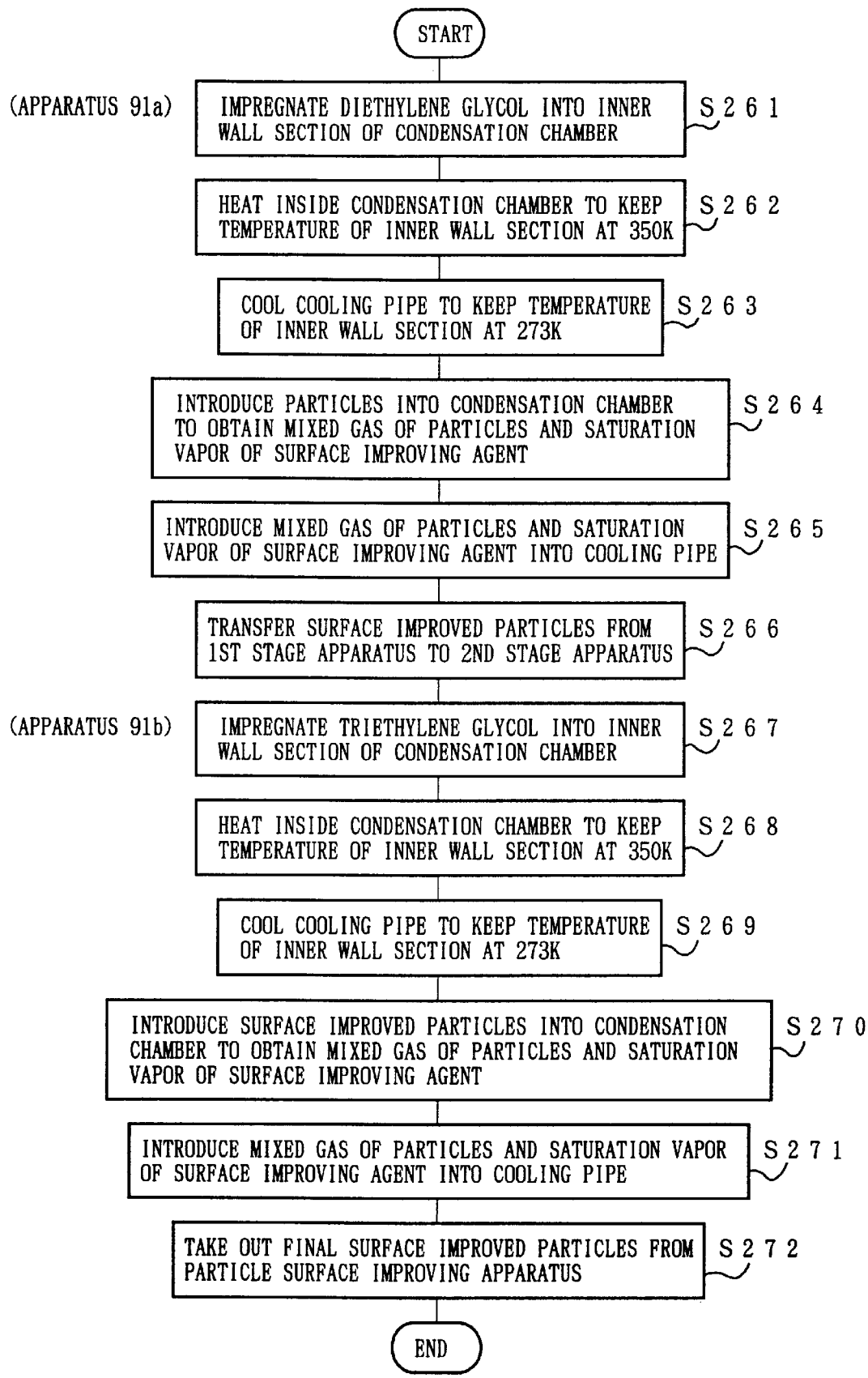
FIG. 38 is a flowchart detailing another example application of the particle surface improving method carried out by the particle surface improving system of FIG. 36.

Referring to FIGS. 36 through 38, the following description will describe still another example embodiment of the present invention. Hereinafter, like components are labeled with like reference numerals with respect to Embodiments 1 through 7, and the description of these components is not repeated for the explanation's convenience.

A particle surface improving system 101 carrying out a particle surface improving method of the present embodiment is of a structure depicted in FIG. 36. The particle surface improving system 101 is composed of more than one particle surface improving apparatus 91, and is preferred in applying the surface improving treatment repetitively to the same particles 22 using either the same or different kind of surface improving agent 21.

As shown in FIG. 36, in the particle surface improving system 101, the particle outlet 95 of the particle surface improving apparatus 91a in the first stage is connected to the particle inlet 4 of the particle surface improving apparatus 91b in the second stage through a transportation pipe 102. Thus, the particle surface improving system 101 can apply the surface improving treatment to the same particles 22 twice in succession. When the surface improving treatment should be repeated more than twice, as may particle surface improving apparatuses 91 as necessary are connected in series.

EXAMPLE 11

An example of applying the surface improving treatment twice in succession using the particle surface improving apparatus 101 will be explained with reference to the flowchart of FIG. 37.

To begin with, diethylene glycol serving as the surface improving agent 21 is impregnated into the inner wall section $96a_2$ of the condensation chamber 96 in the particle surface improving apparatus 91a in the first stage (S241), and the condensation chamber 96 is heated inside to keep a temperature of the inner wall section $96a_2$ at 350 K (S242). Accordingly, a saturation vapor of diethylene glycol is produced in the treatment space 96b.

Next, the cooling pipe 92 is cooled to keep a temperature of the pipe wall section 92a at 273 K (S243).

Then, particles of polystyrene latex having a primary particle size of approximately 0.5 μm and particle number concentration of $10^{11}$pcs/m$^3$ are introduced into the treatment space 96b in the condensation chamber 96 through the particle inlet 4. Accordingly, a mixed gas of the polystyrene latex particles and the saturation vapor of diethylene glycol is obtained in the treatment space 96b (S244).

Subsequently, the mixed gas is introduced into the cooling pipe 92 (S245) to be cooled therein, whereby diethylene glycol is brought into a supersaturation state. As a result, diethylene glycol starts to condense on the particle surface of polystyrene latex, and eventually, a liquid film of diethylene glycol coats the same. Obtained as a result of the above operation are substantially regular surface improved particles, each encoated with diethylene glycol with a particle of polystyrene latex as a nuclei and having a primary particle size of about 1 μm.

After the particles are treated by the particle surface improving apparatus 91a in the first stage, the particles are sent to the particle surface improving apparatus 91b in the second stage through the transferring pipe 102, and introduced into the treatment space 96b through the particle inlet 4 in the second stage (S246). Subsequently, S247–S251 are carried out by the particle surface improving apparatus 91b in the second stage in the above manner. Obtained as a result of the above operation are substantially regular surface improved particles, each encoated with diethylene glycol with a particle of polystyrene latex as a nucleus and having a primary particle size of 2 μm.

Subsequently, the final surface improved particles are taken out from the particle surface improving apparatus 91b through the particle outlet 95 to end the operation (S252).

EXAMPLE 12

Another example of applying the surface improving treatment twice in succession using the particle surface improving system 101 will be explained with reference to the flowchart of FIG. 38.

To begin with, diethylene glycol serving as the surface improving agent 21 is impregnated into the inner wall section $96a_2$ of the condensation chamber 96 in the particle surface improving apparatus 91a in the first stage (S261), and the condensation chamber 2 is heated inside to keep a temperature of the inner wall section $96a_2$ at 350 K (S262). Accordingly, a saturation vapor of diethylene glycol is produced in the treatment space 96b.

Then, the cooling pipe 92 is cooled to keep a temperature of the pipe wall section 92a at 273 K (S263).

Next, particles of polystyrene latex having a primary particle size of approximately 0.5 μm and particle number concentration of $10^{11}$pcs/m$^3$ are introduced into the treatment space 96b in the condensation chamber 96 through the particle inlet 4. Accordingly, a mixed gas of the polystyrene latex particles and the saturation vapor of diethylene glycol is obtained in the treatment space 96b (S2G4).

Subsequently, the mixed gas is introduced into the cooling pipe 92 (S265) to be cooled therein, whereby diethylene glycol is brought into a supersaturation state. As a result, diethylene glycol immediately starts to condense on the particle surface of polystyrene latex, and eventually, a liquid film of diethylene glycol coats the same. Obtained as a result of the above operation are substantially regular surface improved particles, each encoated with diethylene glycol with a particle of polystyrene latex as a nucleus and having a primary particle size of 1 μm.

After the particles are treated by the particle surface improving apparatus 91a in the first stage, the particles are sent to the particle surface improving apparatus 91b in the second stage through the transferring pipe 102, and introduced into the treatment space 96b through the particle inlet 4 (S266). Subsequently, S267–S271 are carried out by the particle surface improving apparatus 91b in the second stage in the above manner except that triethylene glycol is used as the surface improving agent 21. Obtained as a result of the above operation are substantially regular surface improved particles, each encoated with a double-layer film of diethylene glycol on the bottom and triethylene glycol on the top with a particle of polystyrene latex as a nucleus and having a primary particle size of 4 μm.

Subsequently, the final surface improved particles are taken out from the particle surface improving apparatus 91b through the particle outlet 95 to end the operation (S272).

As has been explained, when more than one kind of surface improving agent 21 is used, as many particle surface improving apparatus 91 as the kinds of surface improving agents 21 are connected in series. Alternatively, more than one kind of surface improving agent 21 may be impregnated into a single particle surface improving apparatus 91, so that a film of resulting mixed ingredients of the surface improving agents 21 will be formed on the surface of each particle 22 by carrying out the surface improving treatment only once. Using more than one kind of surface improving agent 21 concurrently can trigger a chemical reaction of the surface improving agents 21 and a surface material of the particles 22.

Embodiment 9

Referring to FIGS. 39 through 44, the following description will describe still another example embodiment of the present invention. Hereinafter, like components are labeled with like reference numerals with respect to Embodiments 1 through 8, and the description of these components is not repeated for the explanation's convenience.

Figure 39:
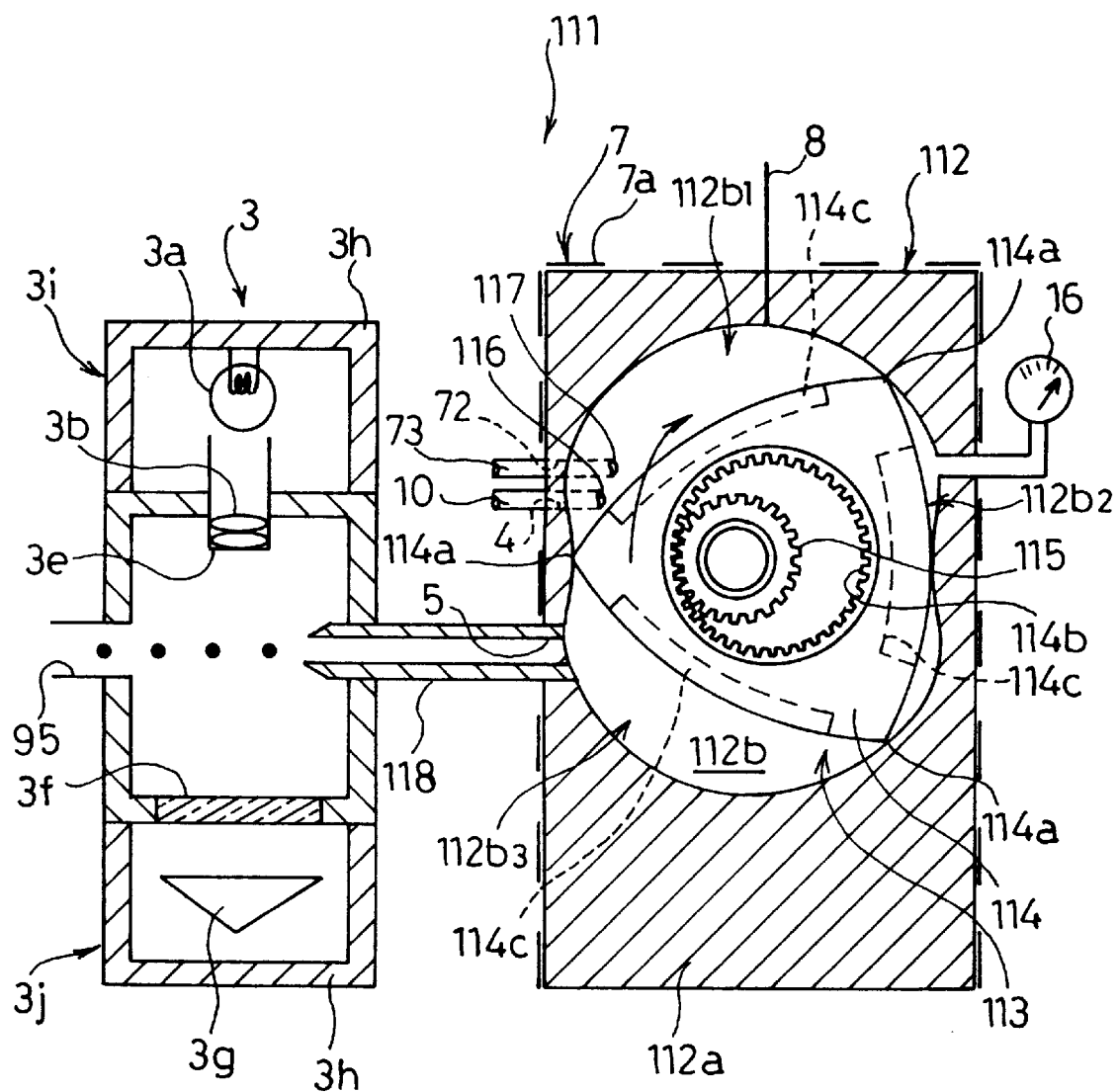
FIG. 39 is a longitudinal section of an example particle surface improving apparatus carrying out an example particle surface improving method in accordance with still another embodiment of the present invention.
Figure 40:
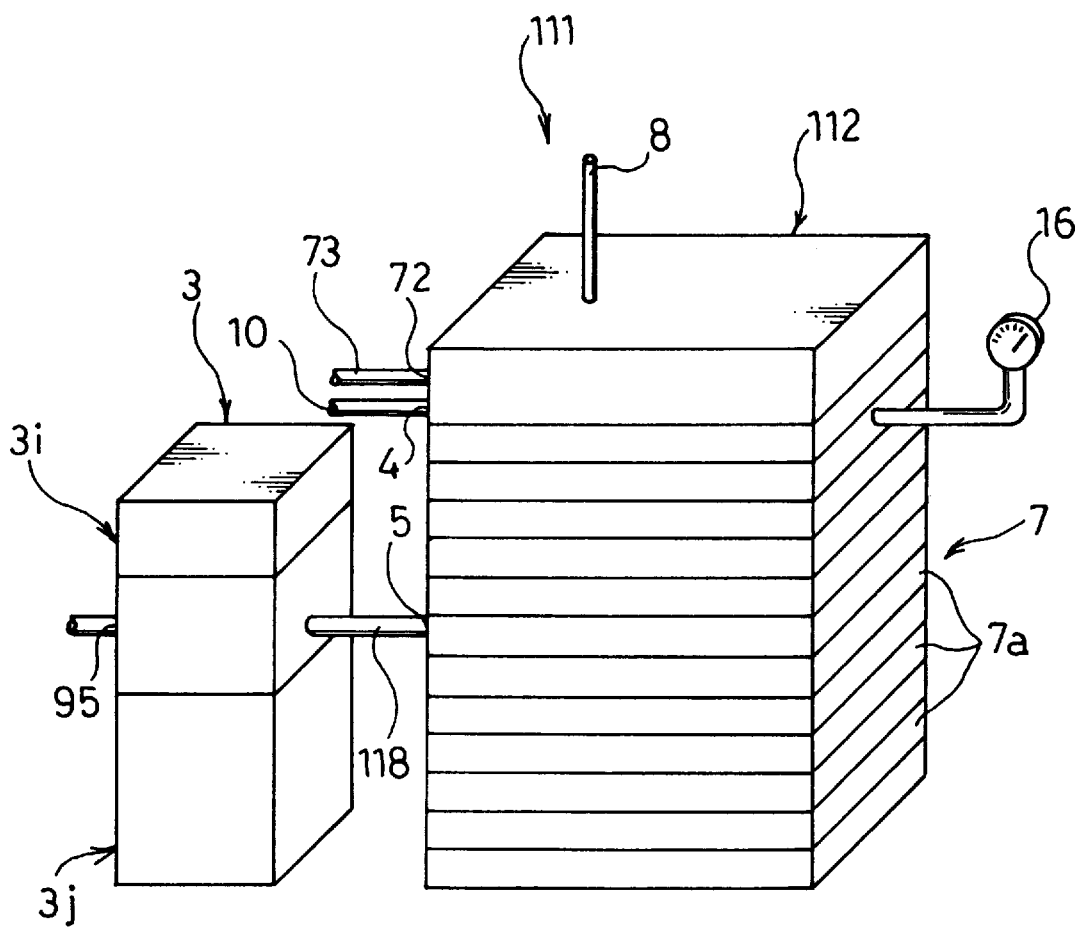
FIG. 40 is a perspective view of the particle surface improving apparatus of FIG. 39.

A particle surface improving apparatus 111 carrying out a particle surface improving method of the present embodiment is of a structure depicted in FIGS. 39 and 40. FIG. 39 is a longitudinal cross section and FIG. 40 is a perspective view of the particle surface improving apparatus 111. The particle surface improving apparatus 111 includes a condensation chamber 112, a pressure applying/reducing device 113, and the optical detecting device 3.

The condensation chamber 112 is, for example, a prism whose circumference wall section 112a encloses a rotor operating space 112b having a cocoon-shaped longitudinal cross section. The condensation chamber 112 includes the particle inlet 4, surface improving agent inlet 72, and particle outlet 5. The particle inlet 4 and surface improving agent inlet 72 have valves 116 and 117, respectively. The valves 116 and 117 are openings that are shut or opened by the side surface of a rotor 114 depending on its position. The condensation chamber 112 also includes the heating device 7 for heating the condensation chamber 112, thermometer 8 for measuring a temperature of the circumference wall section 112a, and the pressure gauge 16 for measuring a pressure within the rotor operating space 112b.

The pressure applying/reducing apparatus 113 includes a substantially triangular rotor 114 in the circumference wall section 112*a*. The rotor 114 rotates eccentrically in a direction denoted by an arrow in FIG. 39, and during the rotation, all three vertexes keep touching the inner surface of the circumference section 112*a* enclosing the rotor operating space 112*b*.

The rotor 114 includes an inner gear 114*b* at its center, which engages with a small driving gear 115. Thus, the rotor 114 rotates as an unillustrated driving device drives the small driving gear 115 to rotate.

It is not essential but preferable that the rotor 114 has three circumference surfaces, and each has a concave section 114*c* to increase a volume of the rotor operating space 112*b*. At least a part of the surfaces of the rotor 114 touching the inner surface of the circumference section 112*b* enclosing the rotor operating space 112*b,* including the three circumference surfaces, is made of a porous material, such as ceramic and felt. Note that the larger the surface made of the porous material, the better the evaporation efficiency of the surface improving agent 21. Thus, the entire circumference surfaces of the rotor 114 may be made of the porous material.

A releasing pipe 118 is fit into the particle outlet 5, and its end portion reaches a space between the light irradiating section 3*i* and light receiving section 3*j* in the optical detecting device 3.

As has been explained, the present particle surface improving apparatus 111 adopts a structure of a rotary engine, and the procedure in the rotor operating space 112*b* is carried out in the same manner as the rotary engine, that is to say, a series of actions are carried out in order of air intaking, decompression, pressure reduction, and air releasing.

As shown in FIG. 39, the rotor operating space 112*b* is divided into first through third treatment spaces 112*b*$_1$–112*b*$_3$ by the rotor 114. For example, a volume of the first treatment space 112*b*$_1$ shows a first increase and a first decrease followed by a second increase and a second decrease as the rotor 114 rotates once. The particle inlet 4 and surface improving agent inlet 72 are provided in an area of the first increase, and the particle outlet 5 is provided in an area of the second decrease. Also, a saturation vapor of the surface improving agent 21 is produced when a pressure is applied in an area of the first decrease, and the saturation vapor of the surface improving agent 21 is brought into a supersaturation state when a pressure is reduced in an area of the second increase.

Next, the particle surface improving method carried out by the particle surface improving apparatus 111 will be explained with reference to the flowchart in FIG. 41. Note that an operation cycle, or a series of actions of heating the rotor operating space 112*b,* introducing the particles 22 and surface improving agent 21, applying/reducing a pressure, and releasing the particles, is identical with the operation cycle of the particle surface improving apparatus 71 of FIG. 24.

To begin with, the condensation chamber 112 is heated by the heating device 7 (S301), and the rotor 114 is placed to a position indicated in FIG. 39. Under these conditions, the valves 116 and 117 are opened in the first treatment space 112*b*$_1$.

Next, the particles 22 subject to surface improvement are supplied into the rotor operating space 112*b* in the condensation chamber 112 through the particle inlet 4, for example, in the form of aerosol. Also, the surface improving agent 21 is supplied into the rotor operating space 112*b* through the surface improving agent inlet 72, for example, in the form of mist. Then, as the rotor 114 is rotated slowly clockwise as indicated by an arrow in FIG. 39, a volume of the first treatment space 112*b*$_1$ increases, and the surface improving agent 21 and particles 22 are sucked into the first treatment space 112*b*$_1$, whereby a mixed gas of the surface improving agent 21 and particles 22 is obtained therein. As the rotor 114 keeps rotating, the valves 116 and 117 are shut by the side surface of the rotor 114, thereby sealing the rotor operating space 112*b* airtight (S302).

Then, as the rotor 114 rotates further, a volume of the first treatment space 112*b*$_1$ decreases and a pressure is applied to the mixed gas (S303). At this time, the mixed gas is heated as well. The largest pressure is applied to the mixed gas in the second treatment space 112*b*$_2$ illustrated in FIG. 39. As the pressure is being applied, a pressure within the first treatment space 112*b*$_1$ rises to a certain level above a normal pressure (ambient pressure). The pressure within the first treatment space 112*b*$_1$ is measured by the pressure gauge 16.

Next, the rotor 114 is suspended when the first treatment space 112*b*$_1$ reaches the position of the second treatment space 112*b*$_2$, and the condensation chamber 112 is let stand until a saturation vapor of the surface improving agent 21 is obtained (S304).

Subsequently, as the rotor 114 is started again, a volume of the first treatment space 112*b*$_1$ increases, and when the first treatment space 112*b*$_1$ reaches the particle outlet 5, the pressure therein drops to an ambient pressure. This happens in a state where the first treatment space 112*b*$_1$ reaches the third treatment space 112*b*$_3$ of FIG. 39. Under these conditions, the mixed gas undergoes adiabatic expansion and the saturation vapor of the surface improving agent 21 is brought into a supersaturation state, whereby the surface improving agent 21 starts to condense on the surface of each particle 22 (S305). Eventually, a liquid film of the surface improving agent 21 coats the particles 22, thereby improving the surfaces of the same.

Then, as the rotor 114 keeps rotating, a volume of the first treatment space 112*b*$_1$ decreases, and in accordance with which the surface improved particles in the first treatment space 112*b*$_1$ are released to the releasing pipe 118 through the particle outlet 5. Subsequently, the surface improved particles are released to the external of the particle surface improving apparatus 111 through the particle outlet 95 by way of the optical detecting device 3 (S306).

EXAMPLE 13

An example of the surface improving treatment carried out under predetermined conditions in accordance with the present particle surface improving method by the particle surface improving apparatus 111 of FIG. 39 will be explained with reference to the flowchart of FIG. 42. Note that actual actions in S311–S316 in the flowchart of FIG. 42 are identical with those in S301–S306 in the flowchart of FIG. 41, respectively. Also, note that the operation is carried out in the first treatment space 112*b*$_1$ alone herein.

To begin with, the condensation chamber 112 is heated to keep a temperature of the circumference wall section 112*a* at 350 K (S311).

Then, as the rotor 114 rotates, the rotor operating space 112*b* is sealed airtight after particles of titanium oxide having a primary particle size of approximately 0.5 $\mu$m and particle number concentration of $10^{11}$pcs/m$^3$, and diethylene glycol serving as the surface improving agent 21 are introduced into the first treatment space 112*b*$_1$ of the rotor operating space 112*b* in the condensation chamber 112 through the particle inlet 4 and surface improving agent inlet 72, respectively (S312).

Next, to obtain a saturation vapor of diethylene glycol, a pressure is applied to the first treatment space $112b_1$ to keep a pressure therein at 160 mmHg above a normal pressure (ambient pressure) as the rotor 114 rotates further (S313). Note that diethylene glycol is heated while a pressure is being applied.

Subsequently, the rotor 114 is suspended under these conditions (pressure applying state) to let the condensation chamber 112 stand for one minute to obtain a saturation vapor of diethylene glycol (S314).

Next, the rotor 114 is rotated again to drop a pressure within the first treatment space $112b_1$ abruptly to a normal pressure to bring ethylene glycol into a supersaturation vapor state through adiabatic expansion (S315). Consequently, diethylene glycol starts to condense on the particle surface of titanium oxide, and eventually, a liquid film of diethylene glycol coats the same. Obtained as a result of the above operation are substantially regular surface improved particles, each encoated with diethylene glycol with a particle of titanium oxide as a nucleus and having a primary particle size of 1 $\mu$m.

The post-surface-improving-treatment particles of titanium oxide are taken out from the apparatus as the rotor 114 rotates further to end the operation (S316).

The condensation chamber 112 is let stand for one minute herein. However, one minute is ample to obtain the saturation vapor, and the time for standing may be shortened to a few seconds depending on the kinds of condensation liquids.

EXAMPLE 14

Another example of the surface improving treatment carried out under predetermined conditions in accordance with the present particle surface improving method by the particle surface improving apparatus 111 of FIG. 39 will be explained with reference to the flowchart of FIG. 43. Note that actual actions in S321–S326 in the flowchart of FIG. 43 are identical with those in S301–S306 in the flowchart of FIG. 41, respectively. Also, note that the operation is carried out in the first treatment space $112b_1$ alone herein.

To begin with, the condensation chamber 112 is heated to keep a temperature of the circumference wall section 112a at 400 K (S321).

Then, as the rotor 114 rotates, the rotor operating space $112b$ is sealed airtight after particles of carbon black having a primary particle size of approximately 0.5 $\mu$m and particle number concentration of $10^{11}$pcs/m$^3$, and nitric acid serving as the surface improving agent 21 are introduced into the first treatment space $112b_1$ of the rotor operating space $112b$ in the condensation chamber 112 through the particle inlet 4 and surface improving agent inlet 72, respectively (S322).

Next, to obtain a saturation vapor of nitric acid, a pressure is applied to the first treatment space $112b_1$ to keep a pressure therein at 160 mmHg above a normal pressure (ambient pressure) as the rotor 114 rotates further (S323). Note that nitric acid is heated while a pressure is being applied.

Subsequently, the rotor 114 is suspended under these conditions (pressure applying state) to let the condensation chamber 112 stand for five minutes to obtain a saturation vapor of nitric acid (S324).

Next, the rotor 114 is rotated again to drop a pressure within the first treatment space $112b_1$ abruptly to a normal pressure to bring nitric acid into a supersaturation vapor state through adiabatic expansion (S325). Consequently, nitric acid starts to condense on the particle surface of carbon black, and eventually, a liquid film of nitric acid coats the same. Obtained as a result of the above operation are surface improved particles, each encoated with nitric acid with a particle of carbon black as a nucleus.

The post-surface-improving-treatment particles of the carbon black are taken out from the apparatus as the rotor 114 rotates further to end the operation (S326).

In the particle surface improving method carried out by the present surface improving apparatus 111, no action such that charges the particle 22, such as stirring the particles 22, is taken, and instead, the surface improving agent 21 is condensed on the surface of each particle 22 to improve the surface thereof like the other particle surface methods carried out by the particle surface improving apparatuses/systems explained above. Thus, the present particle surface improving method holds the advantages of these particle surface improving methods as well.

Also, in the particle surface improving method carried out by the present surface improving apparatus 111, the following actions are carried out in accordance with the rotation of the rotor 114:

①  introducing the particles 22 and surface improving agent 21 into the rotor operating space $112b$;

②  producing a saturation vapor of the surface improving agent 21 (compressing the treatment space);

③  letting the surface improving agent 21 condense on the surface of each particle 22 (reducing a pressure within the treatment space and generating a supersaturation atmosphere of the surface improving agent 21); and ④  taking out the surface improved particles from the rotor operating space $112b$.

Thus, the successive surface improving treatment can be carried out readily and efficiently.

Also, the present particle surface improving apparatus 111 obtains the surface improved particles using a single treatment space by increasing/reducing a pressure therein. Thus, the resulting surface improved particles can be collected easily.

Also, since the particle inlet 4 and surface improving agent inlet 72 are provided in the volume increasing area (first increase area) of the first treatment space $112b_1$, for example, the particles 22 and surface improving agent 21 supplied to their respective inlets 4 and 72 are readily introduced into the first treatment space $112b_1$ through suction as the volume of the first treatment space $112b_1$ increases.

Also, since the particle outlet 5 through which the surface improved particles are released from the first treatment space $112b_1$ is provided in the volume decreasing area (second decrease area) of the first treatment space $112b_1$, the particles can be readily released as the volume of the first treatment space $112b_1$ decreases.

In the above explanation, only the first treatment space $112b_1$ of the rotor operating space $112b$ is used for the surface improving treatment. However, the same can be done using the second and third treatment spaces $112b_2$ and $112b_3$ concurrently with the treatment using the first treatment space $112b_1$, thereby enabling highly efficient surface improving treatment.

Also, the method of impregnating the surface improving agent 21 into the surface of the rotor 114 made of a porous material in advance is also applicable to the particle surface improving apparatus 111. In this case, the step of introducing the surface improving agent 21 through the surface improving agent inlet 72 can be omitted.

EXAMPLE 15

Another example of the surface improving treatment carried out under predetermined conditions in accordance with the present particle surface improving method by the particle surface improving apparatus 111 of FIG. 39 will be explained with reference to the flowchart of FIG. 44. Note that the surface improving treatment is carried out repetitively by a single particle surface improving apparatus 111, and for this purpose, the particle surface improving apparatus 111 includes a valve for shutting/opening the particle outlet 5 herein. The concerned value corresponds to a valve 124 illustrated in FIG. 45. Although a detailed description will be given below, the valve 124 is made of, for example, an electromagnetic valve, and the shutting/opening action of the same is controlled by an unillustrated control device.

Figure 41:
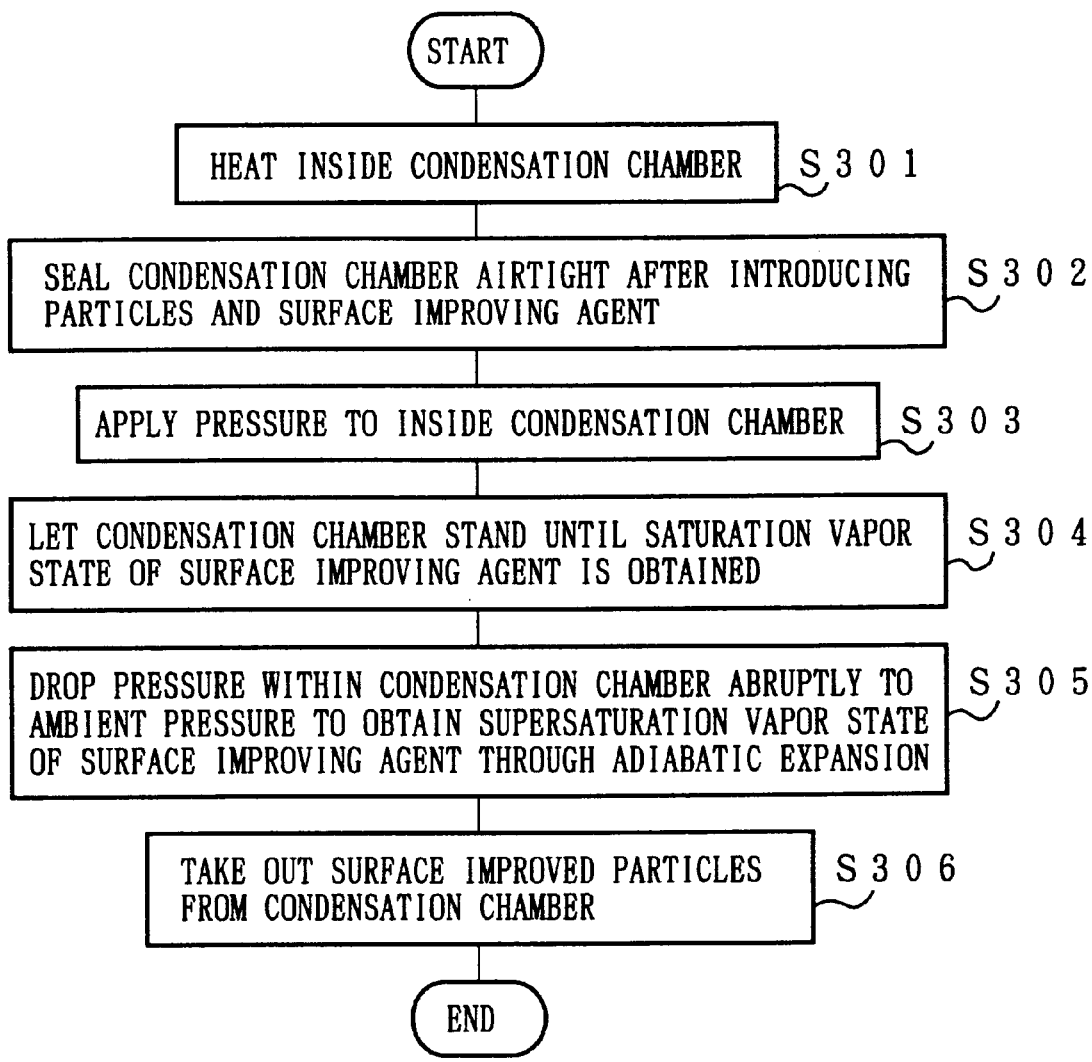
FIG. 41 is a flowchart detailing the particle surface improving method carried out by the particle surface improving apparatus of FIG. 39.
Figure 42:
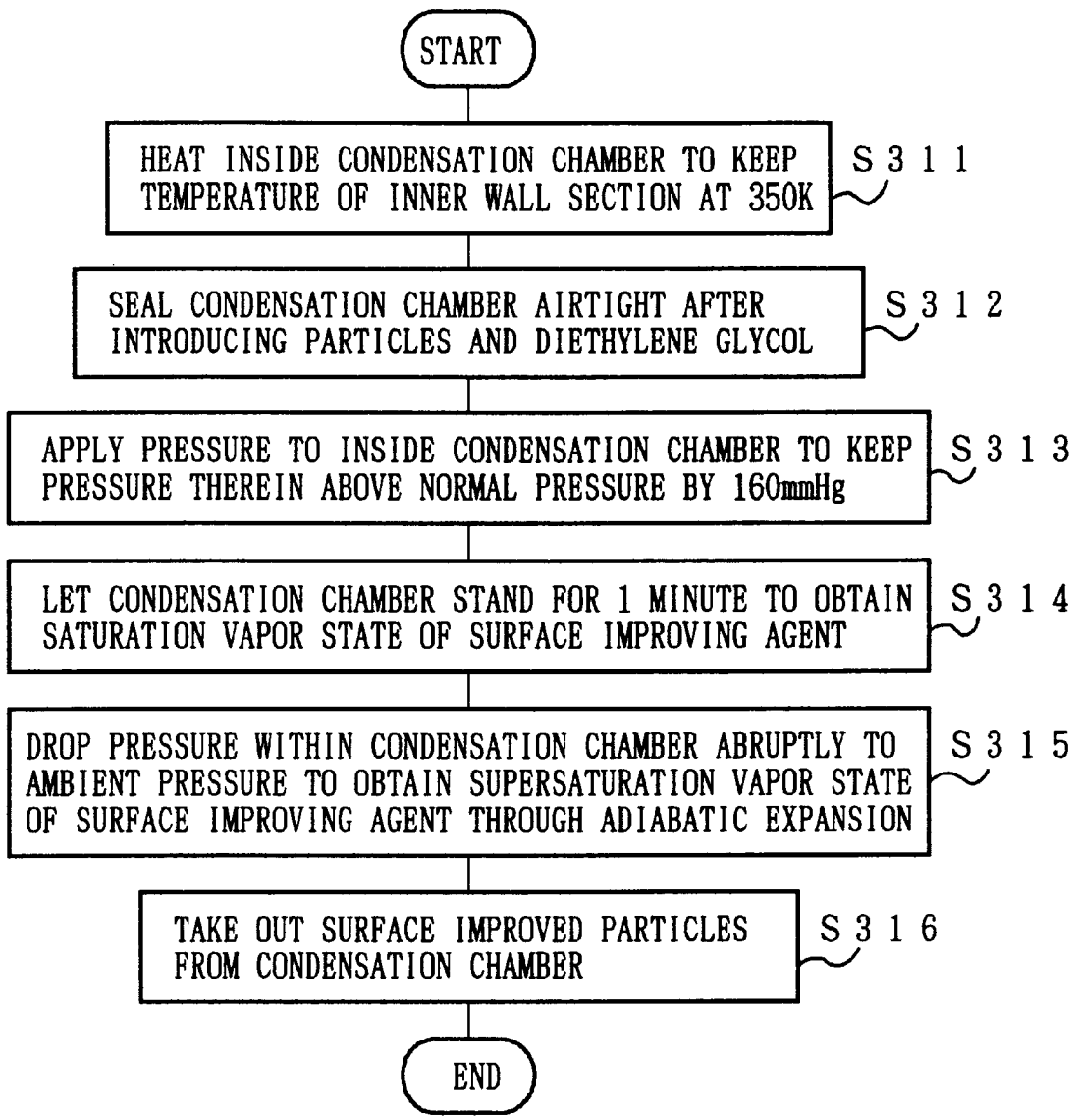
FIG. 42 is a flowchart detailing an example application of the particle surface improving method of FIG. 41.

Also, the actual actions in S331–S335 and S336–S340 in the flowchart of FIG. 44 are identical with those in S301–S305 and S302–S306 in the flowchart of FIG. 41, respectively. Also, note that the operation is carried out in the first treatment space $112b_1$ alone herein.

To begin with, the condensation chamber 112 is heated to keep a temperature of the circumference wall section 112a at 350 K (S331). At this point, the valve of the particle outlet 5 is shut.

Then, as the rotor 114 rotates, the rotor operating space 112b is sealed airtight after particles of polystyrene latex having a primary particle size of approximately 40 nm and particle number concentration of $10^{11}$ pcs/m$^3$, and diethylene glycol serving as the surface improving agent 21 are introduced into the first treatment space $112b_1$ of the rotor operating space 112b in the condensation chamber 112 through the particle inlet 4 and surface improving agent inlet 72, respectively (S332).

Next, to obtain a saturation vapor of diethylene glycol, a pressure is applied to inside the condensation chamber 112 to keep a pressure within the first treatment space $112b_1$ at 160 mmHg above a normal pressure (ambient pressure) as the rotor 114 rotates further (S333). Note that diethylene glycol is heated while a pressure is being applied.

Subsequently, the rotor 114 is suspended under these conditions (pressure applying state) to let the condensation chamber 112 stand for one minute to obtain a saturation vapor of diethylene glycol (S334).

Next, the rotor 114 is rotated again to drop a pressure within the first treatment space $112b_2$ abruptly to a normal pressure to bring diethylene glycol into a supersaturation vapor state through adiabatic expansion (S335). Consequently, diethylene glycol immediately starts to condense on the particle surface of polystyrene latex, and eventually, a liquid film of diethylene glycol coats the same. Obtained as a result of the above operation are substantially regular surface improved particles, each encoated with diethylene glycol with a particle of polystyrene latex as a nucleus and having a primary particle size of 1 μm.

As the rotor 114 rotates further and the first treatment space $112b_1$ reaches the position indicated in FIG. 39, diethylene glycol is introduced again into the first treatment space $112b_1$ through the surface improving agent inlet 72. At this point, no polystyrene latex particle is supplied to the particle inlet 4, and hence, no additional particle 22 is introduced into the first treatment space $112b_1$. Subsequently, the valve 117 is shut by the rotor 114, whereby the first treatment space $112b_1$ is sealed airtight (S336).

Subsequently, S337–S339 are carried out in the above manner, and obtained as a result are substantially regular surface improved particles, each encoated with diethylene glycol with a particle of polystyrene latex as a nucleus and having a primary particle surface of 2 μm.

During the second surface improving treatment, the valve of the particle outlet 5 is opened. Thus, the surface improved particles are taken out from the apparatus by way of the particle outlet 5, optical detecting device 3, and particle outlet 95 as the rotor 114 rotates further (S340).

Embodiment 10

Figure 45:
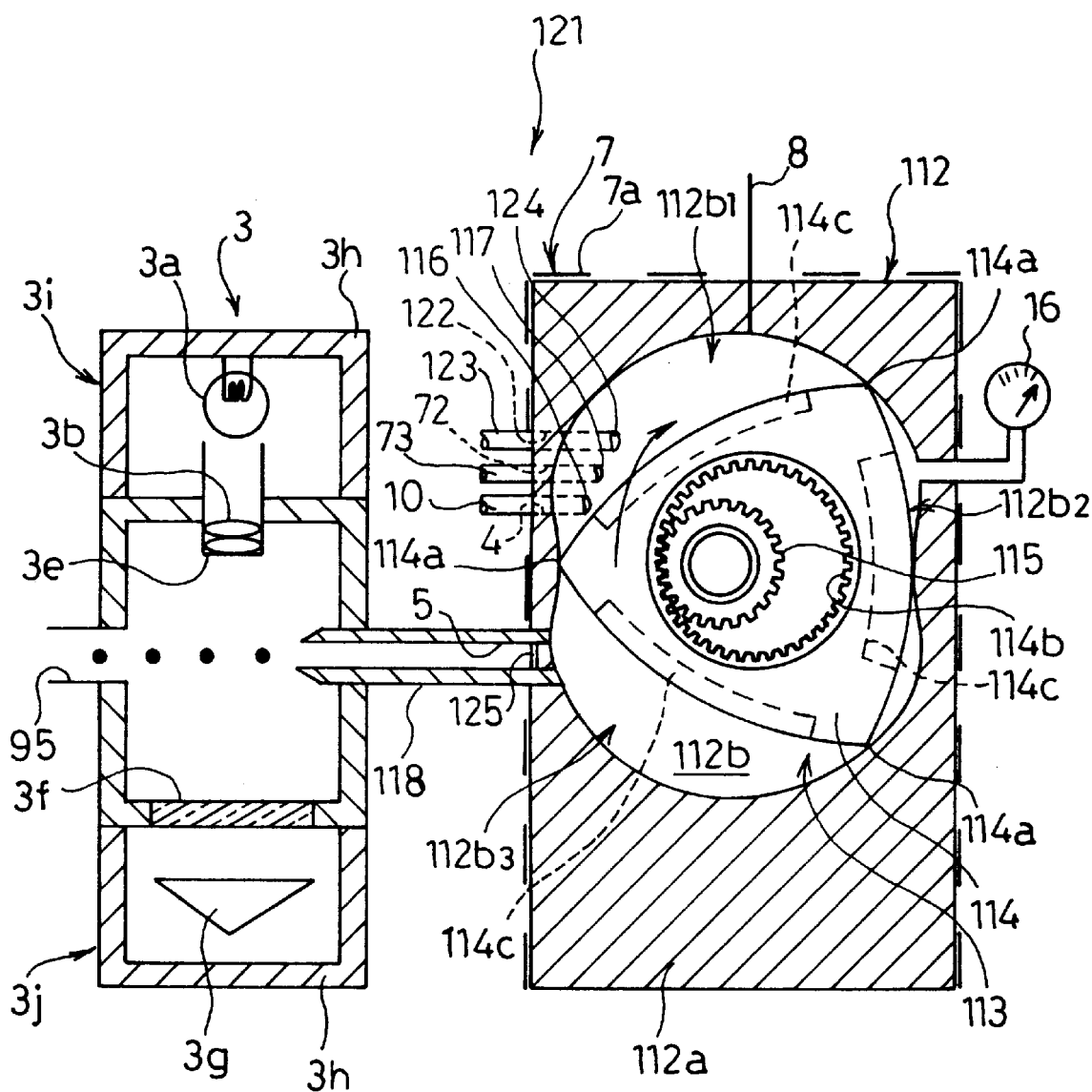
FIG. 45 is a longitudinal section of an example particle surface improving apparatus carrying out an example particle surface improving method in accordance with still another embodiment of the present invention.

Referring to FIGS. 45 and 46, the following description will describe still another example embodiment of the present invention. Hereinafter, like components are labeled with like reference numerals with respect to Embodiments 1 through 9, and the description of these components is not repeated for the explanation's convenience.

A particle surface improving apparatus 121 carrying out a particle surface improving method of the present embodiment is of a structure depicted in FIG. 45. The particle surface improving apparatus 121 applies the surface improving treatment repetitively to the same particles 22 using at least two kinds of surface improving agents 21 respectively in separate treatment.

The particle surface improving apparatus 121 includes a second surface improving inlet 122 in addition to the surface improving agent inlet 72, so that different kinds of surface improving agents 21 will be introduced into the rotor operating space 112b in the condensation chamber 112. An introduction pipe 123, which corresponds to the introduction pipe 73, has the valve 125 and is fit into the surface improving agent inlet 122 like the introduction pipe 73 having the valve 117 is fit into the surface improving agent inlet 72. Also, the particle outlet 5 includes the valve 125 for shutting/opening the same. The valve 124 is made of, for example an electromagnetic valve whose shutting/opening action is under the control of an unillustrated control device. Except for the above arrangement, the particle surface improving apparatus 121 is of the same structure as the particle surface improving apparatus 111.

The surface improving agent inlet 72 is used for the first surface improving treatment to the particles 22, and the surface improving agent inlet 122 is used for the second surface improving treatment to the same particles 22. In this case, the surface improving agent 21 is supplied to either the surface improving agent inlet 72 or 122, whichever is being used. More precisely, the surface improving agent 21 is supplied to the surface improving agent inlet 72 alone when the same is used, and to the surface improving agent inlet 122 alone when the same is used.

When more than two kinds of surface improving agents 21 are used, as many surface improving agent inlets as the kinds of surface improving agents are made through the condensation chamber 112. Alternatively, more than one kind of surface improving agent 21 may be introduced into the rotor operating space 112b concurrently through a single surface improving agent inlet 72 as has been explained. In addition, both the surface improving agent inlets 72 and 122 may be used at the same time. Using more than one kind of surface improving agent 21 concurrently can trigger a chemical reaction of the surface improving agents 21 and a surface material of the particles 22.

EXAMPLE 16

An example of the surface improving treatment carried out under predetermined conditions in accordance with the present particle surface improving method using the particle surface improving apparatus 121 of FIG. 45 will be explained with reference to the flowchart of FIG. 46. Note that the actual actions in S351–S355 and S356–S360 in the flowchart of FIG. 46 are identical with those in S301–S305 and S302–S306 in the flowchart of FIG. 41, respectively. Herein, diethylene glycol is supplied to the surface improving agent inlet 72 from the surface improving agent supplying device 76 through the introduction pipe 73, and triethylene glycol is supplied to the surface improving agent inlet 122 from the surface improving agent supplying device 85 through the introduction pipe 123. Also, note that the operation is carried out in the first treatment space $112b_1$ alone herein.

To begin with, the condensation chamber 112 is heated to keep a temperature of the circumference wall section 112a at 350 K (S351). At this point, the valve 125 of the particle outlet 5 is shut.

Then, as the rotor 114 rotates, the rotor operating space 112b is sealed airtight after particles of polystyrene latex having a primary particle size of approximately 40 nm and particle number concentration of $10^{11}$ pcs/m$^3$, and diethylene glycol serving as the surface improving agent 21 are introduced into the first treatment space $112b_1$ of the rotor operating space 112b in the condensation chamber 112 through the particle inlet 4 and surface improving agent inlet 72, respectively (S352).

Next, to obtain a saturation vapor of diethylene glycol, a pressure is applied to the condensation chamber 112 to keep a pressure within the first treatment space $112b_1$ at 160 mmHg above a normal pressure (ambient pressure) as the rotor 114 rotates further (S353). Note that diethylene glycol is heated while a pressure is being applied.

Subsequently, the rotor 114 is suspended under these conditions (pressure applying state) to let the condensation chamber 112 stand for one minute to obtain a saturation vapor of diethylene glycol (S354).

Next, the rotor 114 is rotated again to drop a pressure within the first treatment space 112$b_1$ abruptly to a normal pressure to bring diethylene glycol into a supersaturation vapor state through adiabatic expansion (S355). Consequently, diethylene glycol starts to condense on the particle surface of polystyrene latex, and eventually, a liquid film of diethylene glycol coats the same. Obtained as a result of the above operation are substantially regular surface improved particles, each encoated with diethylene glycol with a particle of polystyrene latex as a nucleus and having a primary particle size of 1 $\mu$m.

As the rotor 114 rotates further and the first treatment space 112$b_1$ reaches the position indicated in FIG. 45, triethylene glycol is introduced into the first treatment space 112$b_1$ through the surface improving agent inlet 122. At this point, no polystyrene latex particle is supplied to the particle inlet 4, and hence, no additional particle 22 is introduced into the first treatment space 112$b_1$. Subsequently, the valves 116, 117, and 124 are shut by the rotor 114, whereby the first treatment space 112$b_1$ is sealed airtight (S356)

Subsequently, S357–S359 are carried out in the above manner, and obtained as a result are substantially regular surface improved particles, each encoated with a double-layer film of diethylene glycol on the bottom and triethylene glycol on the top with a particle of polystyrene latex as a nucleus and having a primary particle surface of 4 $\mu$m.

During the second surface improving treatment, the valve 124 of the particle outlet 5 is opened. Thus, the final surface improved particles are taken out from the apparatus by way of the particle outlet 5, optical detecting device 3, and particle outlet 95 as the rotor 114 rotates further (S360).

As has been explained, the particle surface improving method of the first invention is characterized in that a film of the surface improving agent that improves the property of the particle surface is formed on the particle surface by exposing the subjected particles to a supersaturation atmosphere of the surface improving agent to let the same condense on the particle surface.

In the particle surface improving method of the first invention, the step of forming a film of the surface improving agent on the particle surface may be repeated to form a thicker film.

The above arrangement makes it possible to form a film of the surface improving agent of a desired thickness or surface improved particles of a desired particle size.

To be more specific, when a surface improving agent attaining a high saturation ratio is used, a film of the surface improving agent of a desired thickness or surface improved particles of a desired particle size can be obtained by carrying out the surface improving treatment once. However, when a surface improving agent attaining only a low saturation ratio is used, a film of the surface improving agent of a desired thickness or surface improved particles of a desired particle size may not be obtained by carrying out the surface improving treatment once. Therefore, the present particle surface improving method solves the above problem by repeating the surface improving treatment.

When the step of forming a film of the surface improving agent on the particle surface, at least two kinds of surface improving agents may be used respectively in separate treatment.

In this case, when each kind has a different function, the resulting surface improved particles will be high-performance particles having more than one function.

Also, in the particle surface improving method of the present invention, to expose the particles to a supersaturation atmosphere of the surface improving agent, the particles may be exposed to a saturation vapor of the surface improving agent first, so that the surface improving agent is brought into a supersaturation state through adiabatic expansion.

According to this arrangement , the supersaturation atmosphere of the surface improving agent is obtained in a very short time by simply triggering adiabatic expansion of the saturation vapor of the surface improving agent. Thus, not only the surface improving treatment can be accelerated, but also the operating manipulation and the apparatus can be simplified. Also, the yield of the surface improved particles can be enhanced.

The saturation vapor of the surface improving agent may be produced by compressing the surface improving agent.

This arrangement can facilitate the following step of triggering adiabatic expansion of the saturation vapor of the surface improving agent to obtain the supersaturation atmosphere of the same.

In the particle surface improving method of the first invention, to expose the particles to the supersaturation atmosphere of the surface improving agent, the particles may be exposed to a saturation vapor of the surface improving agent and the saturation vapor may be cooled to bring the same into the supersaturation state.

According to this arrangement, the supersaturation atmosphere of the surface improving agent is produced by simply cooling the saturation vapor of the surface improving agent. Thus, not only the operating manipulation, but also the apparatus can be simplified.

Also, the saturation vapor of the surface improving agent may be produced by heating the surface improving agent.

This arrangement can facilitate the following step of cooling the saturation vapor of the surface improving agent to obtain the supersaturation atmosphere of the same.

Also, in the particle surface improving method of the first invention, to expose the particles to the supersaturation atmosphere of the surface improving agent, the surface improving agent may be impregnated into a porous material provided in an airtight condensation chamber, so that the surface improving agent will be brought into the supersaturation state by introducing the particles into the condensation chamber and producing a saturation vapor of the surface improving agent by applying a pressure to inside the condensation chamber first and thence reducing the pressure.

According to the above arrangement, the saturation vapor of the surface improving agent is produced by impregnating the surface improving agent into the porous material having a large surface area to expose the same to an atmosphere in the condensation chamber. Thus, the saturation vapor can be obtained efficiently in a very short time.

The particle surface improving method of the second invention is characterized in that a film of the surface improving agent is formed on the particle surface by the following steps of:

sealing an airtight condensation chamber airtight after introducing particles and a surface improving agent that improves the particle surface into a treatment space in a condensation chamber;

producing a saturation vapor of the surface improving agent by reducing a volume of the treatment space to increase a pressure therein;

producing a supersaturation atmosphere of the surface improving agent by reducing a pressure within the treatment space to expose the particles to the supersaturation atmosphere to let the surface improving agent condense on the particle surface.

According to the above arrangement, the saturation vapor and supersaturation atmosphere of the surface improving agent are produced by changing a volume of the treatment space in the condensation chamber. Thus, the particles done with the surface improving treatment using the surface improving agent remain in the condensation chamber, and therefore, can be collected easily. Also, the present particle surface improving method can be carried out by a simple particle surface improving apparatus. Further, the surface improving treatment can be applied repetitively to the same particles in the same condensation chamber.

Also, since the particles are not charged during the surface improving step, the resulting surface improved particles are easy to handle. A simple physical phenomenon that the particles are exposed to the supersaturation atmosphere of the surface improving agent to let the surface improving agent condense on the particle surface is used herein. Thus, compared with other surface improving treatments like stirring, the present surface improving treatment takes a very short time. Moreover, the operating manipulation can be simplified, and a simple and inexpensive apparatus can be used for the present surface improving treatment.

A particle surface improving apparatus of a third invention is characterized by being furnished with:

a condensation chamber having an airtight treatment space inside;

a particle inlet through which particles are introduced into the treatment space in the condensation chamber;

a particle outlet through which the particles are taken out from the treatment space in the condensation chamber; and adjusting means for changing a pressure within the treatment space to produce a saturation vapor of a surface improving agent that improves the property of the particle surface in the treatment space and to bring the saturation vapor into a supersaturation state.

The particle surface improving apparatus of the third invention is also characterized in that at least a part of members of the condensation chamber enclosing the treatment space is made of a porous material for impregnating the surface improving agent that improves property of the particle surface.

According to the above arrangement, the particles are introduced into the condensation chamber through the particle inlet while the surface improving agent is impregnated into the member of the condensation chamber made of a porous material. Then, the condensation chamber is sealed airtight and a saturation vapor of the surface improving agent is produced in the condensation chamber by activating the adjusting means. Subsequently, a pressure within the condensation chamber is reduced to bring the saturation vapor of the surface improving agent into a supersaturation state, whereby a film of the surface improving agent eventually coats each particle by letting the surface improving agent condense on the particle surface.

In this case, the saturation vapor of the surface improving agent is produced by impregnating the surface improving agent into the porous material having a larger surface area to be exposed to an atmosphere in the condensation chamber. Thus, the saturation vapor can be obtained efficiently.

A particle surface improving apparatus of a fourth invention is characterized by being furnished with:

a condensation chamber having an airtight treatment space inside;

a particle inlet through which particles are introduced into the treatment space in the condensation chamber;

a particle outlet through which the particles are taken out from the treatment space in the condensation chamber;

adjusting means for changing a pressure within the treatment space;

particle supplying means for supplying the particles into the condensation chamber through the particle inlet;

particle releasing means for releasing the particles from the condensation chamber through said particle outlet after they are treated therein; and control means for controlling, (i) the particle supplying means to supply the particles into the condensation chamber, (ii) the adjusting means to bring the surface improving agent supplied into the condensation chamber into a saturation state and further into a supersaturation state, and (iii) the particle releasing means to release the particles from the condensation chamber after the surface improving agent is condensed on the particle surface.

According to the above arrangement, the particles are supplied to the treatment space in the condensation chamber by the particle supplying means, while the surface improving agent supplied to the treatment space is brought into the saturation state by the adjusting means. Subsequently, the surface improving agent in the treatment space is further brought into the supersaturation state by the adjusting means. Then, the particles are released from the condensation chamber by the particle releasing means after the surface improving agent is condensed on the particle surface.

The present surface improving apparatus can carry out a series of the above actions automatically. Also, the present surface improving apparatus can form a surface improving film on the particle surface without any action such that charges the particles like stirring. Thus, since the particles are not charged during the surface improving treatment, the resulting surface improved particles are easy to handle.

Also, compared with other surface improving treatments like stirring, the action of forming the surface improving film on the particle surface by letting the surface improving agent condense thereon takes a very short time.

Moreover, a simple physical phenomenon that the particles are exposed to the supersaturation atmosphere of the surface improving agent to let the surface improving agent condense on the particle surface is used. Therefore, the operating manipulation can be simplified, and the present surface improving apparatus can be simple and inexpensive.

In addition, the surface improving film grows to have a constant thickness due to its own surface tension, thereby making it possible to coat each particle with the surface improving film of a uniform thickness.

A particle surface improving apparatus of a fifth invention is characterized by being furnished with:

a condensation chamber having an airtight treatment space inside;

a reclosable inlet through which at least particles are introduced into the treatment space in the condensation chamber;

a reclosable particle outlet through which the particles are taken out from the treatment space in the condensation chamber; and pressure applying/reducing means, provided in the condensation chamber, for changing a volume of the treatment space to produce a saturation vapor of the surface improving agent that improves the property of the particle surface in the treatment space or to bring the saturation vapor into a supersaturation state.

According to the above arrangement, the particles are supplied to the treatment space in the condensation chamber through the inlet while the surface improving agent supplied to the treatment space is brought into the saturation state by the pressure applying/reducing means. Subsequently, the surface improving agent in the treatment space is further brought into the supersaturation state by the pressure applying/reducing means. Accordingly, surface improved particles with the surface improving agent condensed on the particle surface are obtained. Note that the surface improving agent is supplied to the treatment space either in advance or concurrently with the particles.

As has been explained, the present particle surface improving apparatus obtains the saturation vapor and supersaturation atmosphere of the surface improving agent by increasing/reducing a pressure within the treatment space by changing a volume thereof using the pressure applying/reducing means. Thus, the surface improving treatment can be readily applied successively to the same particles while the particles are withheld in the treatment space, namely using a single particle surface improving apparatus. Also, since the post-surface-improving-treatment particles with the surface improving agent remain in the condensation chamber, the surface improved particles can be collected easily.

In the surface improving treatment carried out by the present particle surface improving apparatus, the particles are not charged during the surface improving treatment. Thus, the resulting surface improved particles are easy to handle. Moreover, a simple physical phenomenon that the particles are exposed to the supersaturation atmosphere of the surface improving agent to let the surface improving agent condense on the particle surface is used. Thus, compared with other surface improving treatments like stirring, the present surface improving treatment takes a very short time. Also, the operating manipulation can be simplified and the present particle surface improving apparatus can be simple and inexpensive. Further, the surface improving film grows to have a constant thickness due to its own surface tension, thereby making it possible to coat each particle with the surface improving film of a uniform thickness.

A particle surface improving apparatus of a sixth invention is characterized by being furnished with:

a condensation chamber having a treatment space inside;

an inlet through which at least particles are introduced into the treatment space in the condensation chamber;

heating means for heating the treatment space to produce a saturation vapor of a surface improving agent that improves the property of a particle surface;

a transporting path connected to the treatment space in the condensation chamber; and cooling means for cooling the transporting path to bring the saturation vapor of the surface improving agent into a supersaturation state.

According to the above arrangement, the particles are introduced into the treatment space in the condensation chamber through the inlet, while the treatment space is heated by the heating means to bring the surface improving agent in the treatment space into the saturation state. Note that the surface improving agent is supplied to the treatment space either in advance or concurrently with the particles. Subsequently, a mixed gas of the particles and saturation vapor is introduced into the transporting path by, for example, an air flow of the heated gas. In the transporting path, the saturation vapor of the surface improving agent is cooled by the cooling means and brought into the supersaturation state. Consequently, surface improved particles with the surface improving agent condensed on the particle surface are obtained.

As has been explained, the present particle surface improving apparatus obtains the surface improved particles by the following manner:

generating a saturation vapor of the surface improving agent in the treatment space in the condensation chamber;

introducing the saturation vapor and particles into the transporting path; and condensing the surface improving agent in the transporting path.

Thus, the surface improving treatment can be applied successively to the particles supplied steadily into the treatment space in the condensation chamber through the inlet.

The particles are not charged during the surface improving treatment carried out by the present particle surface improving apparatus. Thus, the resulting surface improved particles are easy to handle. Moreover, a simple physical phenomenon that the particles are exposed to the supersaturation atmosphere of the surface improving agent to let the surface improving agent condense on the particle surface is used. Thus, compared with other surface improving treatments like stirring, the present surface improving treatment takes a very short time. Also, the operating manipulation can be simplified and the present surface improving apparatus can be simple and inexpensive. Further, the surface improving film grows to have a constant thickness due to its own surface tension, thereby making it possible to coat each particle with the surface improving film of a uniform thickness.

The particle surface improving apparatus of the sixth invention may be arranged in such a manner that the transporting path is inclined to lower the end portion connected to the treatment space than the other end portion.

The above arrangement makes it possible to recycle the surface improving agent condensed on the inner wall of the transporting path during the cooling action.

More specifically, a part of the surface improving agent is cooled in the transporting path to condense and adhere on the particle surface, and the rest of the surface improving agent adheres to the transporting path. However, since the transportation path is inclined, the surface improving agent adhering to the transporting path returns to the condensation chamber by gravity. The returned surface improving agent turns into a saturation vapor again as the treatment space in the condensation chamber is heated, thereby recycling the surface improving agent. Consequently, an amount of the surface improving agent is saved, and so is the manufacturing cost of the surface improved particles.

A particle surface improving apparatus of a seventh invention is characterized by being furnished with:

a condensation chamber having a rotor operating space inside;

an inlet through which at least particles are introduced into the rotor operating space in the condensation chamber;

a particle outlet through which the particle are taken out from the rotor operating space in the condensation chamber;

a rotating rotor provided in the rotor operating space, which, together with an inner wall surface of the condensation chamber enclosing the rotor operating space, forms an airtight treatment space that moves as the rotor rotates; and pressure applying/reducing means for changing a volume of the treatment space to produce a saturation vapor of a surface improving agent that improves the property of the particle surface in the treatment space and to bring the saturation vapor into a supersaturation state.

According to the above arrangement, the particles are introduced into the rotor operating space in the condensation chamber, namely, the treatment space, through the inlet. The surface improving agent is introduced into the treatment space either in advance or together with the particles.

The rotor of the pressure applying/reducing means and the inner wall surface of the condensation chamber enclosing the rotor operating space form an airtight treatment space within the rotor operating space in the condensation chamber. The treatment space thus formed moves as the rotor rotates, and a volume thereof is changed also as the rotor rotates to produce the saturation vapor of the surface improving agent and to bring the saturation vapor further into the supersaturation state.

Accordingly, the surface improving agent starts to condense on the particle surface in the treatment space, and as a result, the surface improved particles are obtained. The surface improved particles thus produced are taken out from the condensation chamber through the particle outlet.

As has been explained, the present particle surface improving apparatus obtains the saturation vapor and supersaturation atmosphere of the surface improving agent by changing a volume of the treatment space as the pressure applying/reducing means rotates its rotor. Thus, the surface improving treatment can be readily applied successively to the same particles while the particles are withheld in the treatment space, namely using a single particle surface improving apparatus.

Also, the particles are introduced into the treatment space through the inlet and a volume of the treatment space is changed while the treatment space moves as the rotor rotates, in accordance with which the resulting surface improved particles are taken out through the particle outlet. Therefore, a series of actions in the surface improving treatment can be readily carried out by introducing the particles steadily into the treatment space through the inlet and rotating the rotor.

The particles are not charged during the surface improving treatment carried out by the present particle surface improving apparatus,. Thus, the resulting surface improved particles are easy to handle. Moreover, a simple physical phenomenon that the particles are exposed to the supersaturation atmosphere of the surface improving agent to let the surface improving agent condense on the particle surface is used. Thus, compared with other surface improving treatments like stirring, the present surface improving treatment takes a very short time. Also, the operating manipulation can be simplified and the present particle surface improving apparatus can be simple and inexpensive. Further, the surface improving film grows to have a constant thickness due to its own surface tension, thereby making it possible to coat each particle with the surface improving film of a uniform thickness.

The particle surface improving apparatus of the seventh invention may be arranged in such a manner that a volume of the treatment space shows a series of changes of a first increase, a first decrease, a second increase, and a second decrease as the rotor rotates once, and that the inlet is provided in the first increase area and the outlet is provided in the second decrease area, while a saturation vapor of the surface improving agent is produced in the first decrease area and the saturation vapor of the surface improving agent is brought into a supersaturation state in the second increase area.

According to the above arrangement, since the inlet is provided in the first increase area of the volume of the treatment space, the particles supplied to the inlet are readily introduced into the treatment space by suction caused by a volume increase of the treatment space. Also, the saturation vapor of the surface improving agent is produced in the first decrease area after the particles are introduced into the treatment space, and the saturation vapor of the surface improving agent is further brought into the supersaturation state in the second increase area, whereby the surface improving agent condenses on the particle surface and the surface improved particles are obtained. Since the outlet for releasing the surface improved particles from the treatment space is provided in the second decrease area of the volume of the treatment space, the particles can be readily released as the volume of the treatment space decreases.

In other words, a series of actions, that is, introducing the particles into the treatment space, generating the saturation vapor of the surface improving agent, generating the supersaturation atmosphere of the surface improving agent, and releasing the surface improved particles from the treatment space, are carried out at the first increase, first decrease, second increase, and second decrease of the volume of the treatment space in the condensation chamber, respectively. Thus, a series of actions in the surface improving treatment can be readily carried out in an efficient manner.

Also, the particle surface improving apparatuses of the third through seventh inventions may be arranged in such a manner to be additionally furnished with particle size detecting means for detecting a particle size at least after a film of the surface improving agent is formed on the particle surface.

According to the above arrangement, at least a particle size of the surface improved particles immediately after the surface improving treatment can be detected by the particle size detecting means. Thus, a particle size of the surface improved particles can be controlled by judging the detection result promptly.

Also, the particle surface improving apparatuses of the third through seventh invention may be arranged in such a manner to be additionally furnished with particle number concentration detecting means for detecting the number concentration of the particles treated in the condensation chamber.

According to the above arrangement, the number concentration of the surface improved particles obtained as a result of the surface improving treatment can be detected. Thus, a particle size of the surface improved particles can be detected based on the number concentration thus detected, and the productivity of the particle surface improving apparatus can be confirmed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of improving a property of the surface of a particle wherein the particles are not charged, said method comprising the steps of:

producing a saturation vapor of a surface improving agent that improves a property of a particle surface;

bringing said saturation vapor into a supersaturation state;

exposing said particle to the supersaturation state of said surface improving agent; and condensing a film layer of said surface improving agent onto the particle surface, thereby improving a property of the surface of said particle wherein the particle is not charged.

2. The method according to claim 1, wherein the steps are repeated to increase the thickness of said film layer.

3. The method according to claim 2, wherein the steps are repeated using two kinds of surface improving agents, condensed sequentially onto the particle.

4. The method according to claim 1, wherein the method consists of:

exposing the particle to a saturation vapor of said surface improving agent; and bringing the saturation vapor with the particle exposed thereto into a supersaturation state through adiabatic expansion of the saturation vapor.

5. The method according to claim 4, wherein the saturation vapor of said surface improving agent is produced by compressing one of said surface improving agent or a vapor of said surface improving agent.

6. The method according to claim 1, wherein the method consists of:

exposing the particle to a saturation vapor of said surface improving agent; and bringing the saturation vapor with the particle exposed thereto into a supersaturation state by cooling the saturation vapor.

7. The method according to claim 6, wherein the saturation vapor of said surface improving agent is produced by heating one of said surface improving agent or a vapor of said surface improving agent.

8. The method according to claim 1, wherein the method further comprises:

providing an airtight condensation chamber containing a porous material;

introducing a surface improvement agent into the airtight condensation chamber;

impregnating the surface improving agent into the porous material in the chamber;

introducing the particle into the airtight condensation chamber;

sealing the chamber in one of the following manners, (I) without an application of pressure and (ii) with an application of pressure;

providing a pressure inside the chamber to produce a saturation vapor of the surface improving agent; and bringing the surface improvement agent into a supersaturation state by reducing a pressure within said condensation chamber.

9. A method of improving a property of the surface of a particle wherein the particles are not charged, said method comprising the steps of:

introducing the particle and a surface improvement agent into an airtight condensation chamber;

sealing an airtight treatment space for the particle and surface improvement agent inside the airtight condensation chamber after the introducing step;

producing a saturation vapor of the surface improvement agent by reducing a volume of said treatment space to increase a pressure therein;

producing a supersaturation atmosphere of the surface improving agent by increasing the volume of the treatment space to reduce the pressure therein, thereby exposing the particle to the supersaturation atmosphere; and condensing a film layer of said surface improving agent onto the particle surface, thereby improving a property of the surface of said particle.

* * * * *